United States Patent
O'Neill et al.

(10) Patent No.: US 6,219,653 B1
(45) Date of Patent: Apr. 17, 2001

(54) FREIGHT CALCULATION SYSTEM AND METHOD OF OPERATION

(75) Inventors: John C. O'Neill, Dallas; Johnny V. Ainsworth, Southlake; Paul D. Jenkins, Plano, all of TX (US)

(73) Assignee: Forest Products International Exchange, Inc., Dallas, TX (US)

( * ) Notice: Subject to any disclaimer, the term of this patent is extended or adjusted under 35 U.S.C. 154(b) by 0 days.

(21) Appl. No.: 09/153,473

(22) Filed: Sep. 15, 1998

(51) Int. Cl.⁷ ........................................................ G06F 17/60
(52) U.S. Cl. .............................. 705/400; 705/26; 705/29
(58) Field of Search ............................. 705/1, 26, 28, 705/29, 400

(56) References Cited

U.S. PATENT DOCUMENTS

| | | | |
|---|---|---|---|
| 3,573,747 | 4/1971 | Adams et al. | 340/172.5 |
| 4,495,581 * | 1/1985 | Piccione | 705/402 |
| 4,677,552 | 6/1987 | Sibley, Jr. | 364/408 |
| 4,713,761 * | 12/1987 | Sharpe et al. | 705/30 |
| 4,799,156 | 1/1989 | Shavit et al. | 364/401 |
| 5,063,506 | 11/1991 | Brockwell et al. | 364/402 |
| 5,117,364 * | 5/1992 | Barns-Slavin et al. | 705/402 |
| 5,136,501 | 8/1992 | Silvermann et al. | 364/408 |
| 5,168,446 | 12/1992 | Wiseman | 364/408 |
| 5,450,317 | 9/1995 | Lu et al. | 364/402 |
| 5,485,369 | 1/1996 | Nicholls et al. | 364/401 |
| 5,537,314 * | 7/1996 | Kanter | 705/14 |
| 5,631,827 | 5/1997 | Nicholls et al. | 395/228 |
| 5,664,115 | 9/1997 | Fraser | 705/37 |
| 5,666,493 | 9/1997 | Wojcik et al. | 705/26 |
| 5,671,279 * | 9/1997 | Elgamal | 705/79 |
| 5,675,746 | 10/1997 | Marshall | 395/235 |
| 5,689,652 | 11/1997 | Lupien et al. | 395/237 |
| 5,710,887 | 1/1998 | Chelliah et al. | 395/226 |
| 5,710,889 | 1/1998 | Clark et al. | 395/244 |
| 5,715,314 | 2/1998 | Payne et al. | 380/24 |
| 5,715,402 | 2/1998 | Popolo | 395/237 |
| 5,717,989 | 2/1998 | Tozzoli et al. | 705/37 |
| 5,724,424 | 3/1998 | Gifford | 380/24 |
| 5,724,521 | 3/1998 | Dedrich | 395/226 |
| 5,727,164 | 3/1998 | Kaye et al. | 395/228 |
| 5,729,458 | 3/1998 | Poppen | 364/464.1 |
| 5,732,400 | 3/1998 | Mandler et al. | 705/26 |
| 5,745,681 | 4/1998 | Levine et al. | 395/200.3 |
| 5,758,328 | 5/1998 | Giovannoli | 705/26 |
| 5,758,329 | 5/1998 | Wojcik et al. | 705/28 |
| 5,761,432 | 6/1998 | Bergholm et al. | 395/200.56 |
| 5,822,737 * | 10/1998 | Ogram | 705/26 |
| 5,893,076 * | 4/1999 | Hafner et al. | 705/28 |
| 6,035,289 * | 3/2000 | Chou et al. | 705/37 |
| 6,064,981 * | 5/2000 | Barni et al. | 705/26 |

FOREIGN PATENT DOCUMENTS 11-175609 * 7/1999 (JP) .

OTHER PUBLICATIONS

CommerceNet Home Page, 1998.
Trade Point Minnesota.
About Trade Compass.
Access Business Online.
"InterWorld Adds Tandata's Logistics Management Software To Its Leading Internet Commerce System"; PR Newswire, Sep. 8, 1997, pp. 908NYM048.*

* cited by examiner

Primary Examiner—Edward Cosimano
(74) Attorney, Agent, or Firm—Baker Botts L.L.P.

(57) ABSTRACT

A freight calculation system includes a seller client, a buyer client, and a platform coupled to the seller client and the buyer client using a communication network. The seller client generates freight data and communicates it using a communication network. The buyer client communicates a delivery request for a load using the communication network. The delivery request specifies one of a number of delivery containers, an origination location, and a destination location. The platform receives and stores the freight data and determines a delivery cost for the load using the freight data, the specified delivery container, the origination location, and the destination location.

31 Claims, 36 Drawing Sheets

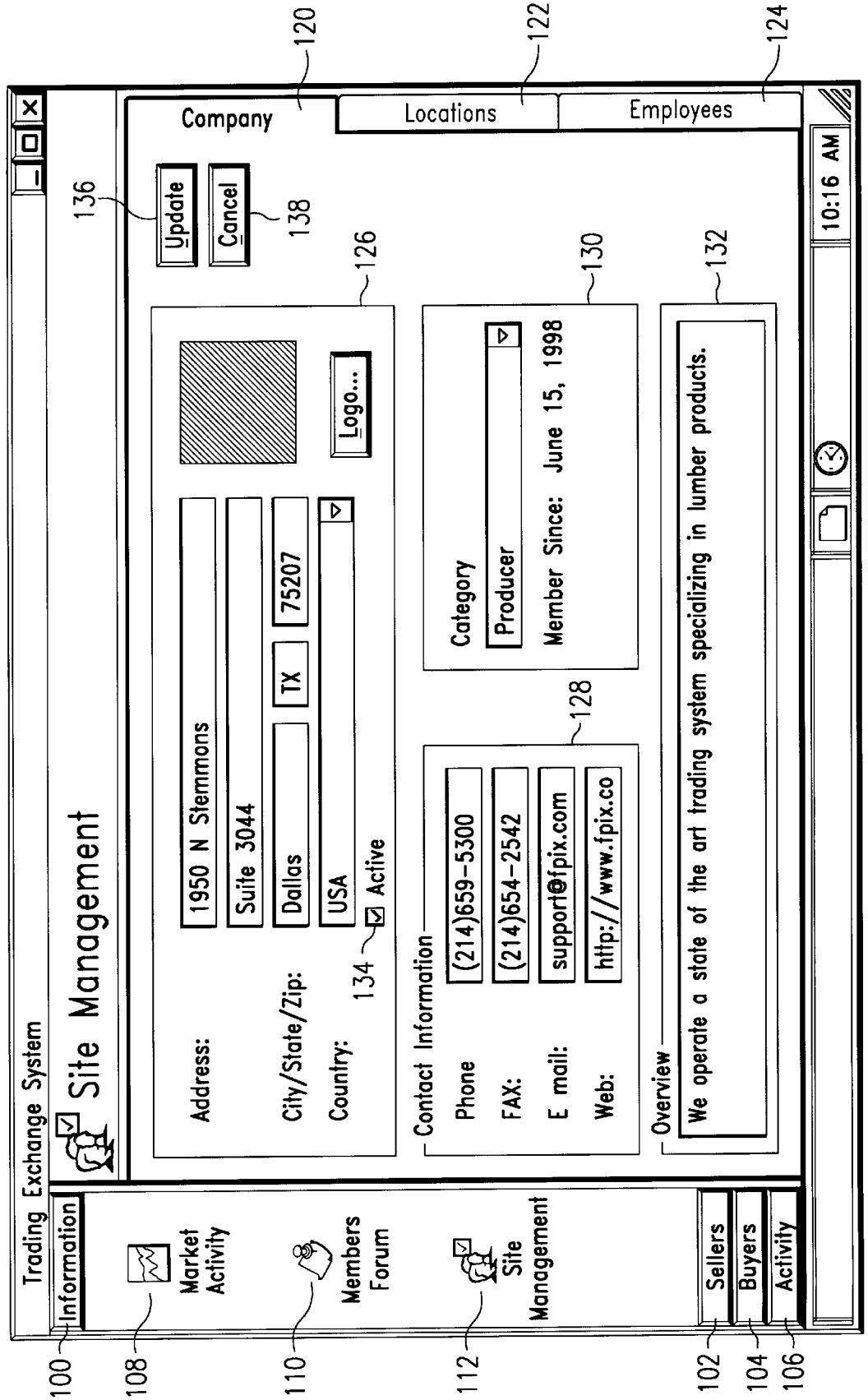

FIG. 7B

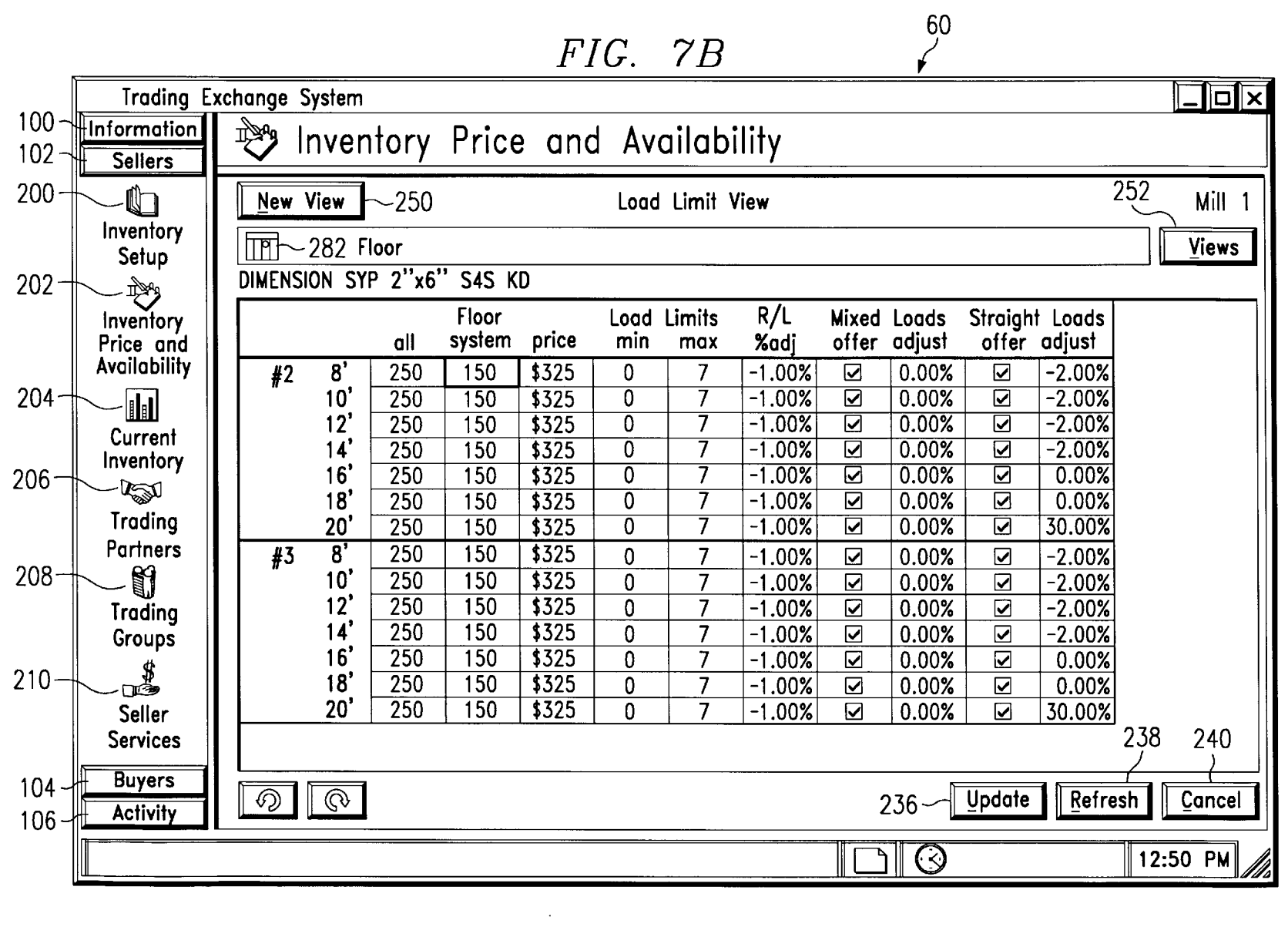

Inventory Price and Availability

New View — 250

282 Floor

DIMENSION SYP 2"x6" S4S KD

Load Limit View

Mill 1 — 252

| | | all | Floor system | price | Load Limits min | Load Limits max | R/L %adj | Mixed Loads offer | Mixed Loads adjust | Straight Loads offer | Straight Loads adjust |
|---|---|---|---|---|---|---|---|---|---|---|---|
| #2 | 8' | 250 | 150 | $325 | 0 | 7 | -1.00% | ☑ | 0.00% | ☑ | -2.00% |
| | 10' | 250 | 150 | $325 | 0 | 7 | -1.00% | ☑ | 0.00% | ☑ | -2.00% |
| | 12' | 250 | 150 | $325 | 0 | 7 | -1.00% | ☑ | 0.00% | ☑ | -2.00% |
| | 14' | 250 | 150 | $325 | 0 | 7 | -1.00% | ☑ | 0.00% | ☑ | -2.00% |
| | 16' | 250 | 150 | $325 | 0 | 7 | -1.00% | ☑ | 0.00% | ☑ | 0.00% |
| | 18' | 250 | 150 | $325 | 0 | 7 | -1.00% | ☑ | 0.00% | ☑ | 0.00% |
| | 20' | 250 | 150 | $325 | 0 | 7 | -1.00% | ☑ | 0.00% | ☑ | 30.00% |
| #3 | 8' | 250 | 150 | $325 | 0 | 7 | -1.00% | ☑ | 0.00% | ☑ | -2.00% |
| | 10' | 250 | 150 | $325 | 0 | 7 | -1.00% | ☑ | 0.00% | ☑ | -2.00% |
| | 12' | 250 | 150 | $325 | 0 | 7 | -1.00% | ☑ | 0.00% | ☑ | -2.00% |
| | 14' | 250 | 150 | $325 | 0 | 7 | -1.00% | ☑ | 0.00% | ☑ | 0.00% |
| | 16' | 250 | 150 | $325 | 0 | 7 | -1.00% | ☑ | 0.00% | ☑ | 0.00% |
| | 18' | 250 | 150 | $325 | 0 | 7 | -1.00% | ☑ | 0.00% | ☑ | 0.00% |
| | 20' | 250 | 150 | $325 | 0 | 7 | -1.00% | ☑ | 0.00% | ☑ | 30.00% |

236 — Update    238 — Refresh    240 — Cancel

Trading Exchange System
- 100 Information
- 102 Sellers
  - 200 Inventory Setup
  - 202 Inventory Price and Availability
  - 204 Current Inventory
  - 206 Trading Partners
  - 208 Trading Groups
  - 210 Seller Services
- 104 Buyers
- 106 Activity

12:50 PM

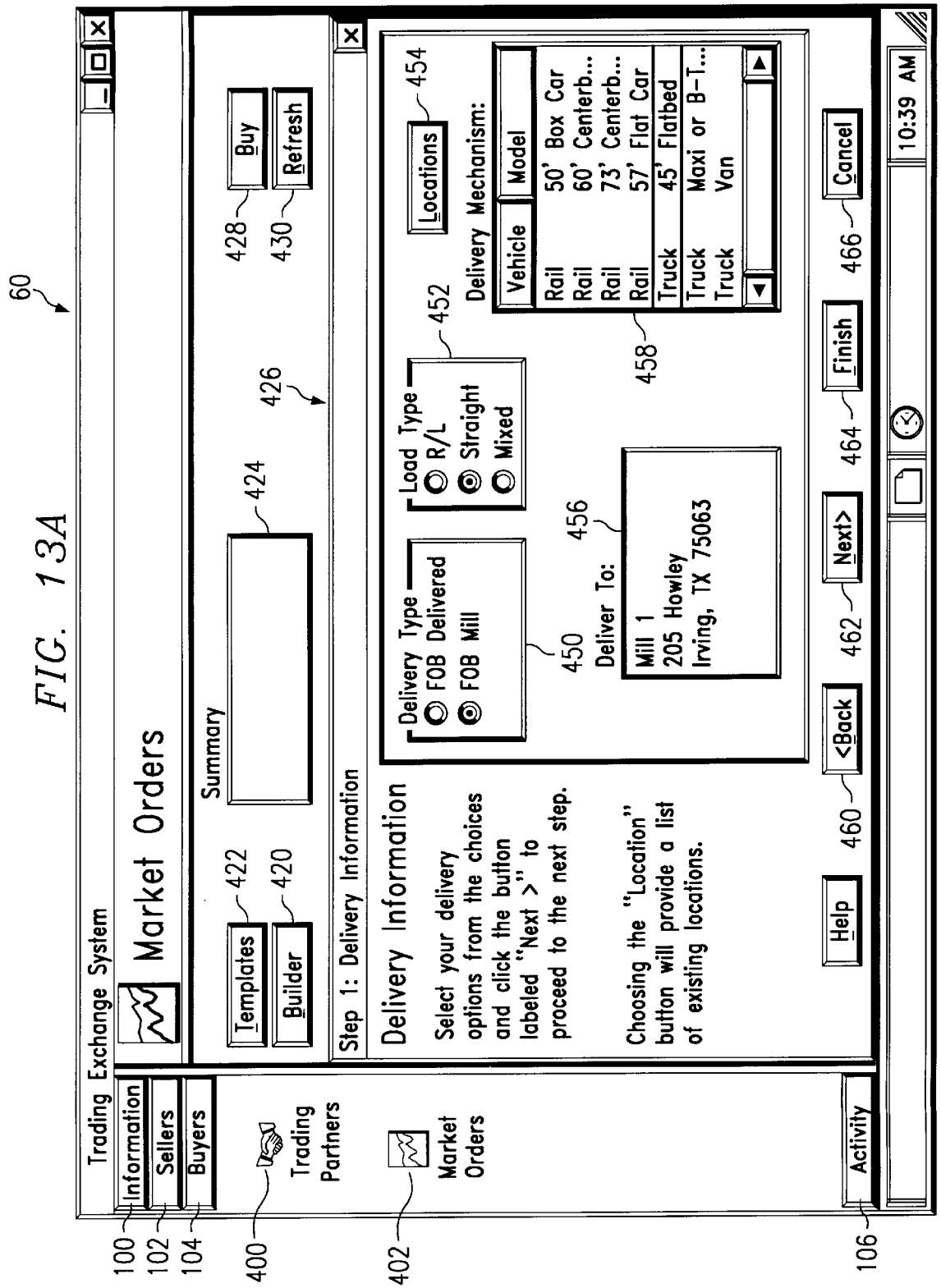

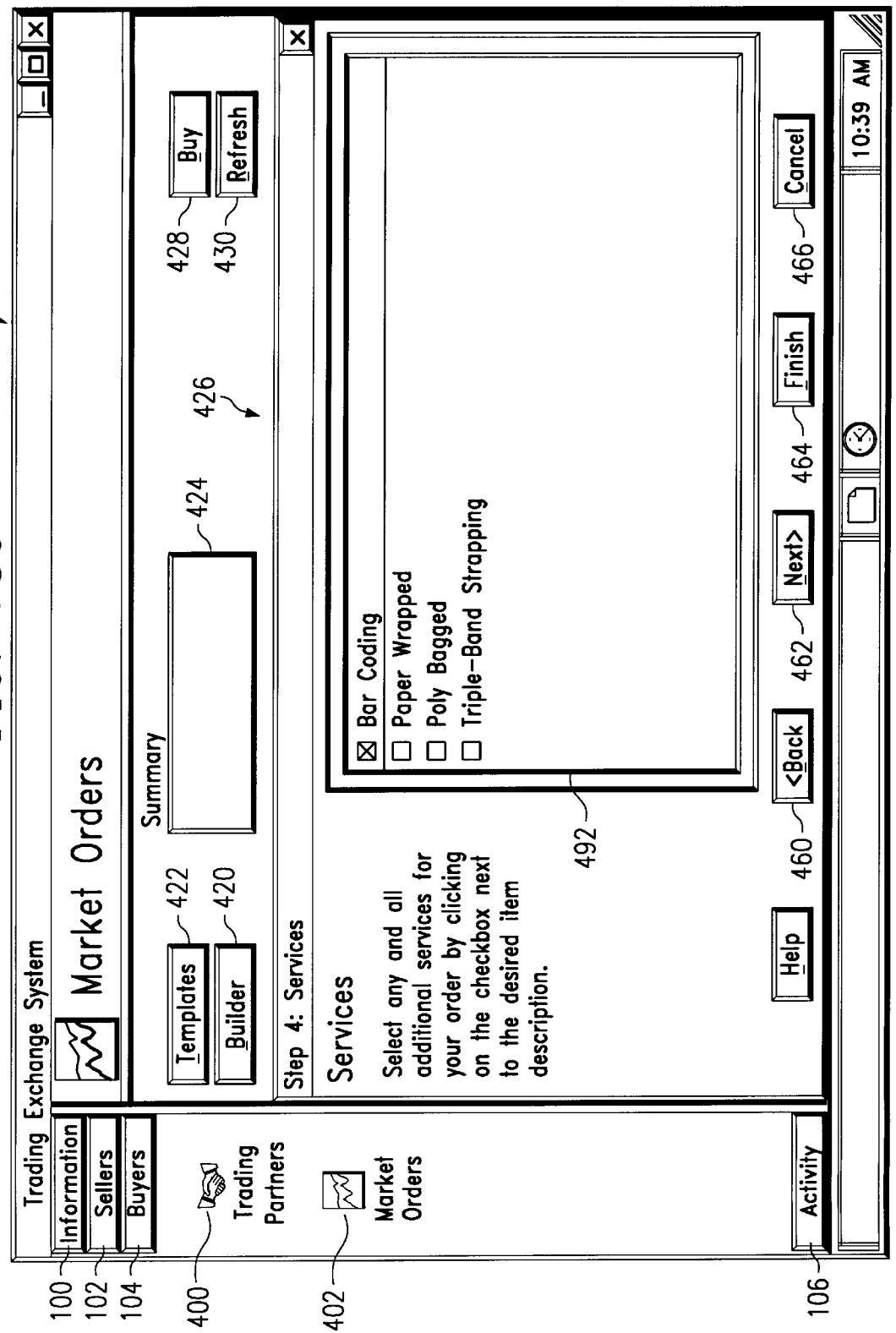

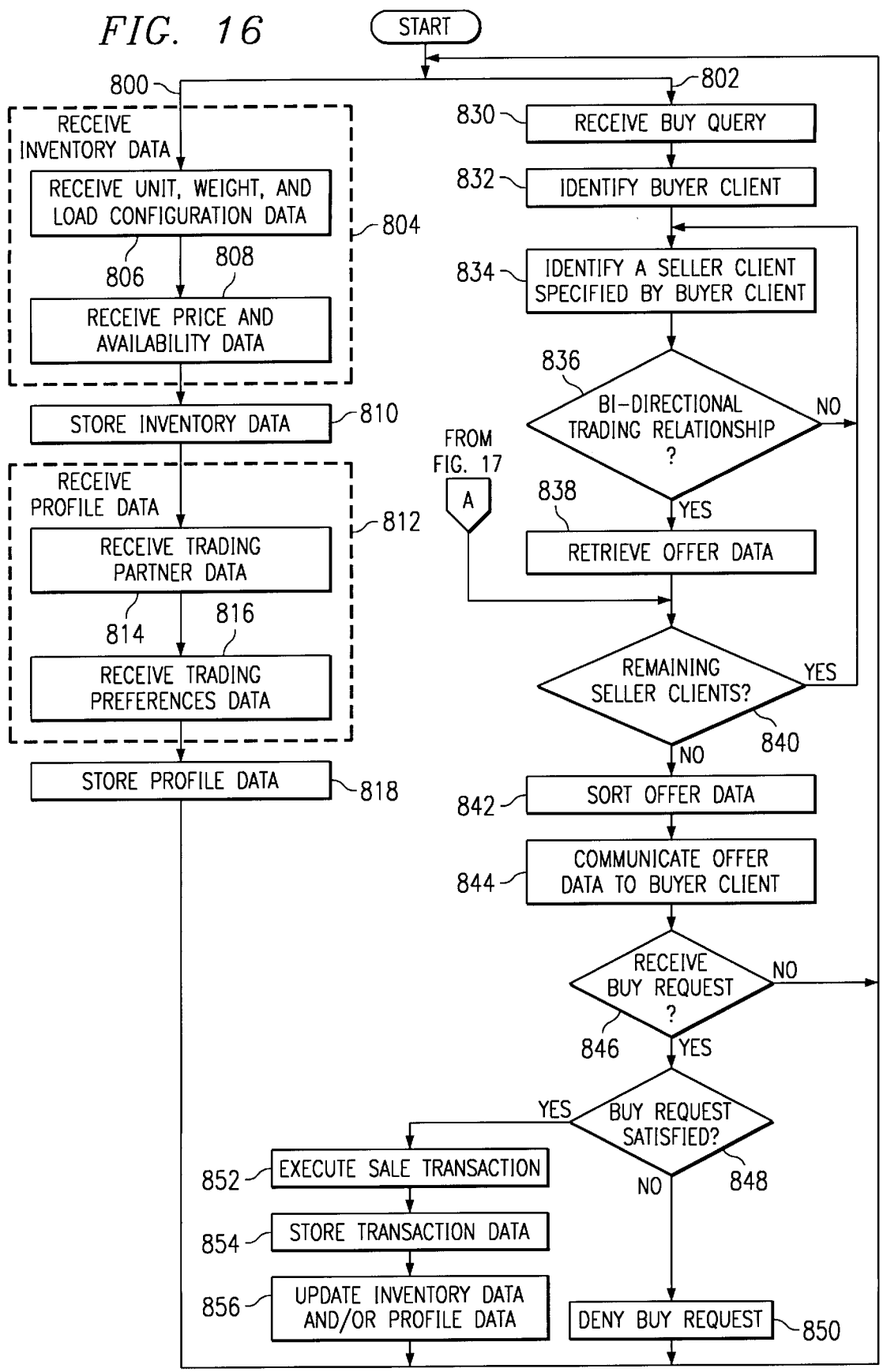

FREIGHT CALCULATION SYSTEM AND METHOD OF OPERATION

CROSS REFERENCE TO RELATED APPLICATIONS

This application is related to pending U.S. patent application Ser. No. 09/153,620, filed on Sep. 15, 1998, by John C. O'Neill et al., and entitled "Trading Exchange System and Method of Operation," and pending U.S. patent application Ser. No. 09/153,714, filed on Sep. 15, 1998, by John C. O'Neill et al., and entitled "Trading Exchange System Having a Market Order Builder and Method of Operation."

TECHNICAL FIELD OF THE INVENTION

This invention relates in general to electronic commerce, and more particularly to a freight calculation system and method of operation.

BACKGROUND OF THE INVENTION

The exchange of products among sellers and buyers is consistently growing in size and complexity, thereby generating a need for buyers and sellers to achieve new levels of efficiency in market research, transaction settlement, freight calculation and delivery, and invoice payment procedures. Often, buyers and sellers have no central resource for market data and are consequently forced to research many disparate resources to execute a market transaction. Furthermore, market transactions that are currently executed between buyers and sellers often do not maximize available market data, resulting in inefficient transaction settlements. Moreover, the transaction costs of executing a market transaction and subsequently collecting payment for the transaction also add inefficiencies to the ultimate transaction settlement. These problems persist in a variety of industries, including the commodity forest products industry.

SUMMARY OF THE INVENTION

In accordance with the present invention, a freight calculation system is provided which substantially eliminates or reduces prior disadvantages and problems.

In accordance with one embodiment of the present invention, a freight calculation system includes a seller client, a buyer client, and a platform coupled to the seller client and the buyer client using a communication network. The seller client generates freight data and communicates the freight data using the communication network. The buyer client communicates a delivery request for a load using the communication network. The delivery request specifies one of a number of delivery containers, an origination location, and a destination location. The platform receives and stores the freight data and determines a delivery cost for the load using the freight data, the specified delivery container, the origination location, and the destination location.

Another embodiment of the present invention is a freight calculation method that includes receiving freight data from a seller client and storing the freight data. The method continues by receiving a delivery request for a load from a buyer client. The delivery request specifies one of a plurality of delivery containers, an origination location, and a destination location. The method continues by determining a delivery cost for the load using the freight data, the specified delivery container, the origination location, and the destination location. The method concludes by communicating the delivery cost for the load to the buyer client.

Technical advantages of the present invention include a trading exchange system that facilitates online trading of products between trading clients, such as buyer clients and seller clients, using a communication network. In one embodiment, the present invention links together the producers and buyers of commodity forest products in a real-time, dynamic, trading exchange system. For example, the trading exchange system facilitates processing market orders between trading clients, as well as processing public and private bids generated by buyer clients and communicated to particular seller clients.

The computer-based trading exchange system provides a significant productivity gain for market discovery and transaction settlement along with electronic processing and payment. The present invention enables efficient market transactions between producers and buyers by providing up to the minute market data, interactive transaction settlements, direct payment and clearing, one-to-one marketing, user preference views of the market, on-line freight calculation, and other unique features and functions. In one embodiment, the trading exchange system encrypts transmissions between trading clients and the trading platform to prohibit the viewing of confidential data by network monitors and other snooping devices.

Further technical advantages of the trading exchange system include a trading platform that maintains and updates current inventory data for seller clients that are members of the trading exchange system. In particular, the seller clients may communicate to the trading platform price and availability levels for inventory, maximum and minimum load limits for particular load configurations, and other inventory information. In one embodiment, a seller client may establish price and availability limits on a week-by-week basis. For example, a seller client may project different price and availability levels for a particular product offered during different weeks. By establishing price and availability levels for a product on a week-by-week basis, a seller client may forecast and account for potential manufacturing and market forces that may affect the price and availability of a product during the interim between the current date and a subsequent week of offering.

The trading platform also maintains profile data established by seller clients for particular buyer clients. In one embodiment, the trading exchange system only supports trading between buyer clients and seller clients that establish bidirectional trading relationships by selecting each other as trading partners. The profile data established by a seller client may identify trading relationships with particular buyer clients. The profile data may also identify credit terms that control the buying capacity of particular trading partners. The profile data may further specify trading preferences established by a seller client for a group of trading clients. For example, a buyer client having a high priority trading relationship with a seller client may be offered special discounts, exclusive exposure to a larger selection of inventory, flexible delivery options, and any other suitable trading preferences. Buyer clients having a low priority trading relationship with a seller client may be subjected to price markups, limited exposure to inventory, and market order restrictions. Therefore, the trading platform provides a central point of access to established inventory data and profile data for buyer clients that are members of the trading exchange system.

Further technical advantages of the present invention include a graphical user interface that provides an easy to use interactive interface to implement the trading exchange application. The graphical user interface supports both buyer and seller activities from a single workstation. The graphical user interface includes a hierarchical arrangement of member groups and subgroups that are used to navigate through the various features and functions of the trading exchange application.

The graphical user interface allows users of the buyer clients to place market orders by querying the inventory data of its established trading partners using, in one embodiment, a graphical market order builder, and by initiating buy requests that specify particular offered products in a load based on the results of the query. The graphical market order builder includes a load balance indicator that graphically illustrates the capacity of a generated load in comparison with the capacity of a selected delivery container. As the user of a buyer client selects additional units of a product to generate a load, the market order builder graphically represents the load in comparison to a maximum load parameter of the delivery container. The user may increase or decrease the number of units in the load to optimize the load capacity of the selected delivery container.

For example, if a delivery container has a specified maximum weight capacity, then the market order builder graphically represents the weight of the chosen load in comparison to the weight capacity of the selected delivery container. Therefore, the graphical market order builder provides visual feedback (e.g., colors, bars, graphs, etc.) regarding the load parameters of a market order in relation to the storage capacity of a particular delivery container. This allows the buyer client to optimize the weight capacity of the delivery container for any given shipment.

Using the market order builder, a user of a buyer client may build a market order that may be used to query multiple trading partners at multiple locations to gather accurate market-wide data. For example, a user may perform comparison shopping by generating a market order having particular delivery, product, and load configuration information and using it to query the inventory data of multiple trading partners at multiple business locations. The query results may be presented to the user as offer data arranged according to price, availability, location, and/or delivery date. After gathering sufficient market information, the user may select a particular trading partner for the buyer client and communicate to the trading platform a buy request for a particular product. The market order may further be saved as a market order template that allows the buyer client to save and reuse a particular market order query multiple times without rebuilding the market order each time. The buyer client may also edit an existing template to gather market data efficiently.

The trading platform processes the buy request and determines whether to deny the buy request or complete a sale transaction based on the inventory data and the profile data established by the seller clients. Upon completing a sale transaction, the platform stores inventory data embodying the terms of the sale transaction. The trading platform may also assign a Transaction Lock Number that associates a Purchase Order Number issued by the buyer client with a Sales Order Number issued by the seller client. Trading clients may perform various order follow-up procedures using the Transaction Lock Number to review and augment information for a particular transaction. For example, a user of a seller client may enter shipping information that tracks the delivery of a load. A user of a buyer client may inquire about the status of an expected delivery and compare an actual delivery with the market order.

Further technical advantages of the present invention include buyer clients and seller clients, generically referred to as trading clients, that may generate freight calculation data to be used by the trading platform to calculate delivery costs for a load. In particular, a trading client generates freight calculation data and communicates it to the trading platform using the communication network. A buyer client communicates to the trading platform a delivery request for a load. The delivery request specifies a delivery container, an origination location for the load, and a destination location for the load. The trading platform determines a delivery cost for the load using a selected one of the freight calculation data generated by the buyer client or the freight calculation data generated by the seller client based on the specified delivery container, origination location, and destination location.

A specific technical advantage of the present invention is that both a buyer client and a seller client may generate freight calculation data. In one embodiment, the freight calculation data of the seller client is used as default freight calculation data to be used by the trading platform to determine delivery costs. In this embodiment, the freight calculation data of the buyer client is used to determine delivery costs where the seller client authorizes and the buyer client chooses to retrieve the load from the origination location and/or to arrange for delivery of the load to the destination location independent of the seller client. Allowing both the buyer client and the seller client to generate freight calculation data to be used by the trading platform to calculate delivery costs facilitates realistic and meaningful negotiations and agreements between buyers and sellers regarding the delivery of a load.

Still further technical advantages of the present invention include an accounting server that facilities electronic funds transfer transactions between the trading clients and a bank using an Automated Clearing House. The accounting server verifies that a shipment of a particular product by a seller client matches a market order for the product placed by a buyer client. If the shipment matches the market order, then the accounting server accesses an account of the buyer client and automatically transfers funds sufficient to cover the cost of the order to an account of the appropriate seller client. Electronic funds transfer transactions between trading clients reduce the effort and paperwork associated with verification of invoices from purchase orders and check processing. In a particular embodiment, the trading exchange system transfers payment information, inventory data, profile data, or any other trading exchange information to the information systems of the appropriate trading clients using electronic data interchange. Transferring information to the information systems of the appropriate trading clients provides cost and time savings in order entry, accounting, and inventory procedures.

BRIEF DESCRIPTION OF THE DRAWINGS

For a more complete understanding of the present invention and its advantages, reference is now made to the following description taken in conjunction with the accompanying drawings, in which like reference numbers indicate like features and wherein:

FIGS. 5A–5F illustrate exemplary displays of a graphical user interface for an Information group having a Site Management subgroup supported by the trading exchange system;

FIGS. 7A–7B illustrate exemplary displays of a graphical user interface for a Sellers group having a Price and Availability Levels subgroup supported by the trading exchange system;

FIGS. 13A–13J illustrate exemplary displays of a graphical user interface for a Buyers group having a Market Orders subgroup supported by the trading exchange system;

FIG. 16 illustrates an exemplary method for trading products using the trading exchange system;

DETAILED DESCRIPTION OF THE INVENTION

Figure 1:
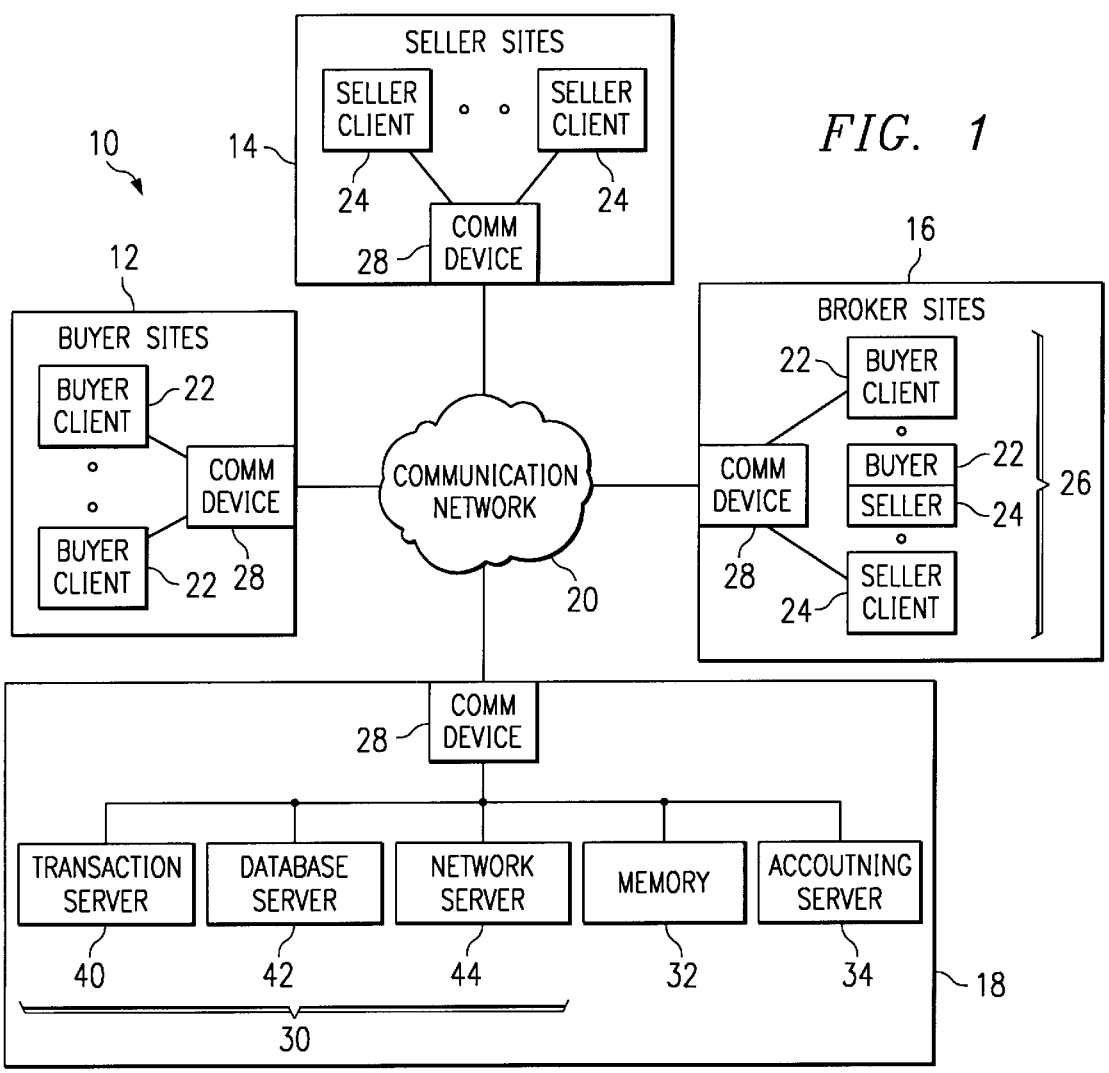
FIG. 1 illustrates a block diagram of a trading exchange system.

FIG. 1 illustrates a trading exchange system 10 that includes buyer sites 12, seller sites 14, and broker sites 16 coupled to a trading platform 18 by a communication network 20. Buyer sites 12 include one or more clients that perform buyer activities using system 10, hereinafter referred to as buyer clients 22. Seller sites 14 include one or more clients that perform seller activities using system 10, hereinafter referred to as seller clients 24. Broker sites 16 include one or more buyer clients 22 and seller clients 24 to perform both buyer and seller activities using system 10. Buyer clients 22 and seller clients 24 may be generically referred to as trading clients 26.

In general, seller clients 24 establish inventory data for a number of products and communicate the inventory data to platform 18 for storage. Seller clients 24 also generate profile data for one or more buyer clients 22 selected as trading partners and communicate the profile data to platform 18 for storage. A buyer client 22 generates a buy query of the stored inventory data and communicates the buy query to platform 18. Platform 18 retrieves offer data based upon the inventory data communicated by the seller clients 24 and the profile data associated with the buyer client 22 in response to the buy query. Platform 18 communicates the offer data to the buyer client 22. The buyer client 22 may communicate to platform 18 a buy request in response to the offer data. Platform 18 receives the buy request and either completes a sale transaction of the buy request or denies the buy request based upon the stored inventory data and the stored profile data.

Buyer sites 12, seller sites 14, and broker sites 16, generically referred to as trading sites, comprise registered members of trading exchange system 10 that trade commodities, goods, or products using system 10. For example, a buyer site 12 comprises one or more buyer clients 22 that perform buyer activities using system 10. A seller site 14 comprises one or more seller clients 24 that perform seller activities using system 10. A broker site 16 comprises one or more buyer clients 22 and seller clients 24 to perform both buyer and seller activities using system 10 depending upon the particular transaction to be executed. Although a single trading client 26 may perform both buyer and seller activities, it should be understood that a trading client 26 may be referred to as a buyer client 22 when it performs buyer activities using system 10, and may be referred to as a seller client 24 when it performs seller activities using system 10. In one embodiment, sites 12, 14, and 16 comprise producers and buyers of commodity forest products. In this example, each site 12, 14, and 16 may support a number of mill sites, warehouses, lumber yards, distribution centers, or other business locations.

Trading clients 26 comprise computers, workstations, or any other suitable processing devices that include the appropriate hardware and software capabilities to perform both buyer and seller activities using system 10. Trading clients 26 couple to network 20 using communication devices 28 and are described in more detail in FIG. 2. Communication devices 28 comprise any combination of hubs, routers, bridges, gateways, firewalls, switches, remote access devices, or any other association of suitable communication devices and related software that facilitate communication between trading clients 26 and platform 18 using network 20.

Trading platform 18 comprises trading servers 30, a memory 32, and an accounting server 34 coupled to network 20 using communication device 28. Trading servers 30 comprise a transaction server 40, a database server 42, and a network server 44. In general, trading servers 30 execute a trading exchange application that facilitates buy and sell transactions between buyer clients 22 and seller clients 24 using network 20. In one embodiment, the trading exchange application embodies a multi-tiered system architecture. Although the following description of trading servers 30 is detailed with reference to servers 40, 42, and 44, it should be understood that servers 30 may individually or collectively execute any portion of the trading exchange application at a single site or at any combination of distributed sites. The first tier of the multi-tiered system architecture provides presentation logic to trading clients 26 of the trading sites and is described in more detail with reference to FIGS. 2–14. In general, the presentation logic supports a graphical user interface that allows a user of trading clients 26 to perform the unique features and functions of the trading exchange application using trading exchange system 10.

Transaction server 40 supports a second tier of the multi-tiered system architecture. The second tier encapsulates business logic using, in one embodiment, an object-oriented environment. For example, the business logic may be organized as business objects using Microsoft's Component Object Model (COM). The business logic may be written in C++, Java, Visual Basic, or any other suitable software language that supports communicating, processing, and storing data in any object-oriented environment. Transaction server 40 makes the business logic available to the presentation logic at trading clients 26 using distributed processing techniques. For example, transaction server 40 may employ Microsoft's Distributed Component Object Model (DCOM), IBM's Distributed System Object Model (DSOM), Object Management Group's Common Object Request Broker Architecture (CORBA), or any other suitable interapplication communication technology to interface the business logic with the presentation logic.

Database server 42 supports a third tier of the multi-tiered system architecture. The third tier provides data storage capabilities to system 10. Database server 42 provides transaction management functionality so that multiple trading clients 26 may access the data stored in memory 32 at the same time without loss of data integrity. In one embodiment, database server 42 comprises a Structured Query Language (SQL) server that implements stored procedures encoded in SQL to provide a data access interface between the business logic and the data stored in memory 32. For example, the stored procedures may process queries received from trading clients 26, retrieve the appropriate data from memory 32, and format the results for presentation at trading clients 26.

Network server 44 provides network services to platform 18 using any of the commonly supported network architectures, including, but not limited to, Systems Network Architecture (SNA), Transmission Control Protocol/Internet Protocol (TCP/IP), or NetWare. For example, network server 44 may support a message handling system that defines how messages are to be encoded for the transmission of e-mail. Server 44 may further support remote log-in services that allow users to access platform 18 from trading clients 26 using network 20. The remote log-in services may include user validation and directory services to allow a user having a particular authorization level to locate particular resources at platform 18.

Memory 32 may comprise a file, a stack, a database, or any other suitable organization of volatile or non-volatile memory. Memory 32 can be random access memory (RAM), read-only memory (ROM), CD-ROM, removable memory devices, or any other suitable device that allows storage or retrieval of data. In one embodiment, memory 32 comprises a SQL server database that stores inventory data and profile data communicated by trading clients 26.

Accounting server 34 facilitates electronic funds transfer (EFT) transactions between trading clients 26 and, optionally, a bank, using an Automated Clearing House (ACH). In general, accounting server 34 provides access to ACH facilities to allow automated payment and credit updates for trading clients 26 using electronic funds transfer (EFT) techniques.

Communication network 20 comprises a global computing network, a virtual private network (VPN), a local area network (LAN), a wide area network (WAN), or any other suitable communication network that facilitates communicating data between trading clients 26 and platform 18.

Communication network 20 may support higher level connectionless protocols such as Internet Protocol (IP), higher level connection-oriented protocols such as Frame Relay, or any other suitable networking protocol. In one embodiment, communication network 20 uses a point-to-point tunneling protocol (PPTP) to communicate data between trading clients 26 and platform 18 using a VPN across a TCP/IP-based data network, such as the Internet. By using PPTP, network 20 maximizes the security of communications between trading clients 26 and platform 18. In particular, PPTP encrypts transmissions between trading clients 26 and platform 18 to prohibit the viewing of confidential data by network monitors and/or other snooping devices.

In operation, trading exchange system 10 executes the trading exchange application to link together buyer clients 22 and seller clients 24 in a real-time computer-based trading environment. Although the following description is detailed with respect to trading commodity forest products using system 10, it should be understood that system 10 may operate to trade any suitable commodity, good, or product. One of ordinary skill in the art can appreciate that the features and functions of system 10 as described below in relation to the commodity forest products industry apply generally to any industry or business. In general, a trading client 26, such as a buyer client 22 and a seller client 24, registers its associated trading site with system 10 as a member. Upon registering its associated trading site as a member with system 10, each trading client 26 establishes a trading relationship with other trading clients 26 by generating profile data embodying the trading relationships. System 10 supports trading between buyer clients 22 and seller clients 24 that establish bi-directional trading relationships by selecting each other as trading partners.

In addition to establishing profile data for its trading partners, each seller client 24 performs other operations such as generating and storing inventory data for products offered for sale using system 10 and, optionally, establishing trading preferences among its trading partners. A seller client 24 may also establish delivery costs using a particular freight calculation method. Each seller client 24 communicates the profile and inventory data to memory 32 of platform 18 for processing and storage. A buyer client 22 also performs other operations in addition to establishing profile data, such as querying inventory data stored at platform 18. Based upon the results of the queries, a buyer client 22 may communicate to platform 18 a buy request for products offered by a particular seller client 24 with whom the buyer client 22 maintains a trading relationship. Platform 18 processes the buy request to either complete a sale transaction of the selected inventory or to deny the buy request based upon the stored profile and inventory data.

In a more detailed description of the operation of system 10, a trading client 26 initially registers its associated trading site with system 10 as a member. Registering as a member with system 10 includes providing information that describes the trading site and identifies an address, a contact person, and any other relevant company information. Membership registration also includes providing location information, such as location addresses, contact information, and delivery information, such as access capabilities and preferences, for different business locations of a particular trading site. Membership registration further includes providing employee information such as employee names, contact information, authorization levels, login IDs, and passwords for authorized users of system 10.

Upon registering its associated trading site with system 10 as a member, or at any subsequent point of operation, a seller client 24 may establish inventory data for commodity forest products offered at each business location operated by that seller client 24. Commodity forest products include a number of hierarchical product characteristics that together define a particular product. In one embodiment, each product is initially defined by a product category that specifies the product as either one type of lumber product or one type of panel product. A lumber product is further defined by any combination of additional product characteristics, including, but not limited to, product species, lumber grade, lumber size, lumber length, edge configuration, and lumber moisture content. A panel product is further defined by any combination of additional product characteristics, including, but not limited to, product species, panel grade, panel size, panel thickness, panel ply count, panel face, and panel exposure rating.

To establish inventory data, a seller client 24 initially specifies whether a particular business location offers a particular commodity forest product. For products that the seller client 24 does offers at a particular business location, the seller client 24 specifies product unit configurations, weight configurations, and load configurations. The unit configuration defines how many pieces of the product constitute one product unit. The weight configuration defines the weight of the product per one thousand board feet.

The load configuration defines in which types of loads a particular forest product may be delivered. For example, the commodity forest products industry and system 10 support the delivery of a product in a number of load types using a variety of delivery containers, such as, railcars, truck trailers, barges, airplanes, modular containers or any other suitable delivery container. Load types supported by the commodity forest products industry include a straight load, a mixed load, a random length load, or any other suitable load type. A straight load comprises a delivery container filled with one particular product having all of the same product characteristics. A mixed load comprises a delivery container filled with at least two products having different product characteristics. A random length load is a subset of a mixed load and comprises a delivery container filled with a lumber product having each of the same product characteristics except for lumber length.

A seller client 24 establishes load configurations that specify in what type of load a particular product may be delivered. For example, a seller client 24 whose associated trading site is experiencing a short supply of a particular forest product at a particular business location may establish load configurations for that business location that prevent the sale of the particular forest product in a straight load, or any other load type. Furthermore, the load configurations may specify a percentage increase or decrease in the base price of a product that is sold in a particular load type. For example, a seller client 24 may specify a percentage increase in the price of a product that is sold in a straight load, where the product is in short supply at a particular business location. Moreover, for each load type, the load configurations may specify minimum and maximum load limits for the number of units of a particular product that is offered per delivery container. For example, a seller client 24 may require that a random length load type include minimum quantities of a particular product whose lumber length is in low demand and may dictate that the random length load type not include more than a maximum number of units of a product whose lumber length is in high demand. In this way, a seller client 24 may establish inventory data having specific load configurations that account for manufacturing and/or market forces at each business location.

Upon specifying the product unit configuration, the weight configuration, and the load configuration for particular products, a seller client 24 then establishes price and availability levels for each particular product sold at a particular business location. In one embodiment, a seller client 24 may establish price and availability levels on a week-by-week basis. For example, a seller client 24 may project different price and availability levels for a particular product offered during different weeks at each business location. For each week of offering, a seller client 24 specifies the number of units available for a particular product as well as the base price for a unit of that product. Therefore, the current price and availability levels of a particular product offered during the week of Aug. 17, 1998 may be different from the current price and availability levels of the same product offered during the week of Aug. 24, 1998. By establishing price and availability levels for a product on a week-by-week basis, a seller client 24 may forecast and account for potential manufacturing and/or market forces that may affect the price and availability of a product during the interim between the current date and a subsequent week of offering. In a particular embodiment, the seller client 24 may also specify minimum and maximum load limits for products offered in a particular load type on a week-by-week basis. If a buyer client 22 communicates a query for a product to be delivered during a specified week of offering, then platform 18 retrieves the offer data using the price and availability levels from the specified week of offering based on a delivery date specified in the query.

In addition to generating inventory data, each seller client 24 also generates profile data for particular trading clients 26 by establishing or dissolving trading relationships. To establish a trading relationship, a seller client 24 specifies as a trading partner particular trading clients 26 associated with trading sites that are registered members of system 10. In particular, a seller client 24 identifies the entire set of trading clients 26 whose associated trading sites are registered members of system 10 and specifies a subset of those trading clients 26 as trading partners. By establishing a particular trading client 26 as a trading partner, a seller client 24 authorizes that trading client 26 to purchase products from the seller client 24 using system 10. Alternatively, a seller client 24 may dissolve a trading relationship by removing a particular trading client 26 as a trading partner. A removed trading client 26 no longer has authorization to purchase products from the particular seller client 24 using system 10. For each buyer client 22 with whom a seller client 24 establishes a trading relationship, the seller client 24 specifies particular attributes. For example, a seller client 24 may establish credit terms, such as credit and commitment limits, to control the buying capacity of a particular buyer client 22. Credit limits define the amount of a product that a seller client 24 has actually shipped to a buyer client 22 for which the buyer client 22 has not yet paid. Commitment limits define the amount of a product sold by a seller client 24 to a buyer client 22 regardless of whether the product has been shipped. In one embodiment, if a buyer client 22 initiates a buy transaction that exceeds the credit limit and/or the commitment limit designated for that buyer client 22 by the seller client 24, then system 10 may deny the buy request or complete the sale transaction but notify the seller client 24 of the exceeded limits.

Seller clients 24 may also establish trading preferences, such as price and inventory preferences, for particular trading clients 26 that are established trading partners. For example, a buyer client 22 having a high priority trading relationship with a seller client 24 may be offered special discounts, exclusive exposure to a larger selection of inventory, little or no load limits for products ordered in particular load configurations, flexible delivery options, and any other suitable trading preference. Buyer clients 22 having a low priority trading relationship with a seller client 24 may be subjected to price markups, limited exposure to inventory, and any other market order restrictions. The profile data established for a particular buyer client 22 by a seller client 24 includes any established trading preferences.

Trading clients 26 may generate freight calculation data to be used by platform 18 to calculate delivery costs for a load. In particular, a trading client 26 generates freight calculation data and communicates it to platform 18 using communication network 20. A buyer client 22 communicates to platform 18 a delivery request for a load. The delivery request specifies a delivery container, an origination location for the load, and a destination location for the load. Platform 18 determines a delivery cost for the load using a selected one of the freight calculation data generated by the buyer client 22 or the freight calculation data generated by the seller client 24 based on the specified delivery container, origination location, and destination location.

Both a buyer client 22 and a seller client 24 may generate freight calculation data. In one embodiment, the freight calculation data of the seller client 24 is used by platform 18 as default freight calculation data to determine delivery costs. In this embodiment, the freight calculation data of the buyer client 22 is used only where the seller client 24 allows the buyer client 22 to choose which freight calculation data to be used by platform 18 to determine delivery costs and the buyer client 22 chooses its own freight calculation data.

Each buyer client 22 also establishes or dissolves trading relationships with other trading clients 26. To establish a trading relationship, a buyer client 22 specifies as a trading partner particular trading clients 26 whose associated trading sites are registered members of system 10. By establishing trading relationships with other trading clients 26, a buyer client 22 identifies a subset of all members of system 10 from whom the buyer client 22 would like to purchase products using system 10. Typically, buyer clients 22 select seller clients 24 as trading partners based upon prior experience, preferred pricing, quality considerations, and other market factors.

In one embodiment, a buyer client 22 may only purchase products from a particular seller client 24 using system 10 if both the buyer client 22 and the seller client 24 have specified each other as trading partners. In this embodiment, if a buyer client 22 specifies a particular seller client 24 as a trading partner, but that seller client 24 does not specify the buyer client 22 as a trading partner, then the buyer client 22 cannot query or view inventory data associated with that seller client 24 using system 10. A buyer client 22 may also dissolve a trading relationship by removing a particular trading client 26 as a trading partner. The buyer client 22 will no longer be able to view the inventory data of or purchase products from the removed trading client 26 using system 10.

A user of buyer client 22 may place a market order for particular forest products by querying the inventory data established by its trading partners using, in one embodiment, a graphical market order builder, and by initiating a buy request that specifies particular forest products based on the results of the query. The market order builder allows a user of buyer client 22 to build a market order template that is used to query the stored inventory data of seller clients 24 that are trading partners. The query specifies delivery information, product information, load configuration information, and seller services information to form the query.

A user of buyer client 22 specifies the delivery information by choosing a delivery container, a delivery address, a freight calculation method, and any other suitable delivery option. A user of buyer client 22 specifies the product information by choosing a particular product category, such as a lumber product or a panel product. For the chosen product category, the user specifies different product characteristics associated with that product category. In one embodiment, the product characteristics are arranged and chosen in a hierarchical format. Next, the user of buyer client 22 specifies a particular load configuration. As described above, the user may select a straight load, a mixed load, a random length load, or any other suitable load configuration. For the selected load type, the user specifies a number of units requested for each selected product to generate the load. The graphical market order builder processes the load configuration information and, in one embodiment, displays a graphical representation of the load arranged in the selected delivery container.

For example, as the user of buyer client 22 selects additional units of the selected product, the market order builder graphically represents the load in comparison to a maximum load parameter of the delivery container. In particular, if a delivery container has a specific weight capacity, then the market order builder graphically represents the weight of the load in comparison to the weight capacity of the selected delivery container. This allows buyer client 22 to maximize the capacity of the delivery container for any given shipment. Other load parameters used by the market order builder may include a maximum volume of the delivery container, the maximum board-feet capacity of the delivery container, the maximum linear-feet capacity of the delivery container, or any other suitable load parameter. In another embodiment, the market order builder displays a graphical representation of the load in the hull of a ship, a truck trailer, a railcar, or any other suitable delivery container that is selected by the user of buyer client 22. Therefore, the graphical market order builder provides visual feedback regarding the load parameters of a market order in relation to the storage capacity of a selected delivery container.

Using the market order builder, a user of buyer client 22 may build a market order that may be used to query the stored inventory data of its trading partners at multiple business locations to gather accurate market-wide data. The market order may further be saved as a market order template that allows the user to save and reuse a particular market order query multiple times without rebuilding the query each time. Moreover, a user of buyer client 22 may edit an existing template to gather market data efficiently.

The buyer client 22 may communicate to platform 18 a market order query that specifies the delivery information, product information, and load configuration information selected by the user of buyer client 22. In response, platform 18 searches the stored inventory data of each of the trading partners of the buyer client 22 and retrieves offer data that is based upon the profile data and the inventory data stored by seller clients 24 that maintain a trading relationship with the buyer client 22.

In particular, platform 18 retrieves the price and availability levels of the selected product based upon the delivery date of the load. Platform 18 may then adjust the price and/or the inventory exposure of the inventory data based upon the load configuration of the order and/or any trading preferences established by the selected seller client 24 for the buyer client 22. If seller client 24 does not expose inventory sufficient to satisfy the order, platform 18 may optionally prohibit buyer client 22 from viewing any inventory data of the particular seller client 24. Platform 18 may determine whether the order exceeds any minimum or maximum load limits established by the seller client 24. If the order exceeds a load limit, platform 18 may optionally adjust the order to satisfy the load limit or may again prohibit buyer client 22 from viewing any inventory data of the particular seller client 24. Platform 18 then calculates a price for the order, including in one embodiment the delivery costs, and determines whether the market order would cause the buyer client 22 to exceed any credit terms established by the seller client 24. If buyer client 22 exceeds a credit term, such as a credit limit and/or a commitment limit, platform 18 again may prohibit buyer client 22 from viewing any inventory data of the particular seller client 24. Platform 18 then stores the offer data embodying the various price and availability adjustments described above.

Platform 18 communicates the offer data to buyer client 22 arranged, in one embodiment, by seller clients 24 according to price, availability, location, delivery date, and/or any other sort parameter. Therefore, a user of buyer client 22 may perform comparison shopping by generating a market order and using it to query the stored inventory data of multiple business locations for associated trading partners. After gathering sufficient market data, the user of buyer client 22 selects a load offered at a particular business location by a particular trading partner and buyer client 22 communicates a buy request to platform 18 to place a market order for the load. In particular, the buy request specifies a number of units of a particular product offered by a selected seller client 24 at a particular business location. The buy request may further specify delivery information, such as a delivery date and a delivery container; load configuration information, such as whether the product is to be delivered in a straight load, a mixed load, or a random length load; and particular seller services offered by the selected seller client 24. In one embodiment, the buy request includes a delivery request that specifies delivery information, such as a delivery date, a delivery container, an origination location for the load, and a destination location for the load.

Upon receiving the buy request, platform 18 verifies the buy request to determine whether to complete a sale transaction or to deny the buy request. For example, platform 18 may determine whether the selected seller client 24 has identified the buyer client 22 as a trading partner. If not, platform 18 may deny the buy request. Platform 18 further verifies the buy request based upon the profile data and the inventory data of the selected seller client 24. In particular, platform 18 may perform one or more of the same processes it executed to retrieve the offer data in response to the buy query communicated by buyer client 22. For example, platform 18 may further determine whether the specified business location of the selected seller client 24 can satisfy the buy request issued by the buyer client 22 based upon the price and availability of the selected product, the price and/or inventory exposure adjustments for the product, the minimum and maximum load limits established by the seller client 24, and the credit terms established by the seller client 24. If platform 18 determines that the selected seller client 24 has identified the buyer client 22 as a trading partner and that the buy request can be satisfied by the selected business location of the seller client 24, then platform 18 executes a sale transaction.

As a part of executing the sale transaction, platform 18 may assign to the sale transaction a Transaction Lock Number (TLN) that associates a Purchase Order Number issued by the buyer client 22 with a Sales Order Number issued by the seller client 24. Platform 18 stores transaction data embodying the terms of the sale transaction including, but not limited to, a date and time stamp of the transaction, information about seller client 24, delivery information, payment terms and payment method, and the agreed upon terms included in the buy request. Furthermore, platform 18 updates the stored inventory data for the seller client 24 to reflect the effect of the sale transaction. If platform 18 denies the buy request, then it notifies the buyer client 22 accordingly. For example, platform 18 may notify the buyer client 22 that the buy request was denied due to insufficient credit and/or commitment limits, insufficient product availability, or any other reason explaining why the buy request was denied.

System 10 also supports sale transactions initiated by public and private bids issued by trading clients 26. In one embodiment, a buyer client 22 may generate a public bid that specifies a number of products in a particular load configuration. Buyer client 22 broadcasts the public bid to seller clients 24 using system 10. Platform 18 executes a sale transaction between buyer client 22 and the first seller client 24 that accepts the public bid and its particular terms. If the public bid is not accepted for a pre-determined amount of time established by buyer client 22 (e.g., one hour, one day, one week, one month, etc.), then the public bid is withdrawn.

In a particular embodiment, a number of seller clients 24 may issue to a buyer client 22 counteroffers that vary the terms of the original public bid. If the buyer client 22 accepts the counteroffer, then the original public bid is withdrawn and platform 18 executes a sale transaction embodying the counteroffer. If the original public bid is accepted by a seller client 24 before the buyer client 22 accepts the counteroffer, then platform 18 executes a sale transaction embodying the original public bid and the counteroffer is withdrawn.

In another embodiment, a buyer client 22 may issue a private bid to a particular business location support by a particular seller client 24. The selected seller client 24 may accept or decline the private bid or issue a counteroffer to buyer client 22. Each trading client 26 may continue to make counteroffers to other trading clients 26 until all counteroffers are withdrawn or an agreement is reached, at which point platform 18 executes a sale transaction embodying the agreement.

Users of trading clients 26 may perform various order follow-up procedures using system 10 to review sale transactions and augment information for particular transactions. For example, a user of seller client 24 may enter shipping information after delivery of a load has occurred. If the shipped load does not match the agreed upon transaction terms, platform 18 may initiate an order reconciliation process that allows buyer client 22 and seller client 24 to arrive at a resolution, such as a price adjustment, quantity adjustment, or some other suitable solution. In another example, a user of either a buyer client 22 or a seller client 24 may initiate a transaction cancellation request. In one embodiment, platform 18 may cancel an agreed upon transaction only if a user of both the buyer client 22 and the seller client 24 approve of the cancellation. Transactions that are canceled automatically relieve the appropriate credit and commitment limits of the buyer client 22.

In one embodiment, accounting server 34 facilitates electronic funds transfer (EFT) transactions between trading clients 26 and, optionally, a bank, using an Automated Clearing House (ACH). In particular, accounting server 34 verifies that a shipment of a particular product by a seller client 24 matches a market order for the product placed by a buyer client 22. If it does, then server 34 accesses an account of buyer client 22 and transfers funds sufficient to cover the cost of the order to an account of the appropriate seller client 24. In one embodiment, the buyer client 22 authorizes the transfer of funds upon confirming the receipt of a shipment of products that match the order. Electronic funds transfer transactions between trading clients 26 reduce the effort and paperwork associated with verification of invoices from purchase orders and with check processing. In a particular embodiment, trading servers 30 and/or accounting server 34 transfer ACH payment information, inventory data, profile data, or any other trading exchange information to the information systems of the appropriate trading sites using electronic data interchange (EDI). Transferring information to the information systems of appropriate trading sites provides cost and time savings in order entry, accounting, and inventory procedures.

Figure 2:
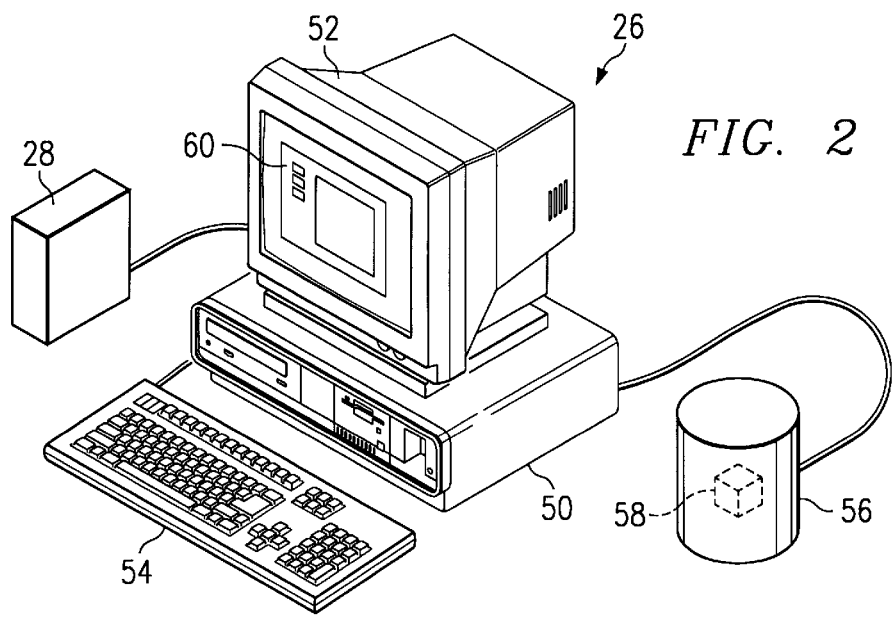
FIG. 2 illustrates one embodiment of a trading client of the system.

FIG. 2 illustrates one embodiment of a trading client 26 that facilitates communicating over network 20 on behalf of its associated trading site. A trading client 26 includes a processor 50 coupled to one or more output devices 52, such as a display, and one or more input devices 54, such as a keyboard or mouse. A trading client 26 also includes a memory 56 (e.g. RAM, ROM, CD-ROM, magnetic) that stores information as files, stacks, databases or any other suitable organization in volatile or non-volatile storage. In one embodiment, memory 56 stores presentation logic 58 of the trading exchange application executed by system 10. A trading client 26 couples to communication device 28 to communicate with platform 18 using network 20.

Processor 50 comprises a central processing unit associated with an operating system that executes presentation logic 58 of the trading exchange application. Processor 50 includes the network hardware, software, and communication protocols to support communication device 28, allowing the trading exchange application to establish communications between trading client 26 and platform 18 using network 20. Presentation logic 58 of the trading exchange application supports a graphical user interface 60 presented to the user of trading client 26 using display 52. In general, graphical user interface (GUI) 60 facilitates communicating data between trading clients 26 and platform 18 using network 20. Graphical user interface 60 supports both buyer and seller activities at a single trading client 26. In particular, one of ordinary skill in the art can appreciate that a trading client 26 may be referred to as a buyer client 22 when it performs buyer activities using GUI 60, and as a seller client 24 when it performs seller activities using GUI 60, but GUI 60 supports both buyer and seller activities at a single trading client 26. GUI 60 is described in more detail with reference to FIGS. 3, 4, 5A, 5B, 5C, 5E, 5F, 6, 7A, 8–12, 13A, 13B, 13C, 13D, 13E, 13F, 13F, 13G, 13H, 13I, 13J, & 14.

Figure 3:
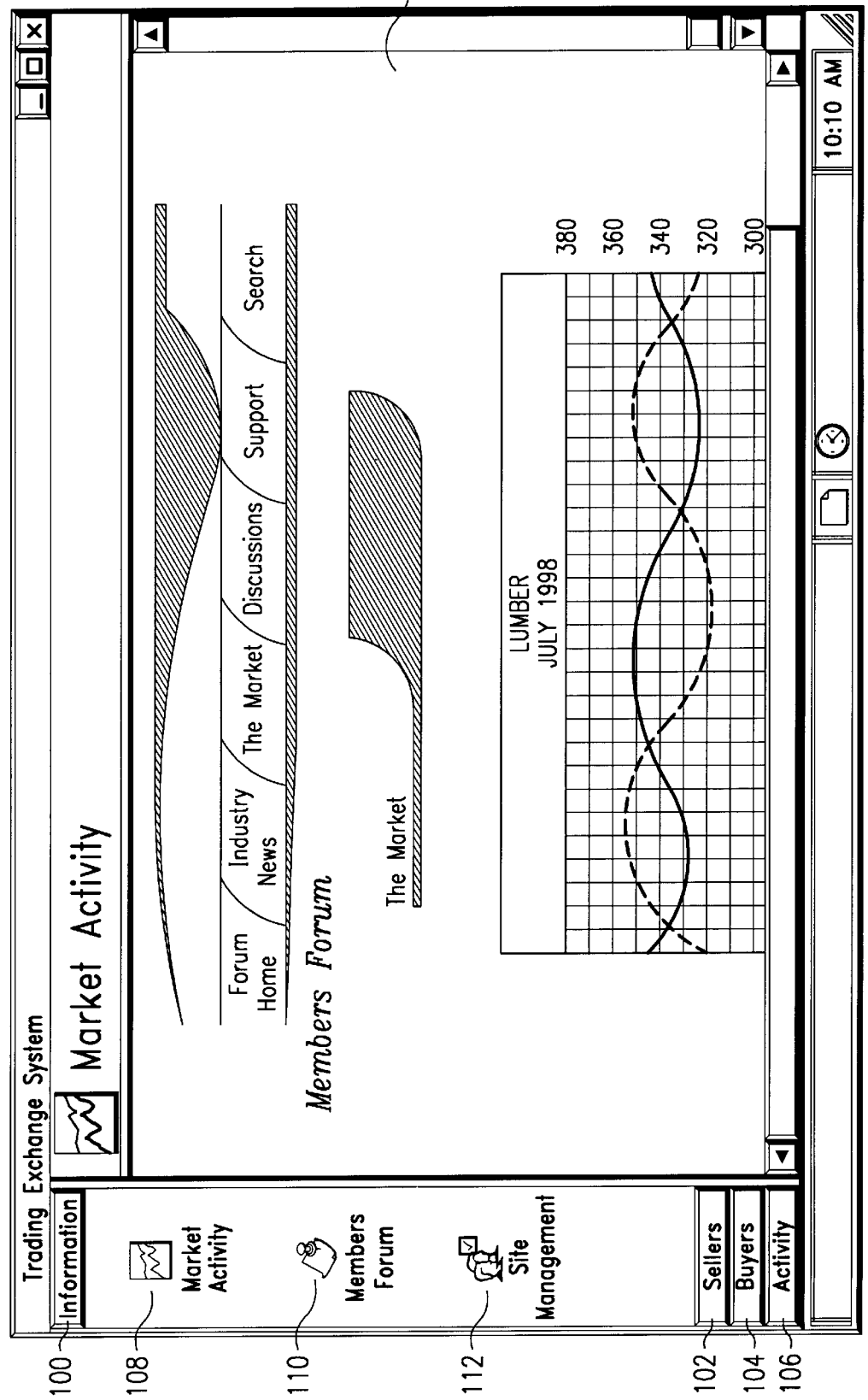
FIG. 3 illustrates an exemplary display of a graphical user interface for an Information group having a Market Activity subgroup supported by the trading exchange system.

FIG. 3 illustrates one embodiment of GUI 60 that provides an easy-to-use interactive interface for a user of a trading client 26 to implement the trading exchange application. GUI 60 includes a hierarchial arrangement of member groups and subgroups that are used to navigate through the various features and functions of the trading exchange application. In particular, GUI 60 includes Information group 100, Sellers group 102, Buyers group 104, and Activity group 106. A user of a trading client 26 may select a particular member group 100–106 to reveal the subgroups associated with the selected group. For example, if a user selects Information group 100, the trading exchange application presents subgroups to the user, including Market Activity subgroup 108, Members Forum subgroup 110 and Site Management subgroup 112. Each subgroup of a member group further comprises an arrangement of user interface screens. For example, FIG. 3 illustrates a user interface screen associated with Market Activity subgroup 108 of Information group 100. The user interface screens will be collectively referred to using the name of the associated subgroup. Market Activity subgroup 108 describes the current market activity in the commodity forest products industry. Any member of system 10 may access Market Activity subgroup 108 using a valid log-in ID and password.

Figure 4:
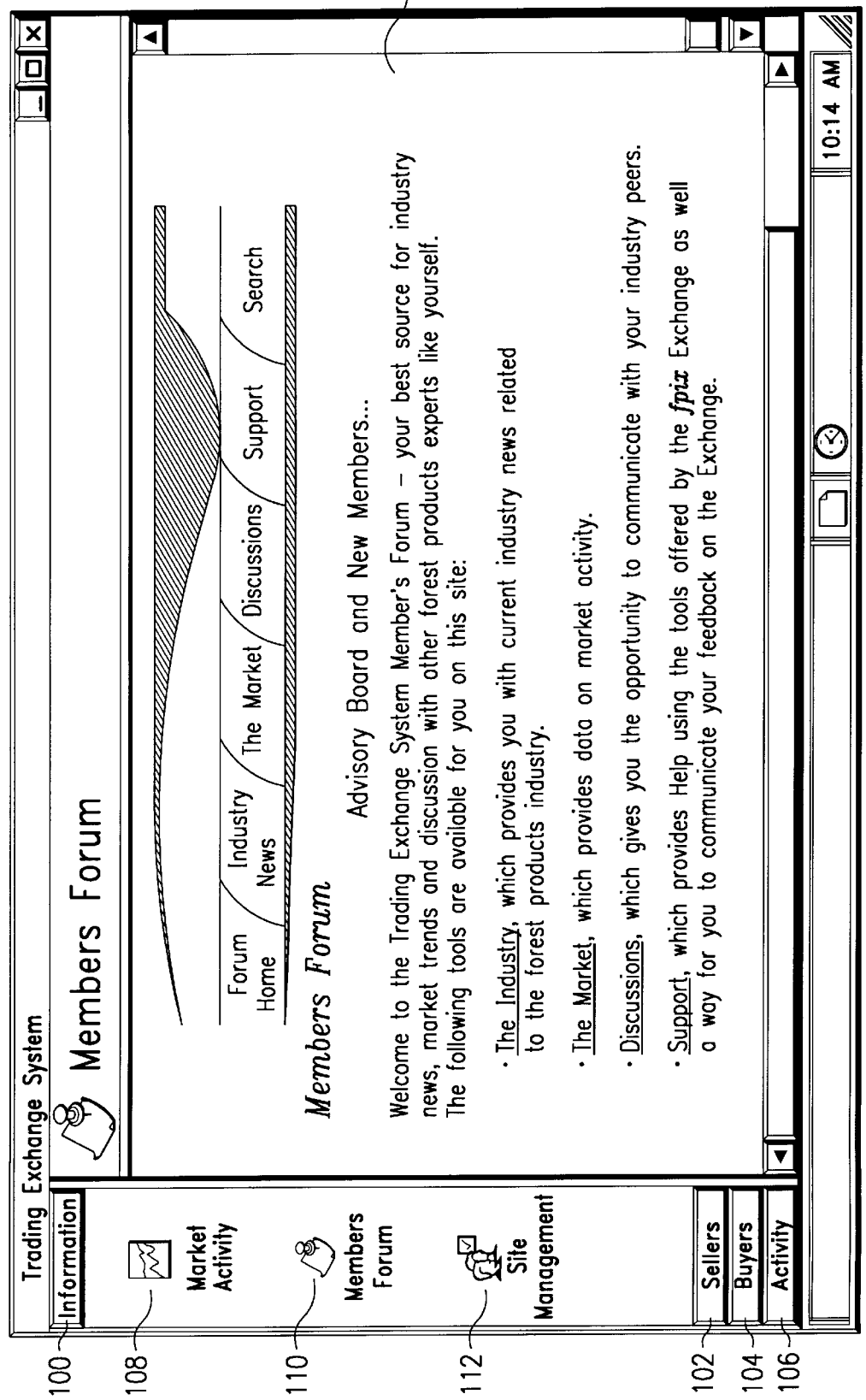
FIG. 4 illustrates an exemplary display of a graphical user interface for the Information group having a Members Forum subgroup supported by the trading exchange system.

FIG. 4 illustrates Members Forum subgroup 110 of Information group 100. Members of system 10 may access Members Forum subgroup 110 to locate industry news related to the commodity forest products industry; to access market trends and data on market activity; to establish discussion sessions with industry peers; and to access support services, such as help tools.

FIG. 5A illustrates Site Management subgroup 112 of Information group 100. Site Management subgroup 112 maintains three user interface screens indicated by Company tab 120, Locations tab 122, and Employees tab 124. In general, a user of both a buyer client 22 and a seller client 24 may enter Site Management subgroup 112 to enter company information, location information, and employee information. The user interface screen indicated by Company tab 120 includes Address Information fields 126, Contact Information fields 128, Client Category field 130, and Overview field 132. A user of trading client 26 enters address information for its associated trading site in Address Information fields 126. Address Information fields 126 further include a Trading Status field 134 that indicates whether trading client 26 currently maintains an active trading status on system 10. Trading Status field 134 allows a user of a particular trading client 26 to change quickly the trading status of the trading client 26 on system 10 in response to market forces. For example, a user of a seller client 24 that realizes its inventory is in short supply due to a sudden manufacturing problem may inactivate the trading status of trading client 26 on system 10 for a period of time to reevaluate its price and availability levels for its current inventory. During the time that the trading status of seller client 24 is inactive, a buyer client 22 may not access the inventory data of the seller client 24. Upon addressing the manufacturing problem, or after a suitable period of time, a user of the seller client 24 may reactivate the trading status of the seller client 24 on system 10 by activating Trading Status field 134. Subsequently, a buyer client 22 may access the inventory data of the active seller client 24.

A user of trading client 26 enters contact information for its associated trading site in fields 128. For example, a user of trading client 26 may enter a phone number, a fax number, an e-mail address, a website address, or any other suitable contact information to facilitate communicating with other trading clients 26. A user may represent a particular trading client 26 to other trading clients 26 as a member of a particular client category using Client Category field 130. For example, trading client 26 may be represented as a producer, remanufacturer, retailer, treater, trust manufacturer, wholesale distributer, or any other type of trading client 26 supported by system 10. Although a trading client 26 may be represented in a particular client category, it should be understood that any trading client 26 may buy and/or sell products using system 10 regardless of the category in which it is represented. In addition to identifying a client category, trading client 26 may be described to other members of system 10 using Overview field 132. Upon adding or changing information in fields 126–134, a user of trading client 26 activates an Update button 136 to communicate the site management information to platform 18 for storage. A user of trading client 26 may activate a Cancel button 138 to restore all information in fields 126–134 to the state it was in prior to the last activation of Update button 136.

Figure 5B:
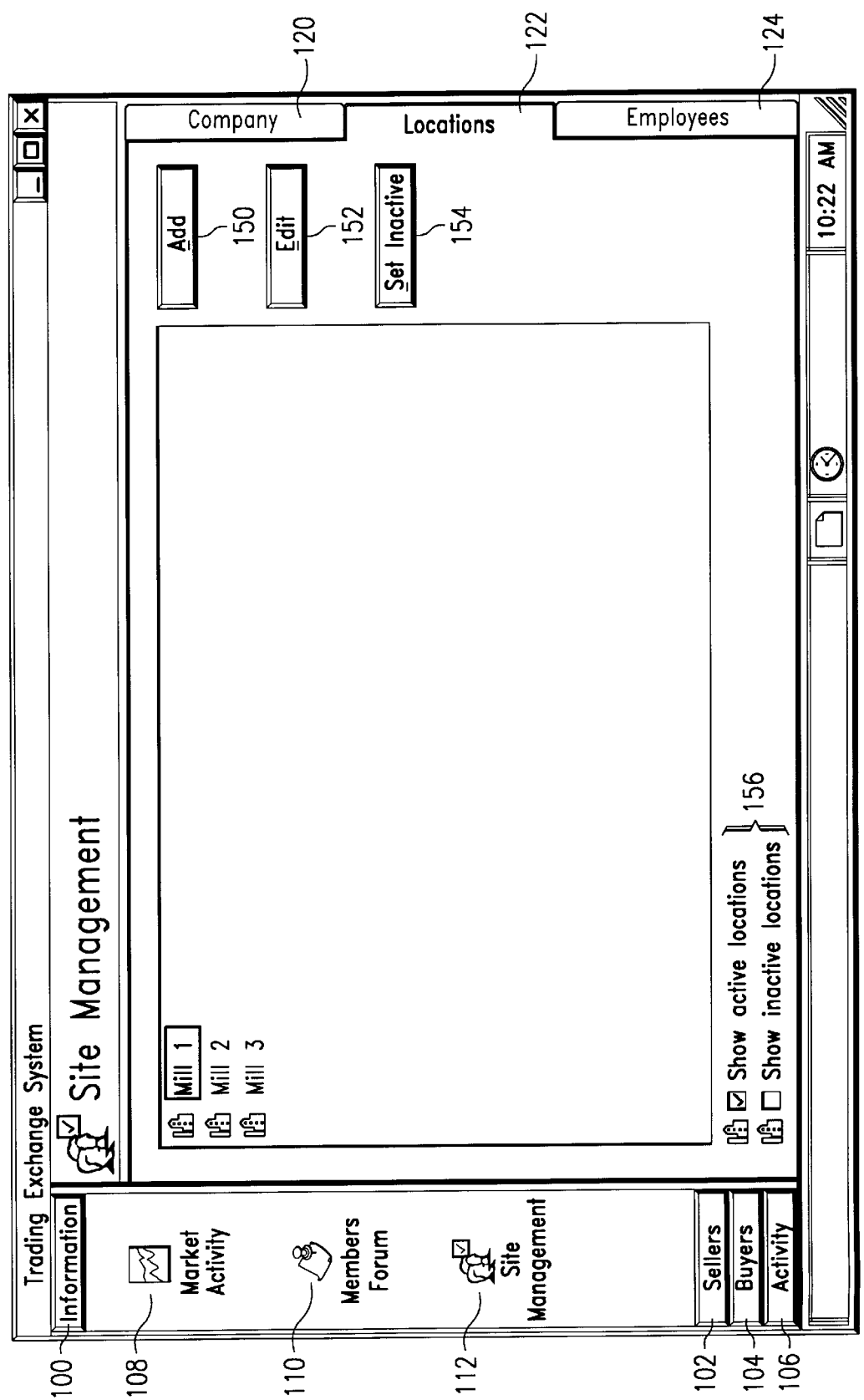

FIG. 5B illustrates a user interface screen associated with Location tab 122. Here, a user of trading client 26 may add, edit, or inactivate a particular business location. As discussed above, a trading client 26 may support multiple mill sites, distribution centers, delivery locations, or any other type of business location. A user of trading client 26 may add a new business location, edit information for an existing business location, or inactivate an existing business location by activating Add button 150, Edit button 152, and Set Inactive button 154, respectively.

Add button 150 allows a user of trading client 26 to add a new business location, as described in more detail with reference to FIGS. 5C through 5E. Edit button 152 allows a user of trading client 26 to edit existing location information stored at platform 18. Set Inactive button 154 allows a user of trading client 26 to change the trading status of a particular location on system 10. If the trading status of a particular business location is inactive, then buyer clients 22 may not access the inventory data for that particular business location. Buyer clients 22 may, however, access inventory data of other business locations of a particular seller client 24 if they maintain an active trading status with system 10. Fields 156 allow a user of trading client 26 to filter the list of all business locations to view active locations, inactive locations, or both.

Figure 5C:
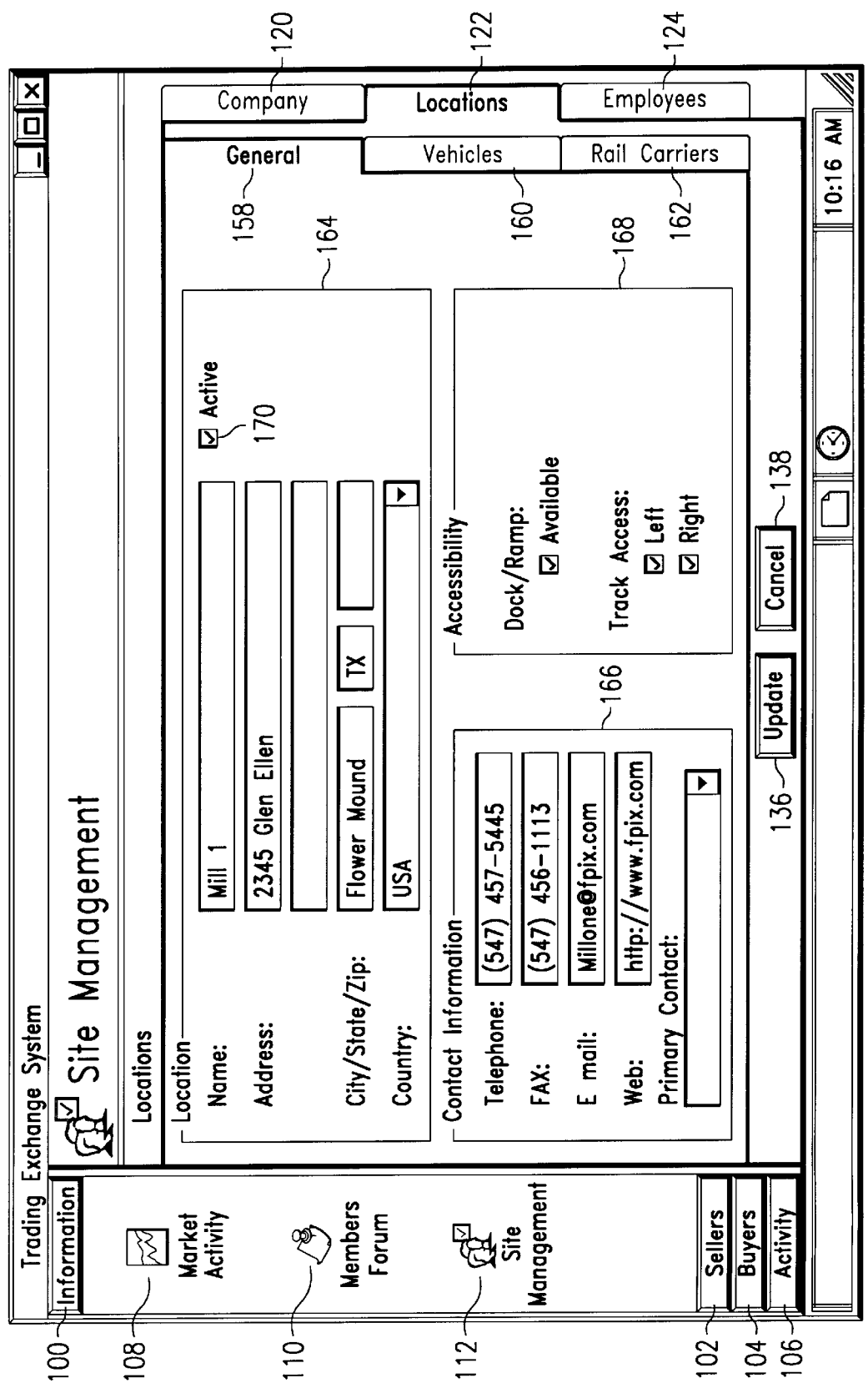
Figure 5D:
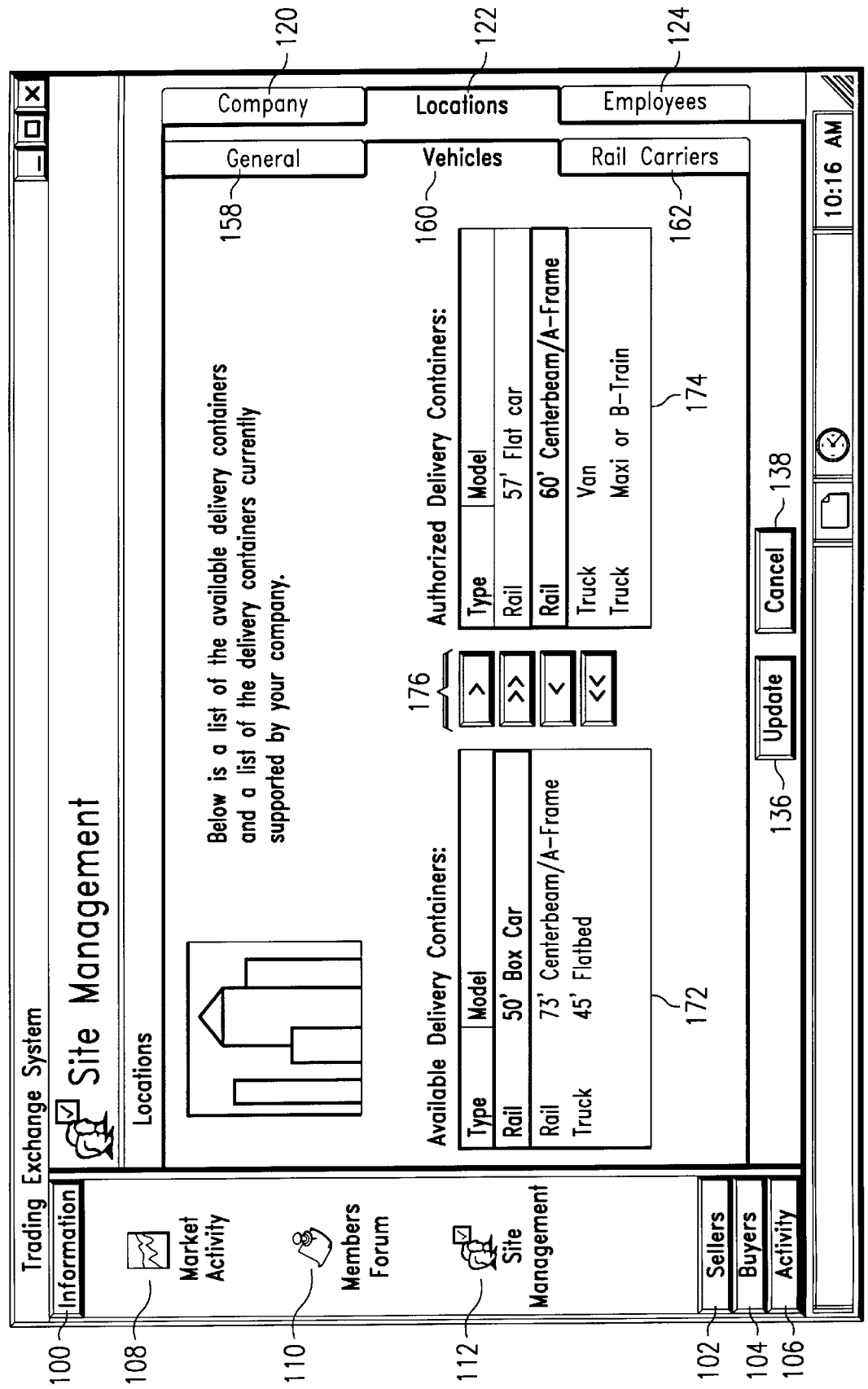

FIG. 5C illustrates a user interface screen associated with Locations tab 122 of Site Management subgroup 112 that includes a General Information tab 158, a Vehicle Information tab 160, and a Rail Carriers Information tab 162. A user of trading client 26 accesses this user interface screen by activating Add button 150 and/or selecting a particular business location and activating Edit button 152. In general, a user of trading client 26 enters general information for a business location, including location information in Location fields 164, contact information in Contact fields 166, and accessibility information in Accessibility fields 168.

The location information may include the name and address of the particular business location and the status information of the business location. The status information, entered in Trading Status field 170, indicates whether the particular business location maintains an active or inactive trading status on system 10. Therefore, in addition to changing the trading status of an entire trading client 26, a user of a particular trading client 26 may change the trading status of one or more individual business locations.

The contact information entered by the user includes a telephone number, a fax number, an e-mail address, a website address, and the name of a primary contact person for that particular business location. The accessibility information may include information specifying the availability of a dock or loading ramp at the business location, the access of a railroad track to the business location (e.g. left or right side track), or any other suitable information specifying the accessibility of a delivery container to the particular business location. Upon activating Update button 136, trading client 26 communicates the general information for the new business location to platform 18 for storage. Upon activating Cancel button 138, the information in fields 164–170 is restored to the state it was in prior to the last activation of Update button 136.

In addition to specifying general information about the business location, a user of trading client 26 also specifies delivery information for the business location using user interface screens associated with Vehicle Information tab 160 and Rail Carriers Information tab 162. FIG. 5D illustrates a user interface screen associated with Vehicle Information tab 160. In general, a user trading client 26 identifies a list of available delivery containers supported by system 10, in Available Delivery Containers field 172, and specifies a subset of the delivery containers authorized to deliver loads to and/or from the particular business location, in Authorized Delivery Containers field 174, using Arrow buttons 176. For example, system 10 may support three different truck type delivery containers and four different railcar type delivery containers. A user of trading client 26 selects a subset of these available delivery containers to identify those delivery containers supported by the particular business location. Upon activating Update button 136, trading client 26 communicates information about the delivery containers for the business location to platform 18 for storage. Upon activating Cancel button 138, the information in fields 172 and 174 is restored to the state it was in prior to the last activation of Update button 136.

Figure 5E:
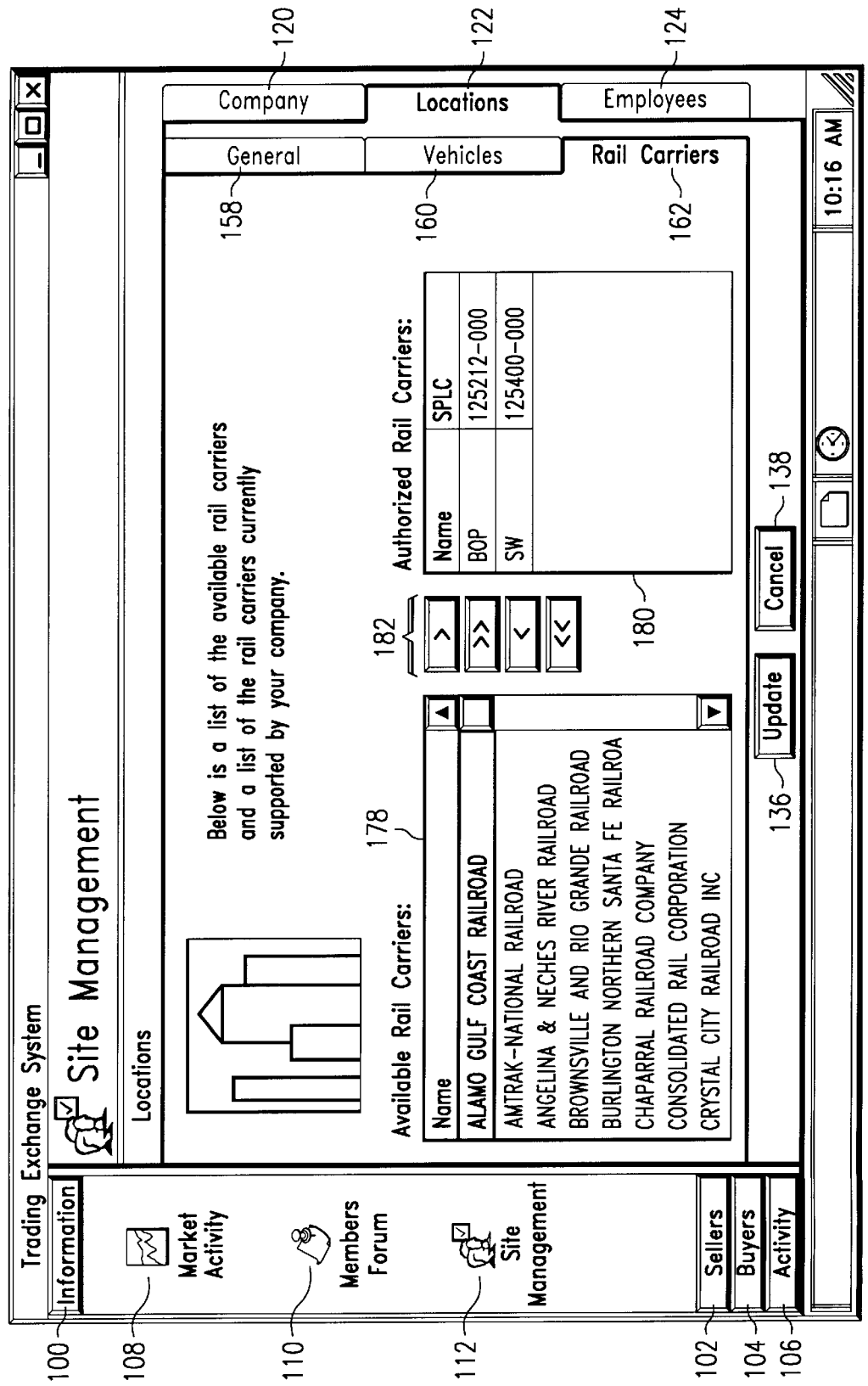

FIG. 5E illustrates a user interface screen associated with Rail Carriers Information tab 162. In general, the user of trading client 26 identifies a list of all available rail carriers for system 10 in Available Rail Carriers field 178, and specifies a subset of the available rail carriers as rail carriers that are authorized to deliver loads to and/or from the particular business location, in Authorized Rail Carriers field 180, using Arrow buttons 182. Therefore, a user of trading client 26 may specify on a location-by-location basis delivery information such as the type of delivery containers that the location will support and, more particularly, the different types of rail carriers that will have access to the delivery location. Upon activating Update button 136, trading client 26 communicates information about the rail carriers for the business location to platform 18 for storage. Upon activating Cancel button 138, the information in fields 178 and 180 is restored to the state it was in prior to the last activation of Update button 136.

Figure 5F:
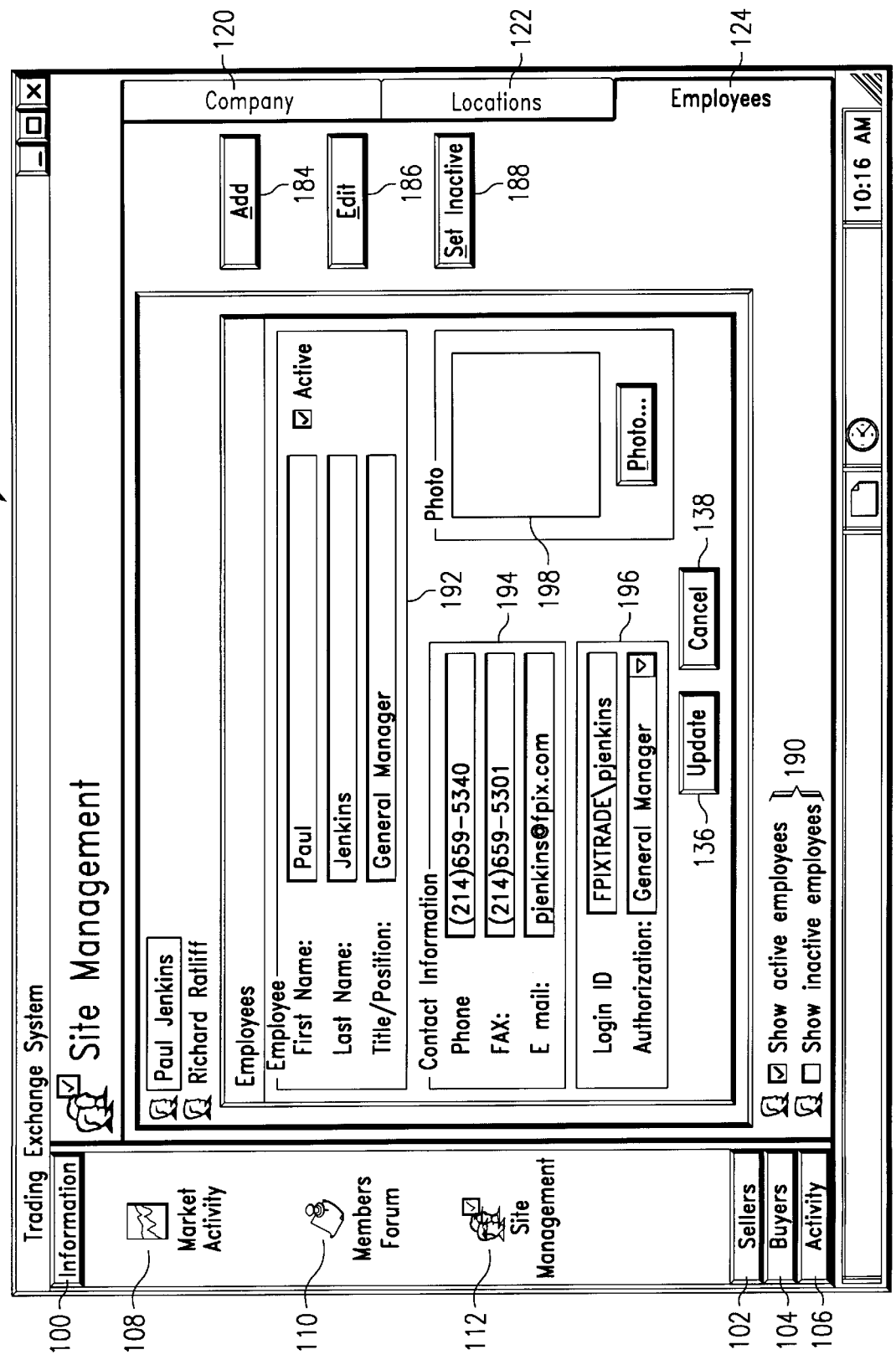

FIG. 5F illustrates a user interface screen associated with Employee tab 124. Here, a user of trading client 26 may add, edit, or inactivate employees of trading client 26. Employees may be users of trading clients 26 on system 10, and have a variety of authorization levels, as described in detail below. The user may add a new employee, edit information for an existing employee, or inactivate an existing employee by activating Add button 184, Edit button 186, and Set Inactive button 188, respectively.

To add a new employee as an authorized user of system 10, the user of trading client 26 enters employee information, such as employee name and title, in Employee fields 192; contact information in Contact fields 194; and system information, such as authorization levels and system log-in IDs, in System fields 196. In one embodiment, the user may also enter a photograph for the employee in Photograph field 198. The authorization levels of a particular employee may include credit administrator, freight administrator, product manager, shipping administrator, trader or any other authorization level supported by system 10. In one embodiment, only the general manager of trading client 26 may access the employee information. The general manager may edit existing employee information by activating Edit button 186. Upon activating Update button 136, trading client 26 communicates the employee information to platform 18 for storage. Upon activating Cancel button 138, the information in fields 192–198 is restored to the state it was in prior to the last activation of Update button 136.

The general manager may change the trading status of a particular employee between inactive and active by activating Set Inactive field 188. This allows the general manager of a trading client 26 to inactivate the trading status of a particular employee and prevent the employee from logging into system 10 and using the trading exchange application. Fields 190 allow a user of trading client 26 to filter the list of all employees to view active employees, inactive employees, or both.

Figure 6:
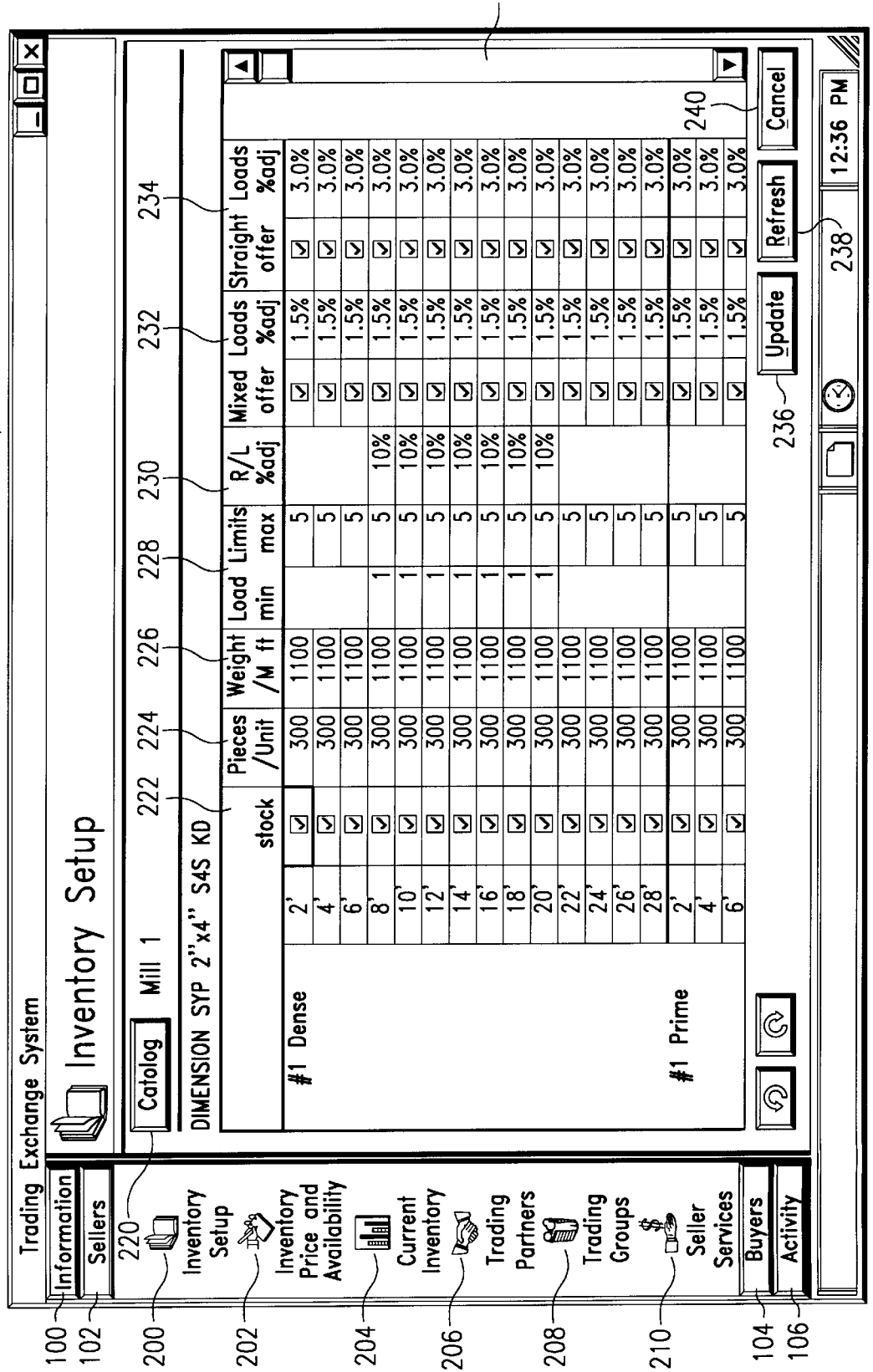
FIG. 6 illustrates an exemplary display of a graphical user interface for a Sellers group having an Inventory Set Up subgroup supported by the trading exchange system.

FIG. 6 illustrates a user interface screen associated with Sellers group 102 that includes a number of subgroups, including Inventory Setup subgroup 200, Inventory Price and Availability subgroup 202, Current Inventory Levels subgroup 204, Trading Partners subgroup 206, Trading Groups subgroup 208, and Seller Services subgroup 210. Inventory Setup subgroup 200 displayed in FIG. 6 includes a Catalog button 220 and Inventory Data fields 222–234. A user of seller client 24 activates Catalog button 220 to identify a list of all business locations supported by the seller client 24 so that it may establish inventory data for the seller client 24 on a location-by-location basis. For example, FIG. 6 illustrates an inventory setup for "Mill 1" of seller client 24. The inventory data established by seller client 24 using Inventory Setup subgroup 200 comprises inventory data that generally applies to all buyer clients 22 as default information. After specifying a particular business location, the user of seller client 24 identifies particular product characteristics to define a particular forest product. For each specified forest product, the user of seller client 24 establishes inventory data in fields 222–234.

Field 222 indicates whether seller client 24 sells a particular forest product having a particular grade and length at the specified business location. For products that the seller client 24 does sell at the specified business location, seller client 24 specifies unit configurations in field 224, weight configurations in field 226, and load configurations in fields 228–234. Field 224 defines how many pieces of the forest product constitute one product unit. Field 226 defines the weight of the forest product per one thousand board-feet. Fields 228–234 define in which types of loads the forest product may be delivered.

For a particular forest product offered in a random length load, a seller client 24 may indicate minimum and maximum load limits in field 228. For example, if a buyer client 22 initiates a buy request for a product in a random length load configuration, then the minimum load limits established by seller client 24 indicate the number of units of the product that a particular shipment must include. Similarly, the maximum load limits indicate the number of units of the product that a particular shipment may include. In one embodiment, the maximum limits indicated by load limits 228 apply to any type of load configuration, such as random length, mixed load, or straight load. In a particular embodiment, the load limits are established based upon the selected delivery container. Furthermore, a seller client 24 may include a price adjustment for a random length load in field 230.

Field 232 indicates whether the product may be offered in a mixed load configuration and an associated price adjustment for the product. Similarly, field 234 indicates whether the product may be offered in a straight load configuration and an associated price adjustment for the product. The price adjustments comprise percentage increases or decreases off the base price of the product. As will be described in more detail below, a seller client 24 may adjust the price and inventory exposure of its inventory data for particular trading partners based on trading preferences established by the seller client 24.

Upon establishing or adjusting the default inventory, a user of seller client 24 may activate an Update button 236 to communicate the inventory data to platform 18. Although system 10 periodically refreshes the inventory data shown in fields 222–234, a seller client 24 may manually refresh the inventory data by activating Refresh button 238. Furthermore, a user of seller client 24 may cancel any changes made to the inventory data by activating Cancel button 240. If a user of seller client 24 activates Cancel button 240, then the inventory data will return to the state it was in prior to the last activation of Update button 236.

Figure 7A:
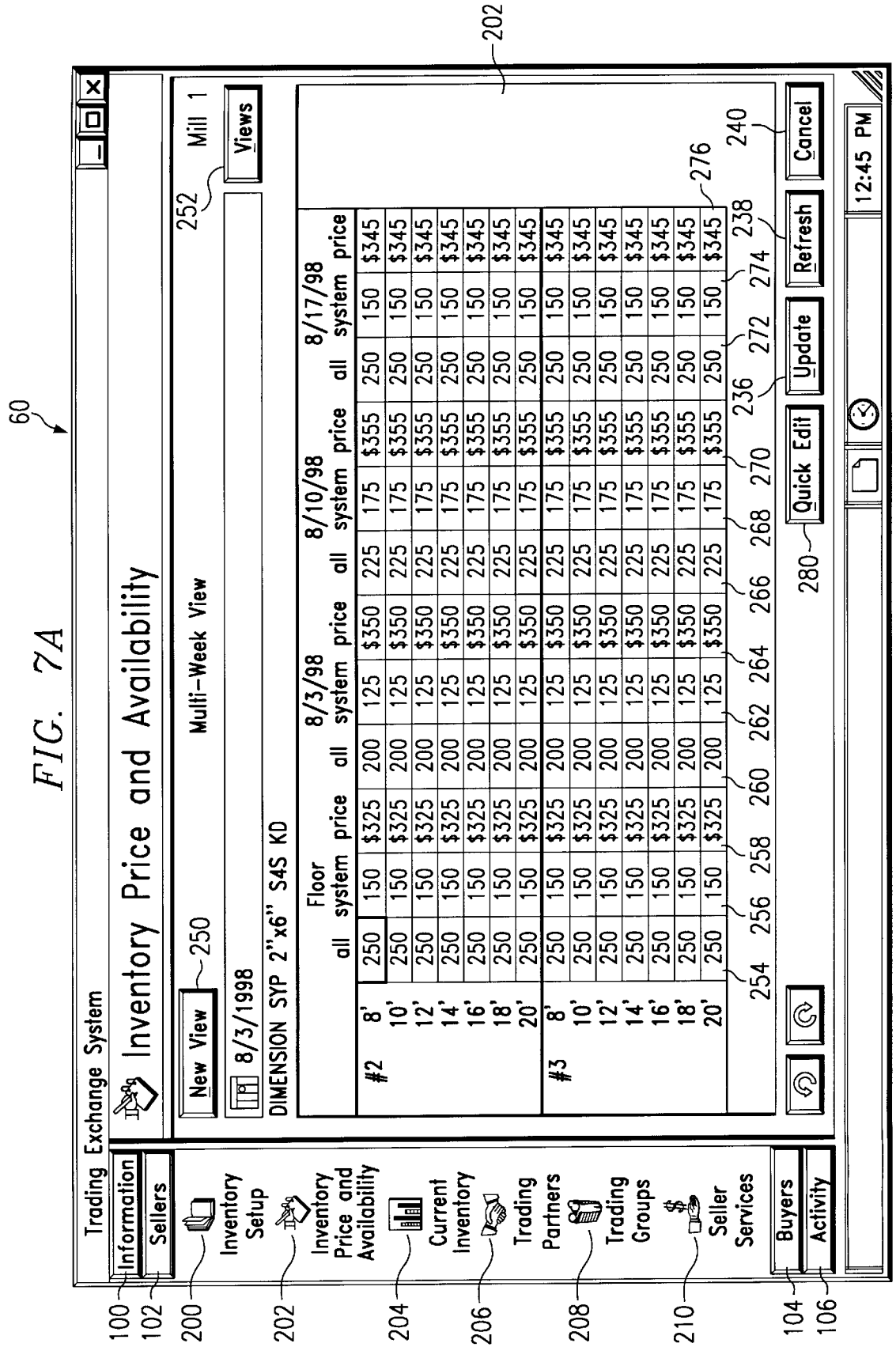

FIG. 7A illustrates a user interface screen associated with Inventory Price and Availability subgroup 202 of Sellers group 102. Here, a user of seller client 24 establishes default price and availability levels for its offered products. Subgroup 202 includes a New View button 250 and a Views button 252. New View button 250 allows a user of seller client 24 to establish price and availability levels for a particular business location supported by that seller client 24. Upon selecting a particular business location, the user of seller client 24 may activate Views button 252 to select either a multi-week view of the price and availability levels of a particular product at the selected business location or a load limit view of the price and availability levels of a particular product at the selected business location for a selected week. Upon selecting a business location and a particular view, the user specifies a particular product that is offered at the specified business location.

The multi-week view of the price and availability levels includes Inventory Data fields 254–276. Fields 254–258 indicate price and availability levels for each product that is offered during the current week and is a part of the floor stock at the business location. Fields 260–264, 266–270, and 272–276 indicate projected price and availability levels for each product offered during a particular time period subsequent to the current week, such as a subsequent week of offering. For example, fields 260–264 indicate projected price and availability levels for the week of offering starting on Aug. 3, 1998. If a buyer client 22 communicates a buy query for a product to be delivered during a particular week of offering, then platform 18 retrieves offer data using the price and availability levels from the specified week of offering as established by the seller client 24 using fields 254–276. For example, a buyer client 22 may purchase products from a seller client 24 to be delivered during the week of Aug. 17, 1998, so the buyer client 22 will purchase the products according to the price and availability terms set up by seller client 24 in fields 272–276.

Fields 254, 260, 266, and 272 indicate the number of units of a particular product that is available at a particular business location in a given week. Fields 256, 262, 268, and 274 indicate the number of units of a particular product that is actually offered for sale at a particular business location using system 10 in a given week. The number of units actually offered using system 10 may be a subset of all the number of units available at a particular location. Therefore, a seller client 24 may track its entire inventory at a particular business location but offer only a subset of the inventory using system 10. Fields 258, 264, 270, and 276 indicate the price for a unit of a particular product offered at a particular business location in any given week. Subgroup 202 further includes a Quick Edit button 280 that allows a user of seller client 24 to change quickly the price of either a selected product or all products. For example, a user of seller client 24 may rapidly increase or decrease the base price of a particular subset of products by a specified percentage adjustment without having to change each product price individually.

FIG. 7B illustrates the load limit view of subgroup 202 for a particular week of offering. A user of seller client 24 may specify a particular week in the multi-week view and activate Views button 252 to view the load limits for that specified week of offering. The load limit view displays the default inventory data established by seller client 24 using Inventory Setup subgroup 200, as discussed above with regard to FIG. 6.

The user may then adjust the load configuration information for any given week of offering. Therefore, a seller client 24 may generate default inventory data using Inventory Setup subgroup 200, and then import that inventory data into the Inventory Price and Availability subgroup 202 for further adjustments.

Both the multi-week view and the load limit view of Inventory Price and Availability subgroup 202 allow a user of seller client 24 to change the default inventory data based upon projections of manufacturing and market forces. This allows seller client 24 to project price and availability terms on a per week basis as opposed to a general basis. Furthermore, a user of seller client 24 may activate Calendar button 282 to view and adjust price and availability terms for any given time period. Upon establishing or adjusting the price and availability terms, a user of seller client 24 may activate Update button 236 to communicate the inventory data to platform 18. A user of seller client 24 may manually refresh the inventory data by activating Refresh button 238. Furthermore, a user of seller client 24 may cancel any changes made to the inventory data by activating Cancel button 249.

Figure 8:
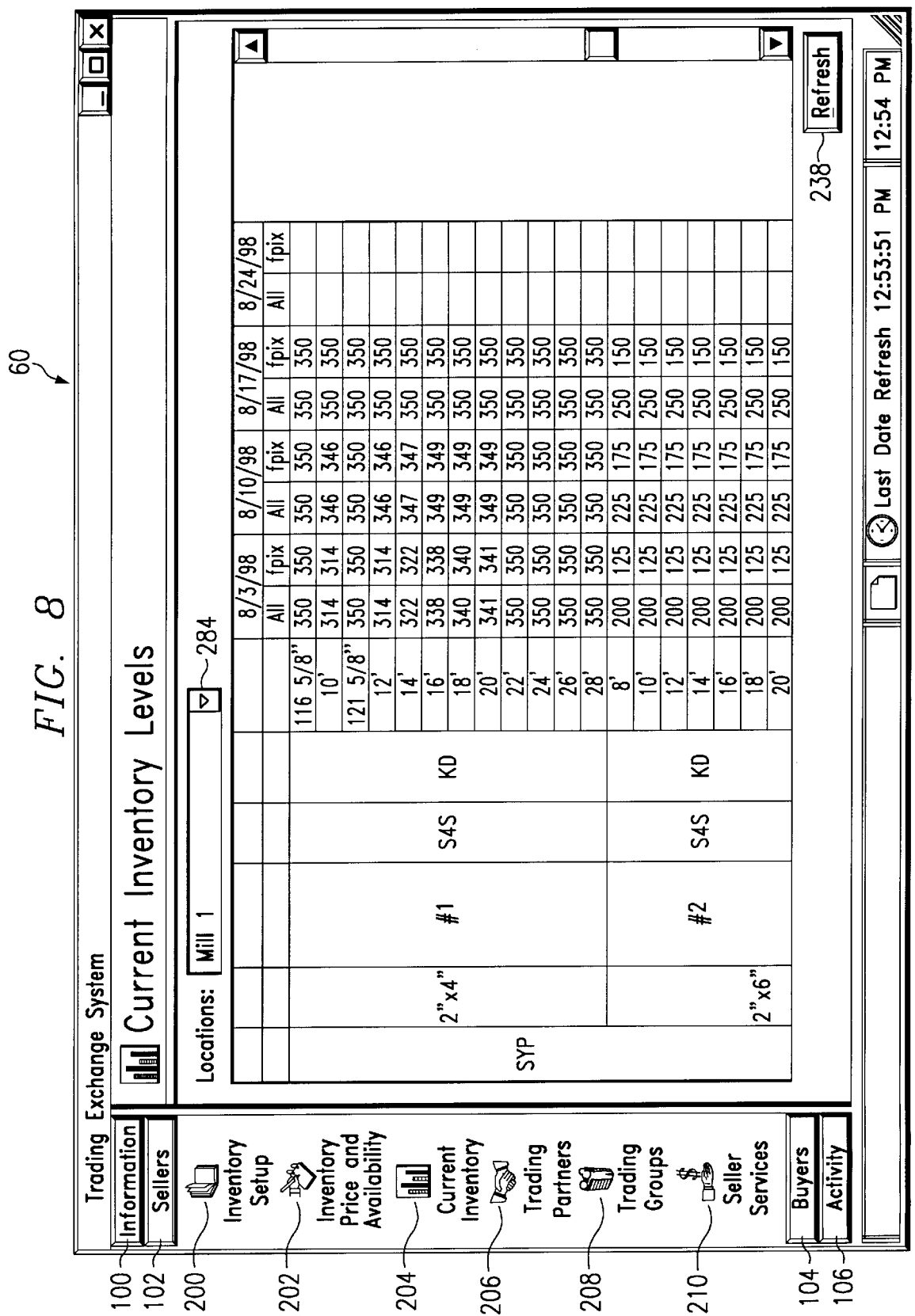
FIG. 8 illustrates an exemplary display of a graphical user interface for a Sellers group having a Current Inventory Levels subgroup supported by the trading exchange system.

FIG. 8 illustrates Current Inventory Levels subgroup 204 of Sellers group 102. Subgroup 204 displays all of the inventory data established by a seller client 24 for any particular business location. A user of seller client 24 generally accesses the Current Inventory Levels subgroup 204 to determine the progress of a particular business location. For example, a user of seller client 24 may select a particular business location using Location field 284 and may view updated inventory data for that selected location by activating Refresh button 238. The inventory data includes both the available inventory of a particular product and the actual inventory offered using system 10 on a per week basis. The inventory data displayed in subgroup 204 is updated on a real-time basis in response to sale transactions.

Figure 9:
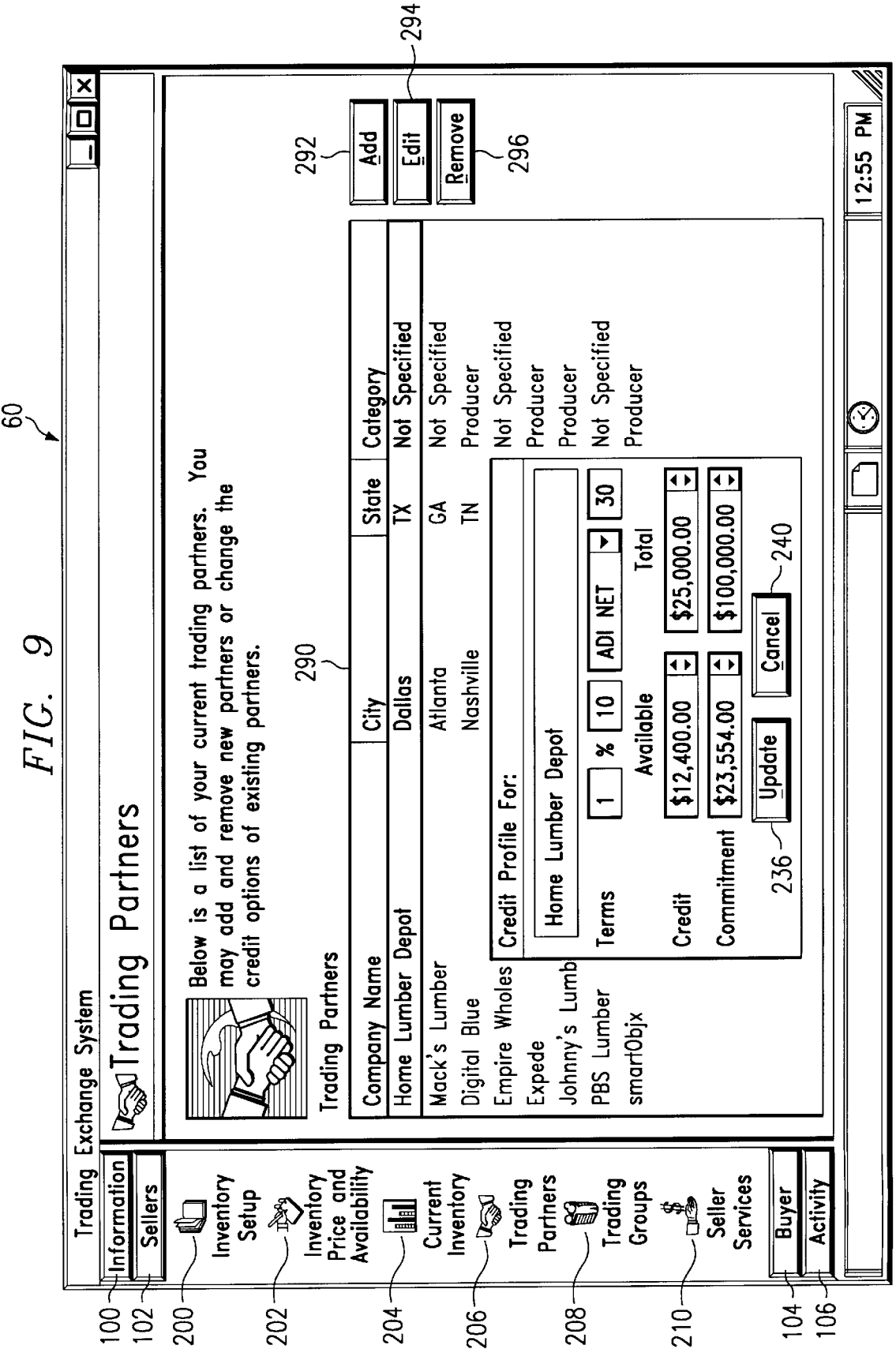
FIG. 9 illustrates an exemplary display of a graphical user interface for a Sellers group having a Trading Partners subgroup supported by the trading exchange system.

FIG. 9 illustrates Trading Partners subgroup 206 of Sellers group 102. Trading Partners subgroup 206 allows a seller client 24 to establish or dissolve trading relationships with other trading clients 26. In particular, Trading Partners subgroup 206 includes a Trading Partners field 290 that lists the current trading partners of a particular seller client 24. A user of a seller client 24 may add trading clients 26, edit current trading relationships, or remove trading clients 26 using Add button 292, Edit button 294, and Remove button 296, respectively. Upon activating Add button 292, Trading Partner subgroup 206 presents a list of all members of system 10 that are not currently trading partners of seller client 24. A seller client 24 may establish a trading relationship with one or more of these available trading clients 26 to authorize it to purchase products from the seller client 24.

For each trading client 26 with whom a seller client 24 establishes a trading relationship, the user of seller client 24 establishes profile data including verification of the trading relationship, credit terms, and, optionally, trading preferences information. The credit terms may include transaction terms, credit limits, and commitment limits. The transaction terms include payment terms such as percentage discounts for payments made within a certain number of days after the date of invoice, after the date of freight, or after any other suitable event. The credit and commitment limits control the buying capacity of a particular trading partner. As described above, credit limits define the amount of a product that a seller client 24 has actually shipped to a buyer client 22 for which the buyer client 22 has not yet paid. Commitment limits define the amount of a product sold by a seller client 24 to a buyer client 22 regardless of whether the product has been shipped. System 10 tracks the available credit or commitment of a trading partner so that a seller client 24 may determine whether to sell that trading partner a particular product. A user of seller client 24 may activate Edit button 294 to edit the credit information of an established trading partner. Upon activating Update button 236, seller client 24 communicates the profile data to platform 18 for storage. Upon activating Cancel button 240, the profile data is restored to the state it was in prior to the last activation of Update button 236. A user of seller client 24 may activate Remove button 296 to dissolve a trading relationship with a selected trading client 26.

Figure 10:
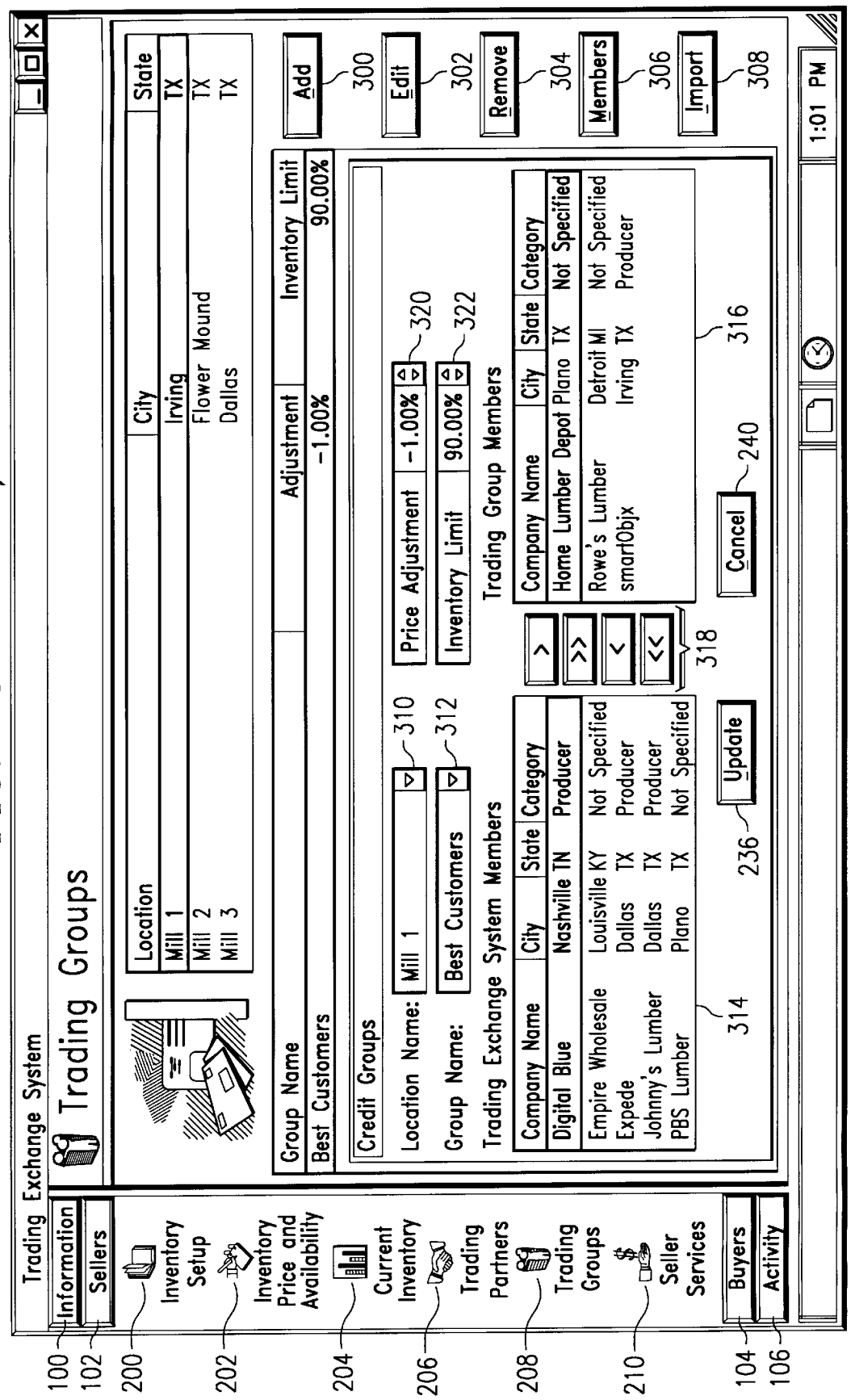
FIG. 10 illustrates an exemplary display of a graphical user interface for a Sellers group having a Trading Group subgroup supported by the trading exchange system.

FIG. 10 illustrates Trading Groups subgroup 208 of Sellers group 102. Trading Groups subgroup 208 allows a seller client 24 to establish trading preferences, such as price and inventory preferences, for particular trading clients 26 that are established trading partners of seller client 24. In particular, a seller client 24 may group established trading partners together and offer them specific price adjustments or inventory exposure adjustments at particular business locations. For example, a user of seller client 24 may add a new trading group, edit an existing trading group, or remove an existing trading group using Add button 300, Edit button 302, and Remove button 304, respectively. Furthermore, a user of seller client 24 may activate Members button 306 to list all of the trading partners of the seller client 24 that are not currently in a trading group. A user of seller client 24 may activate Import button 308 to reproduce trading groups from one business location at another business location. For example, seller client 24 may reproduce a particular trading group that is established for Mill 1 at Mill 2.

A user of seller client 24 activates Add button 300 to establish a new trading group. In particular, seller client 24 specifies in Location field 310 the particular business location where the trading group will be established. The user then names the trading group in Group Name field 312. Members field 314 lists all of the members of system 10 that are currently trading partners of seller client 24 but which are not currently members of any trading groups. Group Members field 316 indicates those trading partners which are a member of the specified trading group. A user of seller client 24 may add or remove trading partners from the current trading group by using Arrow buttons 318.

Seller client 24 may establish trading preferences for the members of the trading group. For example, a user of seller client 24 may adjust the base price of its products offered to members of the trading group at the specified business location using Price Adjustment field 320. In particular, seller client 24 may increase or decrease the base price of one or more products by a percentage variation. Similarly, a user of seller client 24 may adjust the inventory exposure of its products offered to members of the trading group at the specified business location using Inventory Exposure field 322. By adjusting fields 320 and 322, seller client 24 may establish trading preferences for particular trading clients. For example, a buyer client 22 having a high priority trading relationship with a seller client 24 may be offered special discounts and/or expanded exposure to the inventory of the seller client 24. A buyer client 22 having a low priority trading relationship with seller client 24 may be subjected to price markups and/or limited exposure to inventory offered by seller client 24.

Figure 11:
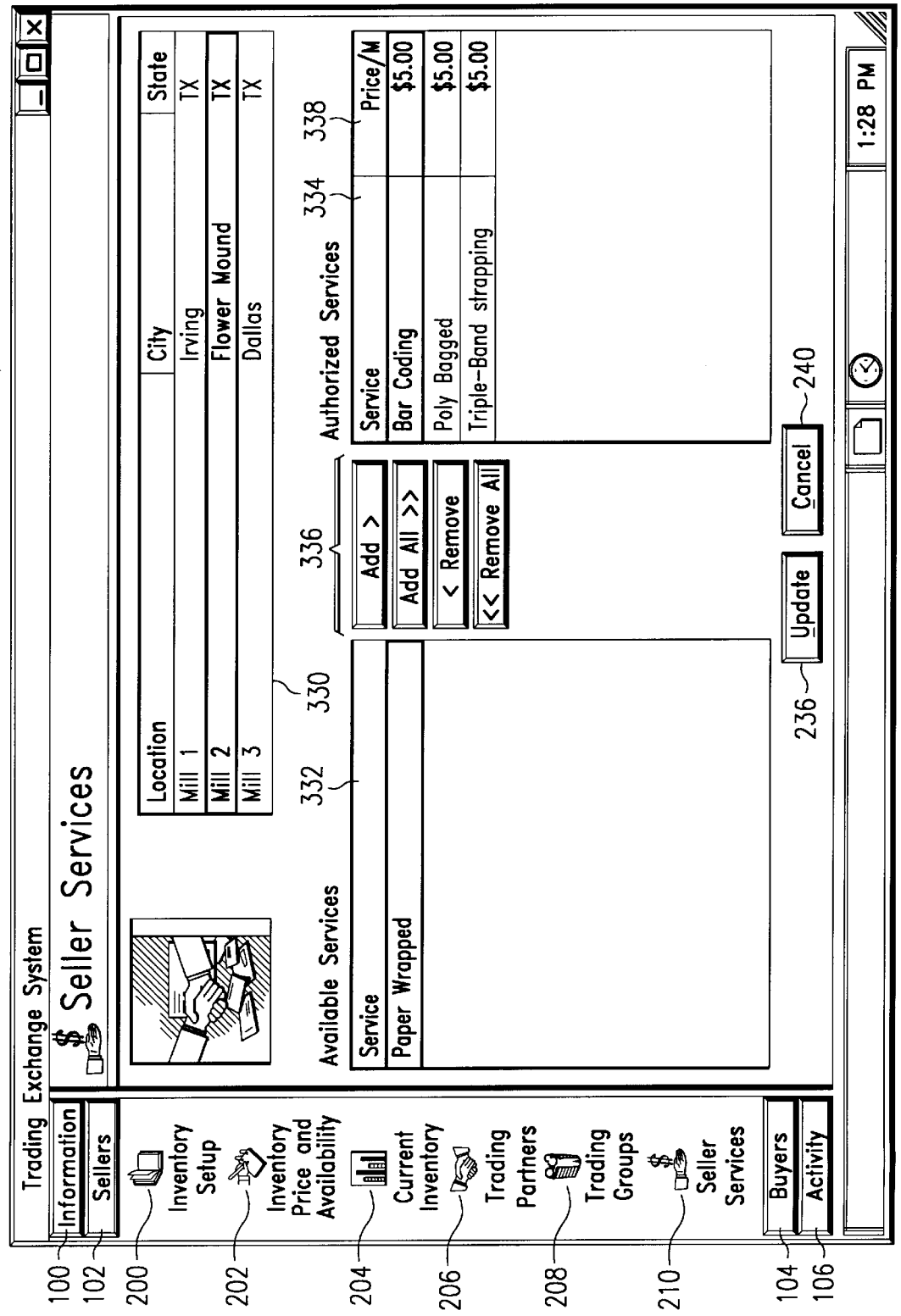
FIG. 11 illustrates an exemplary display of a graphical user interface for a Sellers group having a Seller Services subgroup supported by the trading exchange system.

FIG. 11 illustrates Sellers Services subgroup 210 of Sellers group 102. Seller Services subgroup 210 allows seller client 24 to offer particular services to its trading partners on a location-by-location basis. The seller services generally include any value added services that may be selected by buyer client 22 and priced in the sale transaction. For the case of forest products, the seller services may include, but are not limited to, paper wrapping, bar coding, poly bagging, and triple band strapping the forest products offered at a particular location. For example, a user of seller client 24 may specify a particular business location using Location field 330. For a particular business location, the user may view a list of available services displayed in Available Services field 332. The user may also view the authorized services of a particular business location using Authorized Services field 334. The user of seller client 24 may then add or remove particular seller services for a particular business location using Add and Remove buttons 336. The user of seller client 24 may associate a price with each authorized service in Price field 338. A user of seller client 24 may communicate the established seller services to platform 18 by activating Update button 236. A user of seller client 24 may cancel changes to seller services by activating Cancel button 240.

Figure 12:
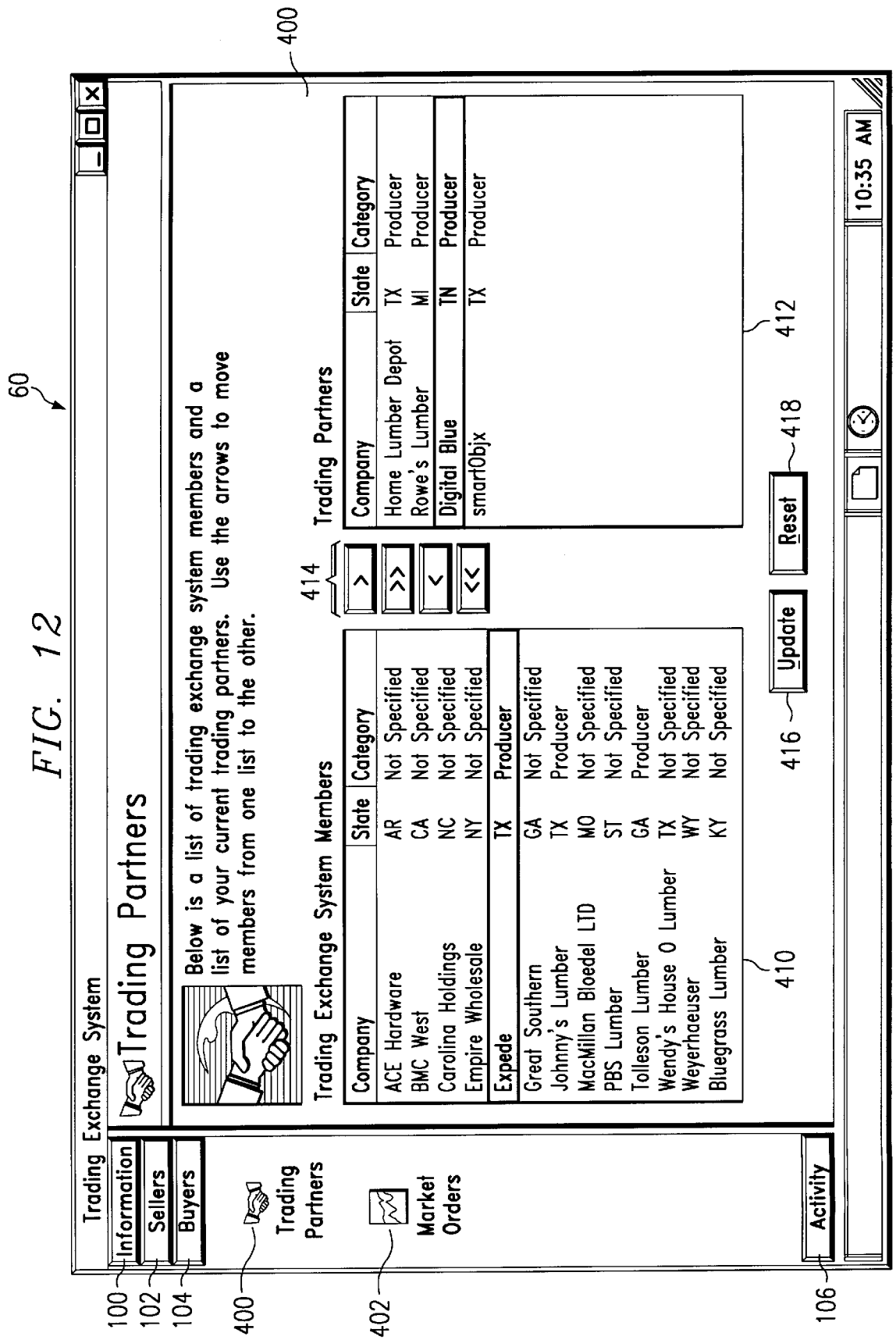
FIG. 12 illustrates an exemplary display of a graphical user interface for a Buyers group having a Trading Partners subgroup supported by the trading exchange system.

FIG. 12 illustrates a user interface screen associated with Buyers group 104 that includes a number of subgroups, including Trading Partners subgroup 400 and Market Orders subgroup 402. Trading Partners subgroup 400, illustrated in FIG. 12, allows a buyer client 22 to establish trading relationships with other trading clients 26. In particular, subgroup 400 includes Members field 410 that illustrates all of the members of system 10 that are not currently selected as a trading partner of buyer client 22. Trading Partners subgroup 400 also includes Trading Partners field 412 that illustrates those trading clients 26 that are currently trading partners of buyer client 22. A user of buyer client 22 may transfer trading client 26 between Members field 410 and Trading Partners field 412 using Arrow buttons 414 to add or remove trading partners from the list of all members of system 10. By specifying particular trading clients 26, a user of buyer client 22 identifies from which trading clients 26 it would like to purchase products. In one embodiment, unless a seller client 24 also specifies a particular buyer client 22 as a trading partner, the buyer client 22 cannot purchase products from that seller client 24. A buyer client 22 may access Members Forum subgroup 110 to research a particular trading client 26 prior to establishing a trading relationship. A user of buyer client 22 may then activate Update button 416 to communicate this profile data to platform 18. The user may activate Reset button 418 to return all trading relationships to the state that they were in prior to the last activation of Update button 416.

FIG. 13A illustrates Market Orders subgroup 402 of Buyers group 104. Market Orders subgroup 402 includes a Market Order Builder button 420, a Template button 422, a Summary field 424, an Offer Data field 426, a Buy button 428 and a Refresh button 430. Activating Market Order Builder button 420 allows a user of buyer client 22 to generate a market order in a number of steps.

For example, in Step One a user of buyer client 22 establishes delivery information for the market order. In particular, the user specifies a particular freight calculation method using Delivery Type fields 450. A user of buyer client 22 activates the FOB Delivered field to instruct platform 18 to use the freight calculation data generated by the seller client 24 to determine delivery costs. A user of buyer client 22 activates the FOB Mill field to instruct platform 18 to use its own freight calculation data to determine delivery costs. The user of buyer client 22 may specify a particular load type using Load Type fields 452. For example, buyer client 22 may specify a random length load, a straight load, or a mixed load.

The user activates a Location button 454 to specify the business location to which the freight will be delivered and Deliver field 456 displays the selected business location. Delivery Container field 458 displays the available delivery containers for the selected business location as specified by buyer client 22 using Site Management subgroup 112. The user may specify a particular delivery container for a particular market order out of the set of available delivery containers established by buyer client 22. The user of buyer client 22 may navigate through the different steps of building a market order using Back button 460 and Next button 462. When the user is finished with building the market order, it may activate Finish button 464 to communicate the market order to platform 18 as a buy query. The user may cancel a current market order by activating Cancel button 466.

Figure 13B:
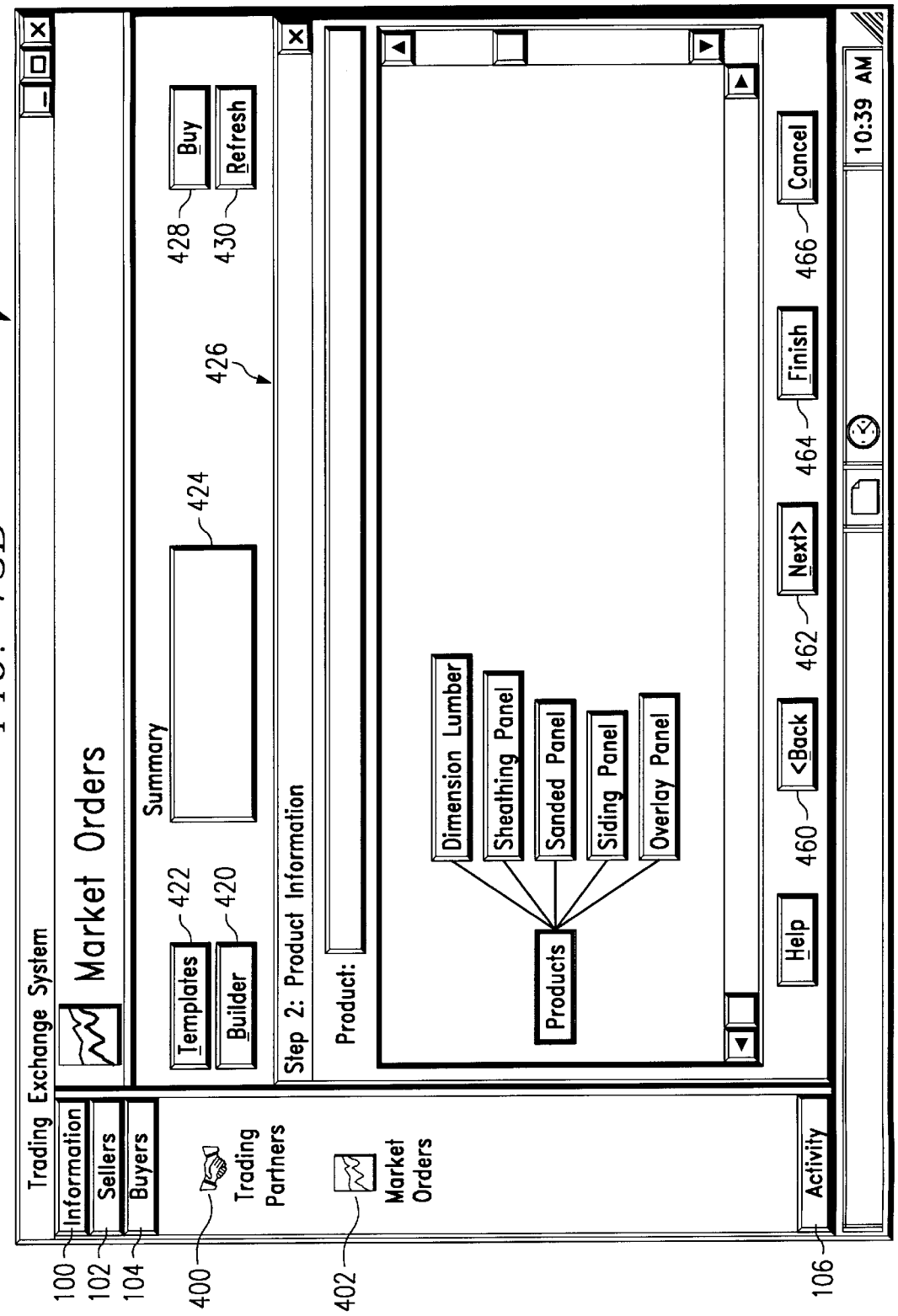
Figure 13C:
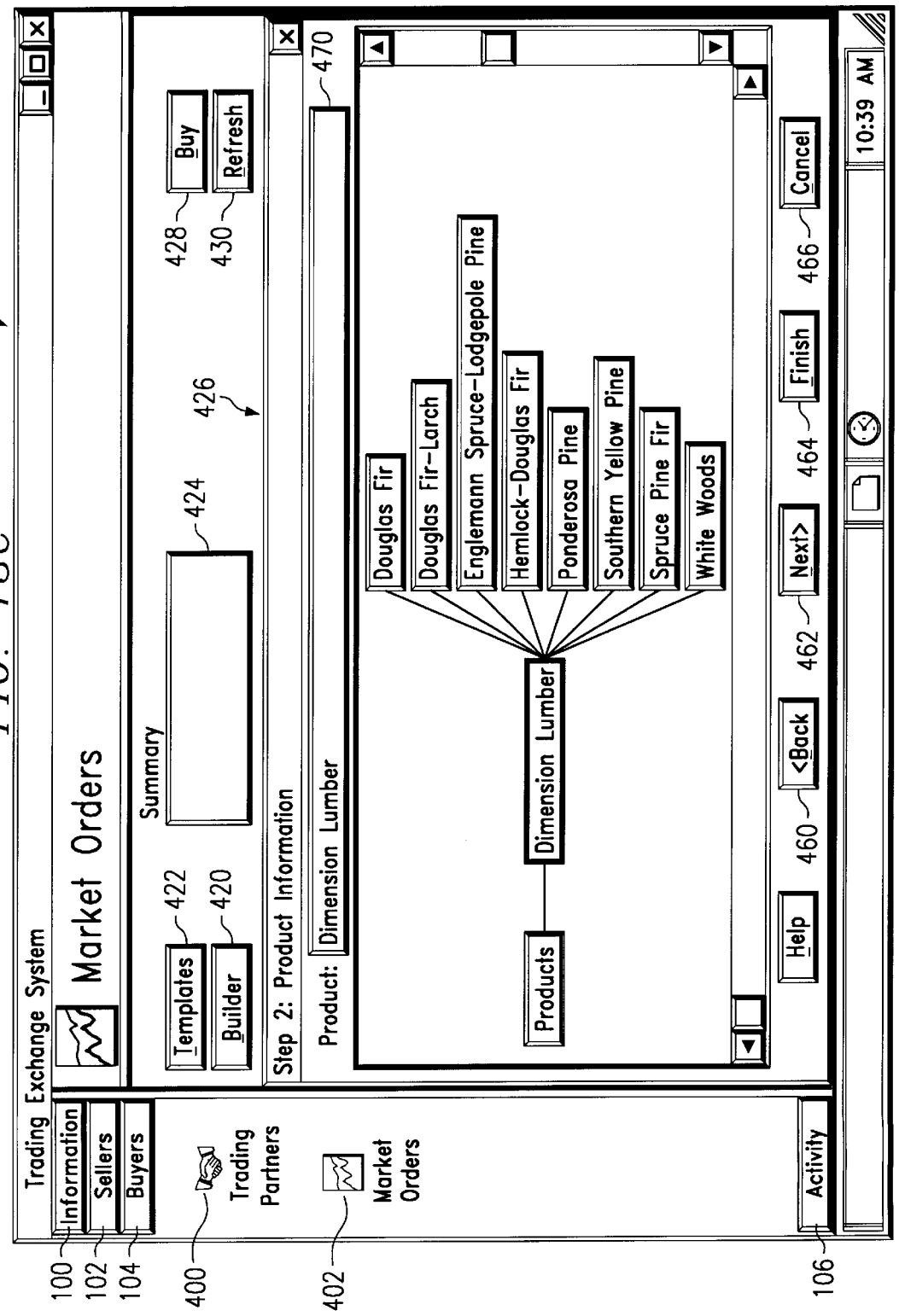
Figure 13D:
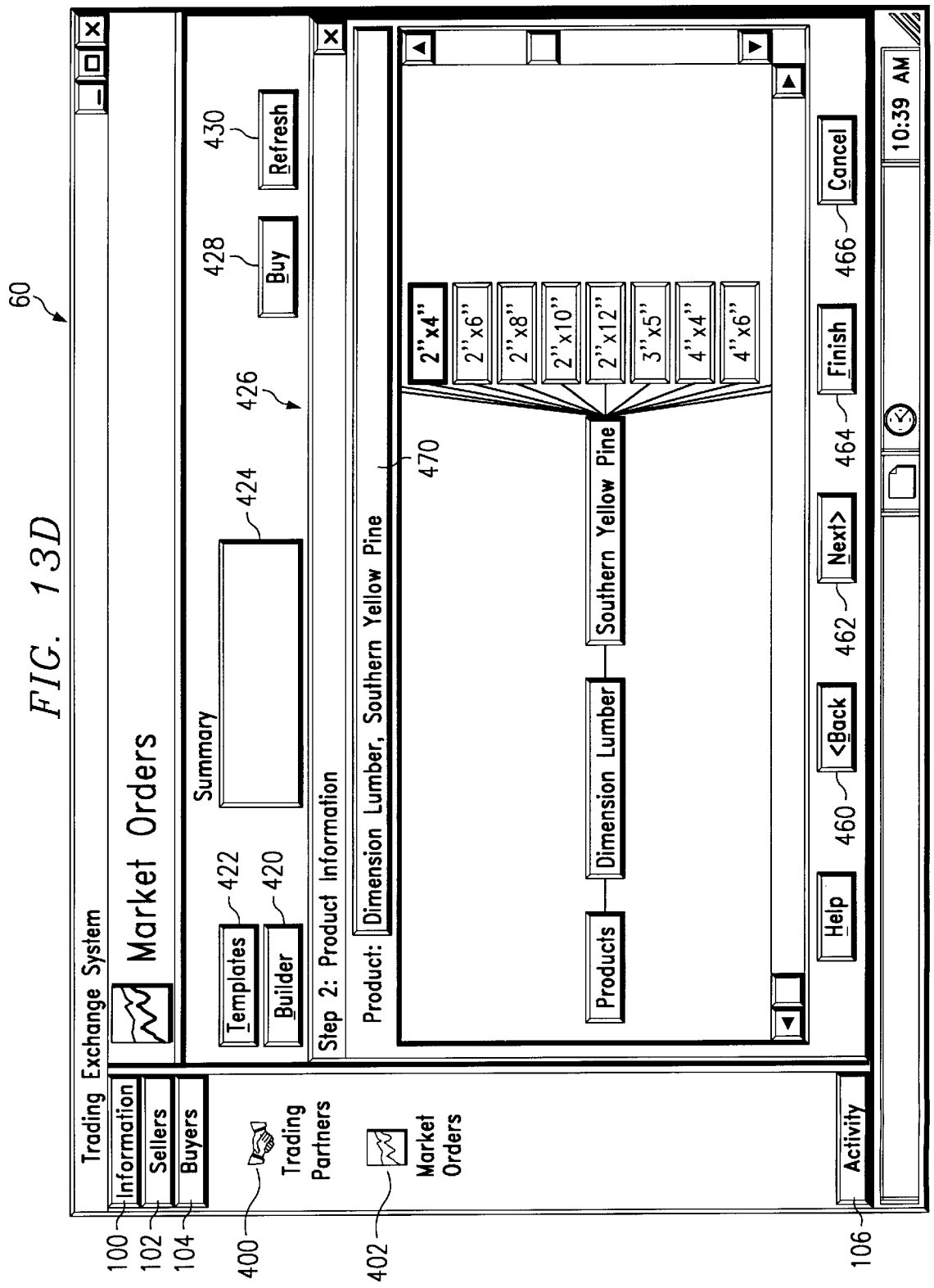

FIGS. 13B–13D illustrate Step Two of the process for building the market order. In Step Two, the user of buyer client 22 specifies a particular product. As described above, commodity forest products include a number of hierarchical product characteristics that together define a particular product. FIG. 13B illustrates the different product categories that may define a particular commodity forest product. For example, the different product categories may include Dimension Lumber, Sheathing Panel, Sanded Panel, Siding Panel, and Overlay Panel. The user of buyer client 22 may select any of the product categories to specify further product characteristics associated with the selected product category.

FIG. 13C illustrates that the user of buyer client 22 selected Dimension Lumber as the product category. Upon selecting Dimension Lumber, buyer client 22 presents the product species available for that product category. For example, Dimension Lumber has eight different product species, ranging from Douglas Fir to White Woods. The user of buyer 12 may select any of the product species to specify further product characteristics associated with the select product species.

FIG. 13D illustrates that the user of buyer client 22 selected Southern Yellow Pine as the product species. Upon selecting Southern Yellow Pine, buyer client 22 presents the available lumber sizes for that product species. The user of buyer client 22 continues selecting product characteristics in this hierarchical format until a particular commodity forest product is selected. As the user specifies different characteristics of the forest product, buyer client 22 presents in Product field 470 the current product selection.

Figure 13E:
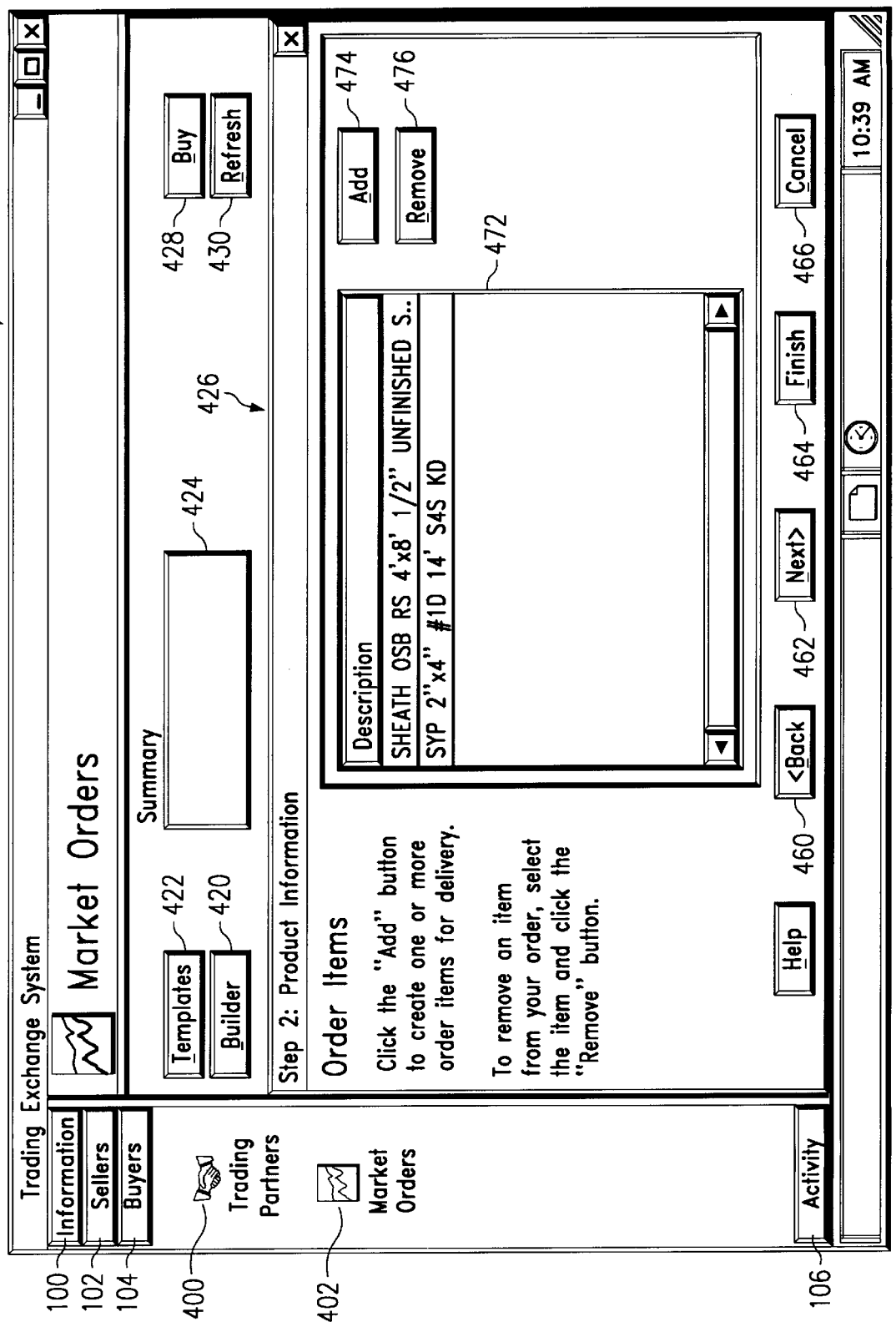

FIG. 13E illustrates a Description field 472 that illustrates the different products selected by the user of buyer client 22 during Step Two of generating the market order. In one embodiment, the user of buyer client 22 may generate a market order having a mixed load type by adding one or more forest products to an existing market order using Add button 474. The user of buyer client 22 may remove one or more forest products from a market order using Remove button 476.

Figure 13F:
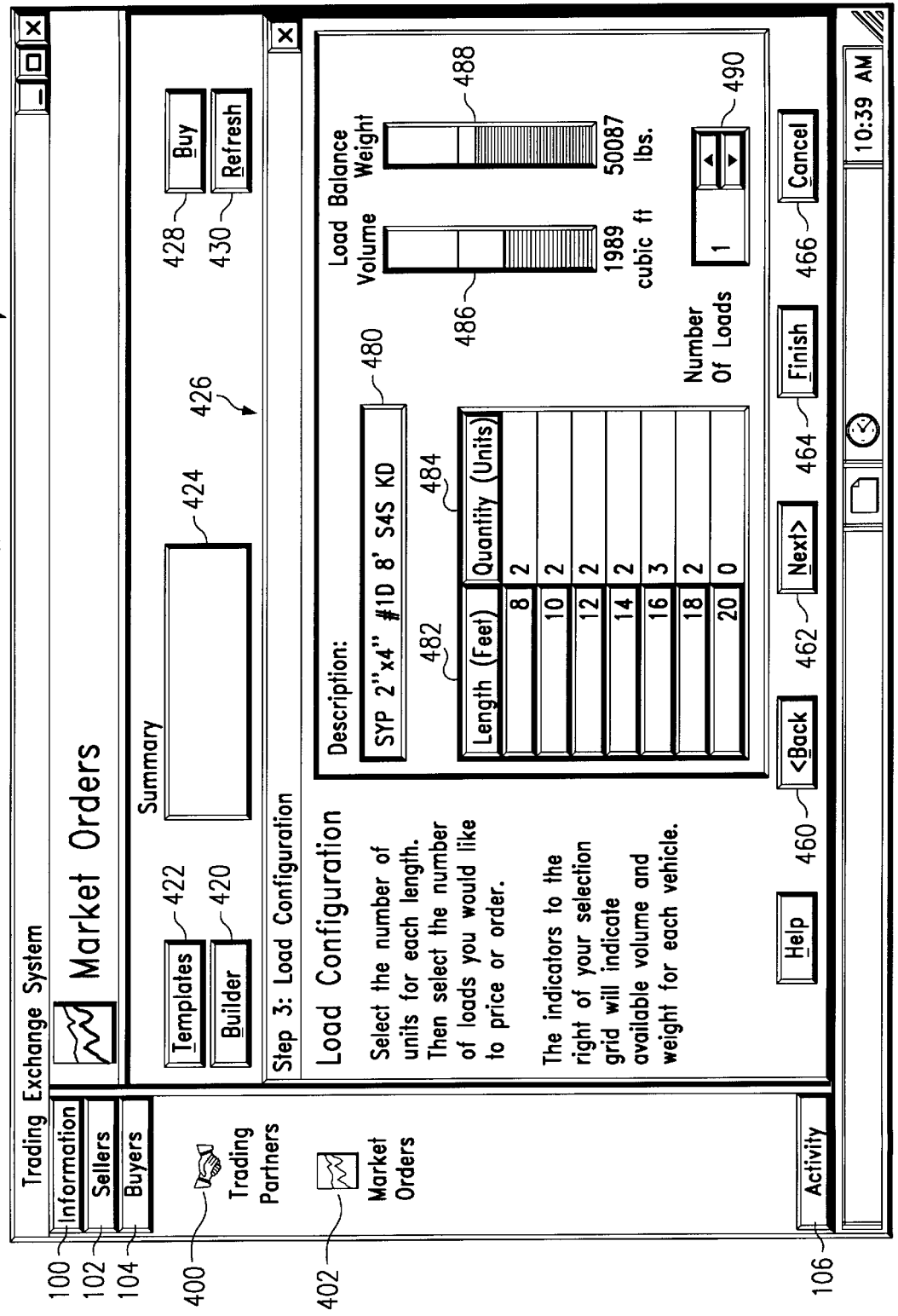

FIG. 13F illustrates Step Three of the process for building the market order. In this step, the user of buyer client 22 determines the load configuration of the market order. In particular, buyer client 22 determines the number of units of the selected product used to generate a given load. Description field 480 displays the particular product selected by buyer client 22 in Step Two, described above. Length field 482 displays the length of the selected product. Quantity field 484 displays the number of units of the product specified by buyer client 22 in the market order. It should be understood that FIG. 13F illustrates a load configuration for a random length load type. For a random length load type, the user specifies a quantity of units for each of the different lengths of the product, such as, for example, a quantity of units for all lengths of Dimension Lumber ranging from eight feet to twenty feet. If the user of buyer client 22 selects a straight load type, then the user specifies a load configuration for the single selected product, whereas if the user of buyer client 22 selects a mixed load type, then the user specifies a load configuration for each selected product. Therefore, fields 482 and 484 include entries for multiple product lengths to illustrate the process of determining a load configuration of a random length load type. For a straight load and/or a mixed load, fields 482 and 484 include entries for only the selected product length.

Load Balance Indicators 486 and 488 graphically illustrate the capacity of the generated load in comparison with the capacity of the selected delivery container measured in a particular load parameter, such as, for example, the weight of the load, the volume of the load, the capacity of the load measured in board-feet, and/or the capacity of the load measured in linear-feet. For example, if the load generated by buyer client 22 has a particular weight, then Load Balance Indicator 488 graphically illustrates the weight of the generated load in comparison to the maximum weight capacity of the selected delivery container. Therefore, Load Balance Indicators 486 and 488 provide visual feedback to the user of a buyer client 22 regarding the load parameters of a market order in relation to the storage capacity of a particular delivery container.

In operation, the user of buyer client 22 increases or decreases the quantity of units of the selected product in the load by manipulating the data entered in Quantity field 484. In response, Load Balance Indicators 486 and 488 graphically represent the generated load in comparison with a particular maximum load parameter of the selected delivery container. For example, Load Balance Indicator 486 graphically represents the volume of the generated load in comparison with the volume of the selected delivery container. Similarly, Load Balance Indicator 488 graphically represents the weight of the generated load in comparison with the weight capacity of the selected delivery container. In one embodiment, Indicators 486 and 488 indicate a load that is less than the maximum load parameter of the selected delivery container in a first color and indicate a load that exceeds the maximum load parameter of the selected delivery container in a second color. In a particular embodiment, Indicators 486 and 488 represent the load parameter of the load as a bar that approaches a line indicating the maximum load parameter of the selected delivery container as the dynamically generated load exhausts the capacity of the delivery container. The user of buyer client 22 may increase or decrease the number of units in the load to optimize the load capacity of the selected delivery container.

In one embodiment, each load parameter of the generated load is calculated using industry averages for a particular product. For example, buyer client 22 may calculate the weight of the generated load using an average weight of a particular forest product in the commodity forest products industry based on a portion of all of the inventory received from seller clients 24. Number of Loads field 490 specifies the number of generated loads to be included in the market order.

FIG. 13G illustrates Step Four of the process of building a market order. In this step, the user of buyer client 22 selects particular seller services to include in the market order. As discussed above with respect to FIG. 11, a user of each seller client 24 specifies particular seller services to offer a buyer client 22 at supported business locations. The seller services include, but are not limited to, bar coding, paper wrapping, poly bagging, and triple band strapping. A user of buyer client 22 may select particular seller services by activating the appropriate check boxes in Services field 492.

Figure 13H:
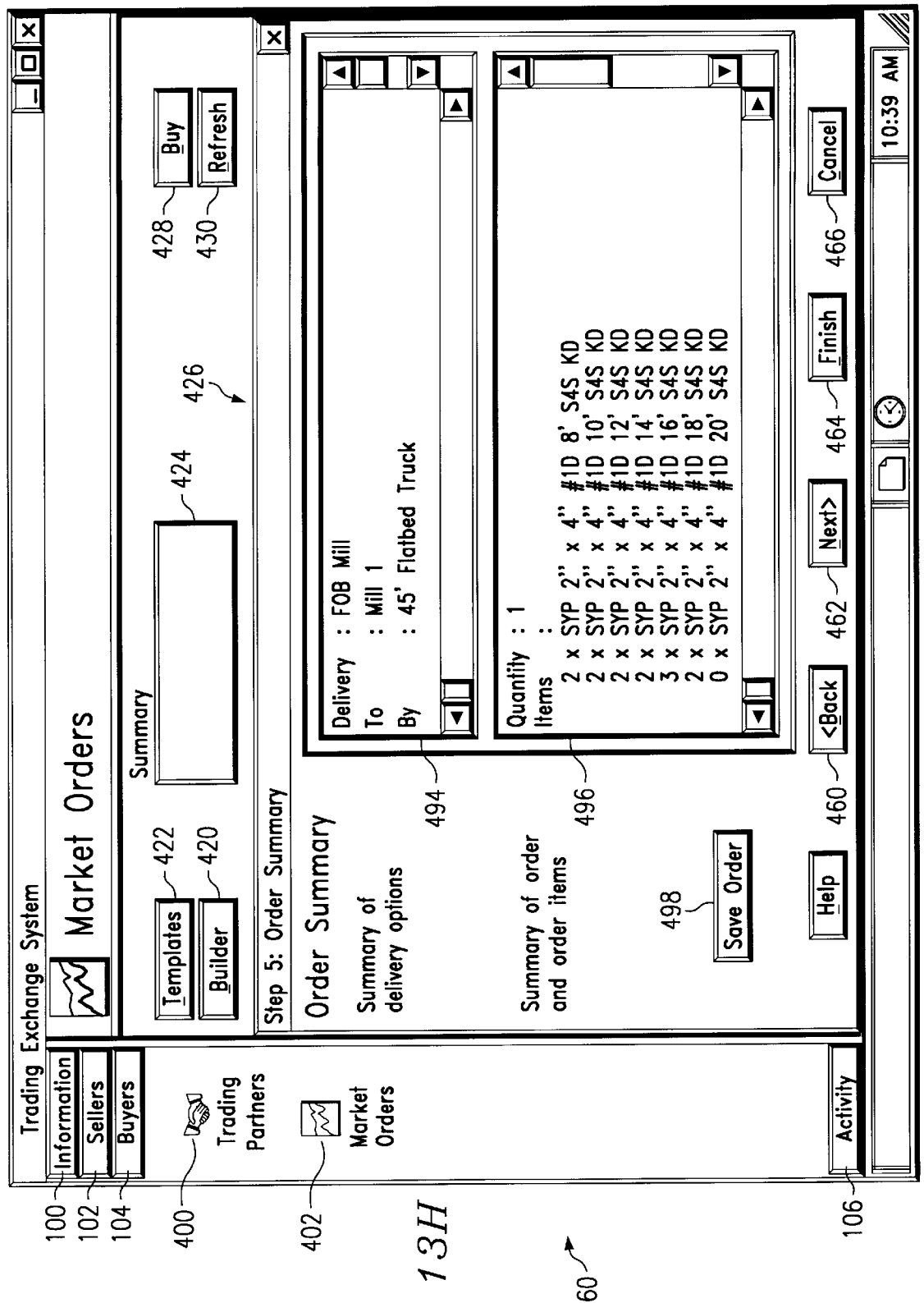

FIG. 13H illustrates Step Five of the process of building a market order. In this step, the user of buyer client 22 may review the generated market order prior to communicating a buy query to platform 18. In particular, a Delivery Information field 494 indicates the freight calculation data selected by buyer client 22 to be used by platform 18 to determine delivery costs, the destination location of the generated load, and the selected delivery container of the load. In one embodiment, this delivery information is communicated to platform 18 in a delivery request as a part of the buy query. Order Summary field 496 indicates the number of loads requested in the market order, and the quantity of units of the selected products in a given load. A Save Order button 498 allows a user of buyer client 22 to save the generated market order as a template. By saving a market order in a template, the user may issue the same query for inventory data at a later date without rebuilding the entire market order.

A user of buyer client 22 may issue the generated market order as a buy query to platform 18 by activating Finish button 464. In response, platform 18 searches the inventory data established by the trading partners of buyer client 22, retrieves offer data based upon the stored profile and inventory data, and communicates the offer data to buyer client 22. In particular, platform 18 determines with which trading client 26 buyer client 22 has a bidirectional trading relationship. For example, platform 18 identifies each of the trading clients 26 that the buyer client 22 has specified as a trading partner and determines which of those trading clients 26 have also specified buyer client 22 as a trading partner. Based upon the market order query generated by buyer client 22, platform 18 searches the inventory data for each trading client 26 with which buyer client 22 has a bidirectional trading relationship and retrieves offer data. In one embodiment, platform 18 includes the determined delivery costs in the offer data.

The offer data retrieved by platform 18 may account for a number of factors established by both the seller client 24 and the buyer client 22. Platform 18 determines the base price and availability levels of the products specified by the market order query for each business location supported by the seller clients 24 with which buyer client 22 maintains a trading relationship. In one embodiment, the base price and availability levels are retrieved based on the delivery date specified by the buy query. Platform 18 then adjusts the base price and availability levels according to the particular trading preferences established by the seller clients 24 for the buyer client 22. For example, a seller client 24 may vary the price and inventory exposure of a particular product offered to a particular buyer client 22. A seller client 24 may also vary the price and the minimum and maximum load limits of a particular product based upon the load configuration selected by the buyer client 22. For example, a highly preferenced buyer client 22 may enjoy a three percent discount off the base price of a particular product, but may suffer a five percent markup if the product is being sold as a part of a random length load type.

Figure 13I:
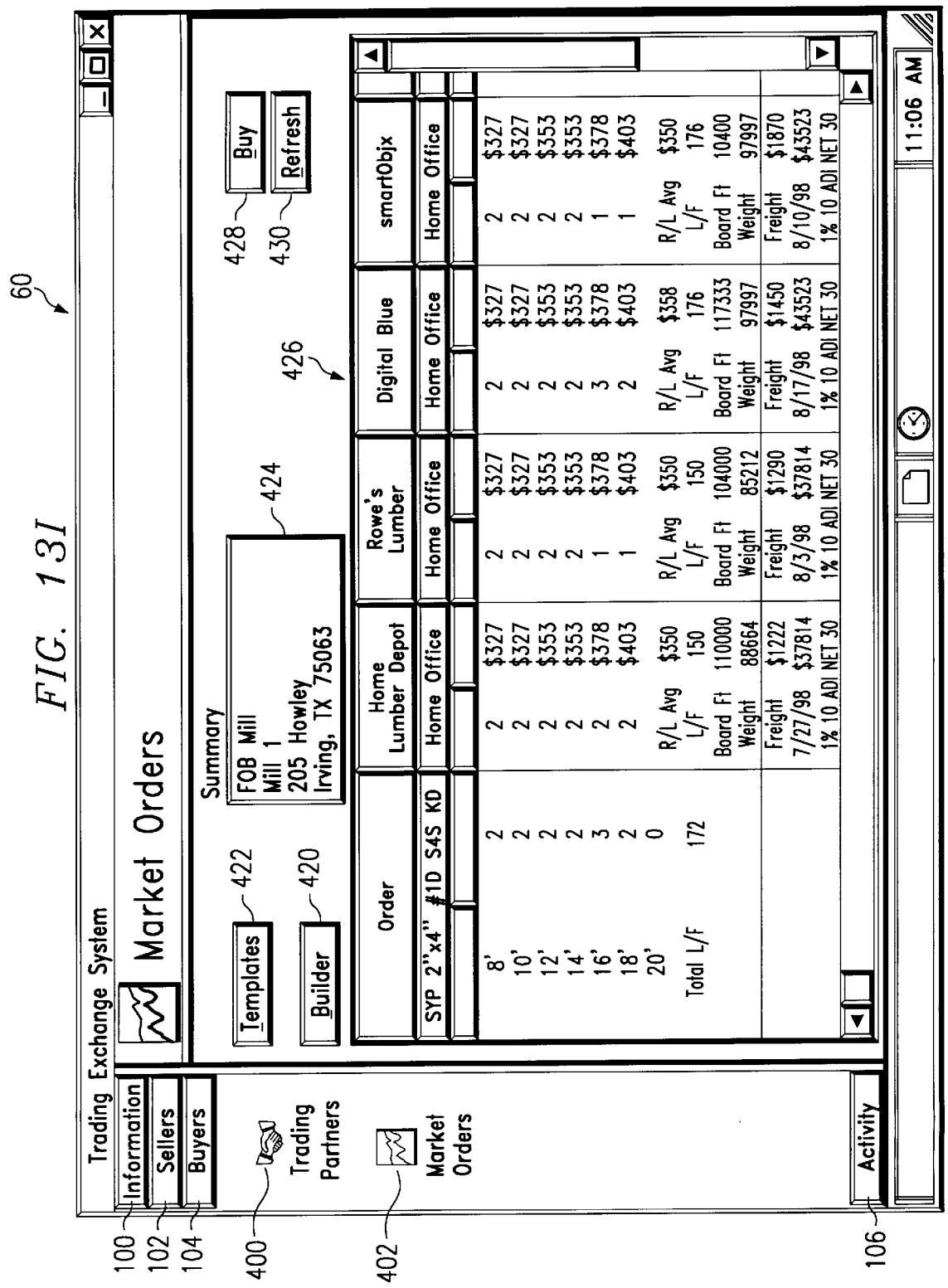

Platform 18 then communicates the offer data to buyer client 22 for presentation, as illustrated in FIG. 13I. The offer data may be presented to the user of a trading client 26 in Offer Data field 426 arranged, in one embodiment, according to sorting parameters established by buyer client 22, including price, availability, location, delivery time, or any other suitable market order parameter. Summary field 424 displays delivery information such as the freight calculation method selected by the buyer client 22 and the deliver location of the load. A user of buyer client 22 may initiate a buy request by selecting a business location of a particular seller client 24 from which buyer client 22 will buy the selected product and by activating Buy button 428. The user may update the displayed offer data by activating Refresh button 430.

In addition to initiating a buy query for a new market order, a buyer client 22 may also initiate a buy query for a market order that is saved as a template. In particular, a user of buyer client 22 may activate Template button 422 to display a list of saved market order templates. The user may select a particular market order template and communicate to platform 18 a buy query embodying the information from the selected template to retrieve offer data, as described above.

Figure 13J:
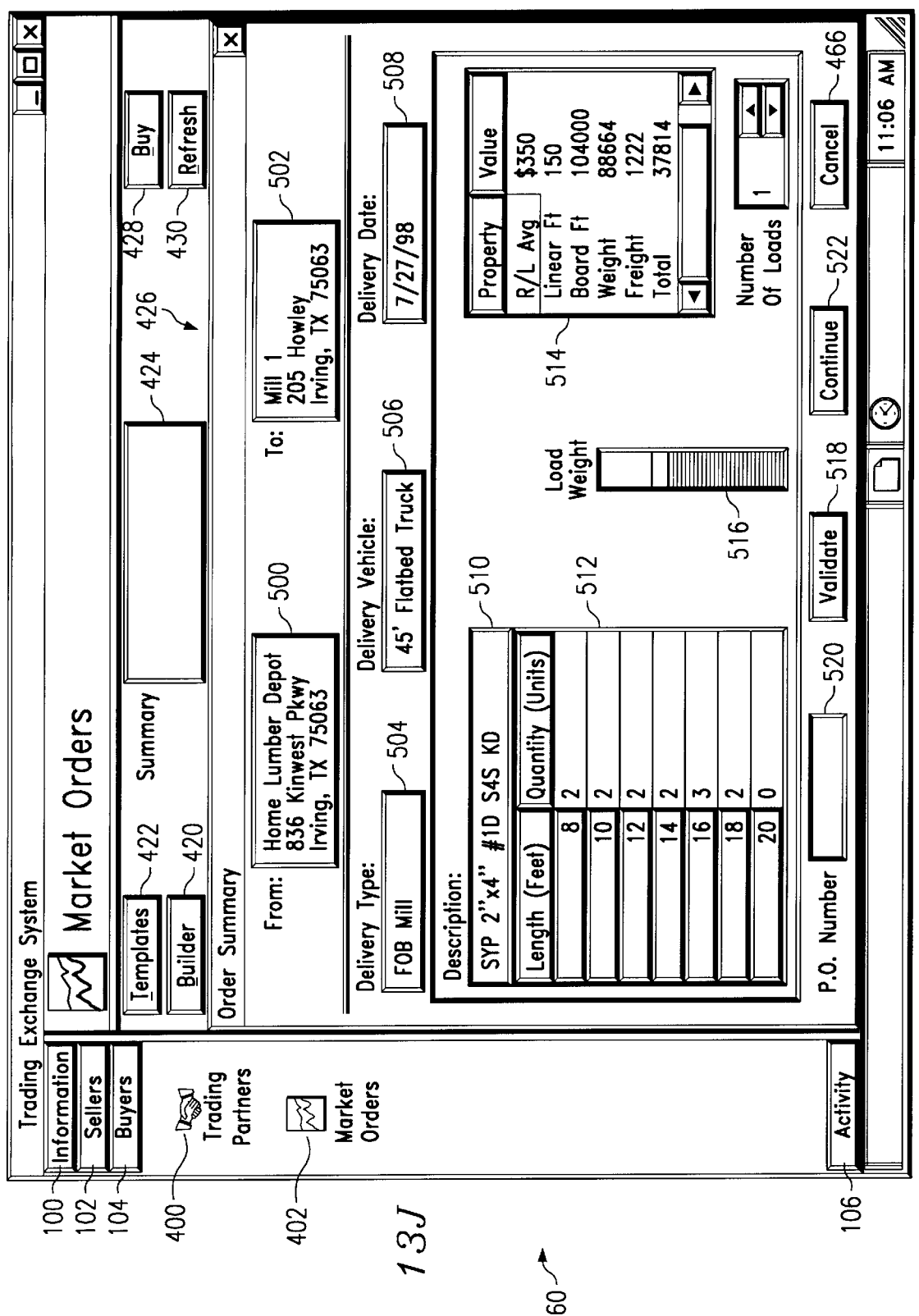

FIG. 13J illustrates a user interface screen associated with Market Orders subgroup 402 that appears when buyer client 22 initiates a buy request. A "From" field 500 identifies the selected business location from which buyer client 22 will buy the selected product, such as an origination location for the load, and a "To" field 502 identifies the selected destination location for the load. A Delivery Type field 504 displays the freight calculation data selected by the buyer client 22 to be used by platform 18 to determine the delivery costs, a Delivery Vehicle field 506 displays the delivery container selected by buyer client 22, and a Delivery Date field 508 indicates a particular week of offering selected by buyer client 22. A Description field 510 summarizes the selected forest product and a Quantity field 512 identifies the number of units of the selected forest product specified in the load requested by buyer client 22. In one embodiment, the quantity of units are specified for each length of the product in the load.

Based upon the offer data retrieved by platform 18, Load Parameters field 514 displays load parameters of a given load calculated based upon the specific products offered by a particular seller client 24 at a particular business location. For example, the Load Parameters field 514 may include a weight amount for the generated load based upon the actual weights of the forest products offered by the seller client 24 at the specified business location. As discussed above with reference to FIG. 13F, in one embodiment, the Load Balance Indicators 486 and 488 may use industry averages to calculate the load parameters of a given load. Therefore, a Load Balance Indicator 516 is included to represent graphically the requested load in comparison with the maximum load parameter of the selected delivery container using the actual load parameter values for a particular product displayed in field 514 rather than the industry average values for the load parameters. By using the specific load parameters of a particular product, buyer client 22 may more accurately optimize the capacity of the delivery container. In particular, a buyer client 22 may recalculate, or "top-off," the load capacity of the selected delivery container using the actual load parameters of the selected products as offered by particular seller clients 24 to adjust the quantity of units specified in a given load.

For example, if the product offered by a particular seller client 24 is heavier than the industry average weight of the product used to calculate the load configuration, then a user of buyer client 22 or buyer client 22 automatically may reduce the quantity of units of the product in the load until the weight of the load no longer exceeds the maximum weight capacity of the selected delivery container as indicated graphically by Load Balance Indicator 516. Similarly, if the product offered by a particular seller client 24 is lighter than the industry average weight of the product used to calculate the load configuration, then a user of buyer client 22 or buyer client 22 automatically may increase the quantity of units of the products in the load until the weight of the load approaches the maximum weight capacity of the selected delivery container.

Upon determining an adjusted load, a user of buyer client 22 validates the buy request by activating Validate button 518. Activating Validate button 518 communicates to platform 18 a buy request for the load. In one embodiment, delivery information such as the selected delivery container, the origination location of the load, and the destination location of the load is communicated to platform 18 in a delivery request as a part of the buy request. Platform 18 determines whether the selected seller client 24 is a valid trading partner of buyer client 22 and whether the specified business location of the selected seller client 24 can satisfy the load requested by buyer client 22 based upon the price and availability of the selected product, the price and/or inventory exposure adjustments for the product, and the minimum and maximum load limits established by the seller client 24. Platform 18 may also determine whether the buy request initiated by buyer client 22 causes buyer client 22 to exceed the credit terms, such as credit and/or commitment limits, established by the selected seller client 24. Platform 18 denies the buy request if the selected seller client 24 is not a valid trading partner of buyer client 22 and/or if the selected business location cannot satisfy the buy request. In one embodiment, platform 18 also denies the buy request if the buyer client 22 exceeds a credit term established by the selected seller client 24.

If platform 18 validates the buy request then a user of buyer client 22 may enter a purchase order number in P.O. Number field 520 to identify the buy request and activate Continue button 522 to communicate the validated buy request to platform 18. Upon receiving the validated buy request, platform 18 identifies the Purchase Order Number specified by buyer client 22, and, optionally, a Sales Order number specified by the selected seller client 24. Platform 18 then associates the Purchase Order Number with the Sales Order number using a Transaction Lock Number, or some other suitable associative indicator. Platform 18 stores transaction data embodying the terms of the sale transaction including, but not limited to, a date and time stamp of the transaction, information about seller client 24, delivery information, payment terms and payment method, and the agreed upon terms included in the buy request. Furthermore, platform 18 updates the stored inventory data for the seller client 24 to reflect the effect of the sale transaction.

Figure 14:
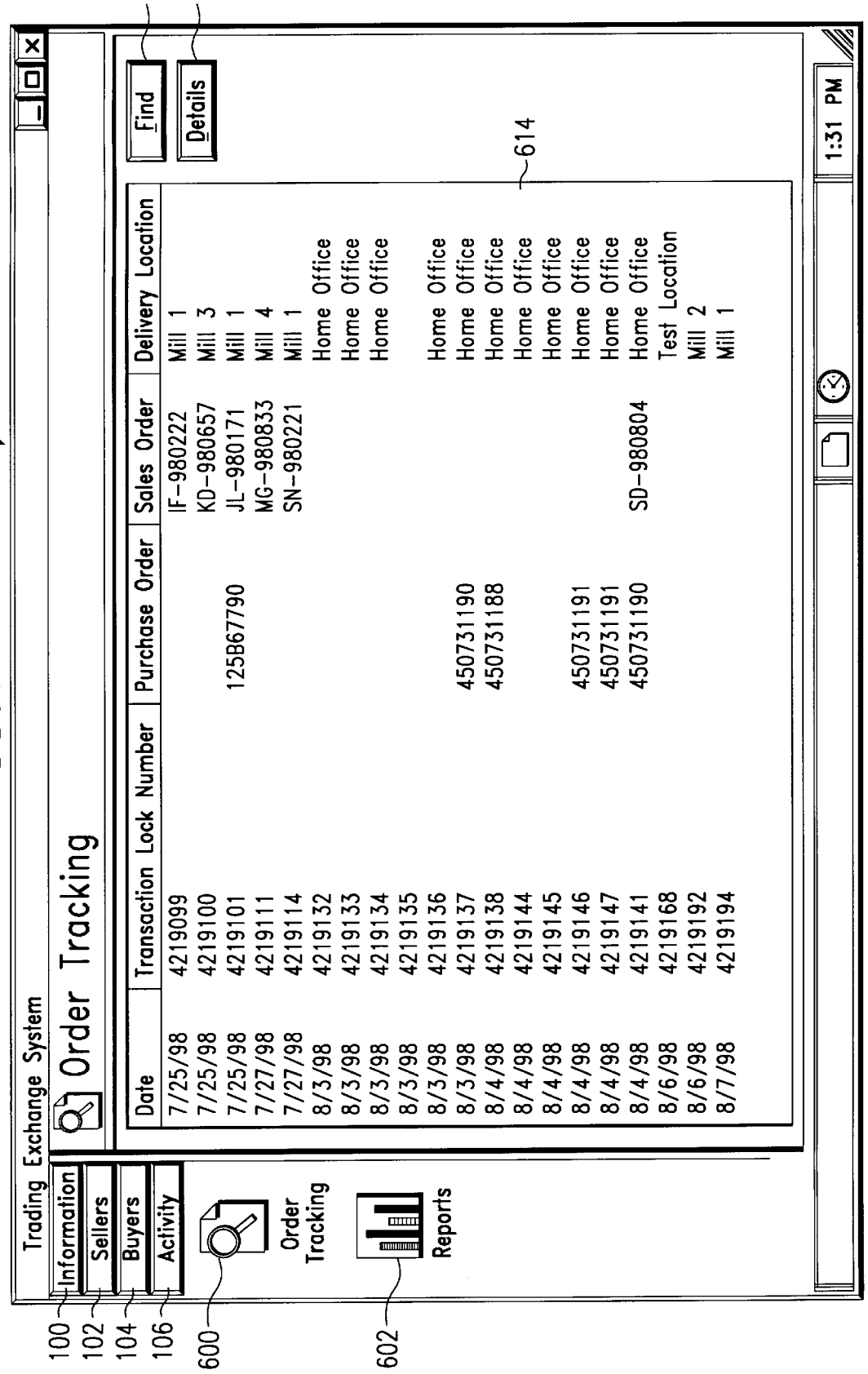
FIG. 14 illustrates an exemplary display of a graphical user interface for an Activities group having an Order Tracking subgroup supported by the trading exchange system.

FIG. 14 illustrates a user interface screen associated with Activities group 106 that includes an Order Tracking subgroup 600 and a Reports subgroup 602. Order Tracking subgroup 600 enables a user of trading client 26 to search and review prior market orders processed by platform 18 based on a variety of criteria selected by the trading client 26. In particular, Order Tracking subgroup 600 includes a Find button 610, a Details button 612, and a Market Orders field 614. A user of trading client 26 may activate Find button 610 to search market orders based upon Purchase Order Number, Sales Order Number, Transaction Lock Number, order date, delivery date, or any other suitable search parameter. Trading client 26 communicates to platform 18 the search queries specifying the selected search parameters.

Platform 18 receives the search query and communicates the offer data to the user of a trading client 26 for presentation in Market Orders field 614. A user of trading client 26 may then select a particular market order from Market Orders field 614 and retrieve details regarding the market order by activating Details button 612. Activating Details button 612 allows the trading client 26 to access general information, detailed information, shipping information, and tracking information regarding the selected market order. In particular, the general information may include transaction information such as the Transaction Lock Number, the order date, the delivery date, the status of the transaction, and the cost of the market order. The general information may further include buyer information such as the address of buyer client 22 and the Purchase Order number, and seller information such as the address of seller client 24 and the Sales Order Number.

The detailed information about the market order may include the total price of the market order, the order date, the number of loads in the market order, and any other specific details about the agreed upon transaction. For example, the order details may include the specific product, the unit price of the product, the number of units of the product, the total price for the product, and any other piece of transaction data stored by platform 18.

Shipping information may include the delivery or destination location of the load, the selected delivery type, the selected delivery container, and billing information for the load. Tracking information may include the delivery status of the load as well as the products, quantity, and price of the load that is actually delivered to the delivery location. A buyer client 22 may compare the tracking information entered by seller client 24 with the details of the order to determine whether the load actually delivered matches the load requested by buyer client 22.

Reports subgroup 602 allows a trading client 26 to generate reports regarding the inventory data, the profile data, and the market order data stored by platform 18. In particular, a trading client 26 communicates a query parameter to platform 18 identifying a particular type of requested report. Platform 18 searches the data stored in memory 32 to retrieve the report information and then communicates the report information for formatting and presentation to the user of a trading client 26.

Platform 18 may determine delivery costs for a load based upon freight calculation data generated by buyer clients 22 and/or seller clients 24, and delivery information specified by a delivery request generated by a buyer client 22. In particular, a trading client 26 generates freight calculation data and communicates it to platform 18 using communication network 20. A buyer client 22 communicates to platform 18 a delivery request for a load. In one embodiment, the delivery request is communicated as a part of a buy query and/or a buy request as described above with regard to FIGS. 13H and 13J. The delivery request specifies a delivery container, an origination location for the load, and a destination location for the load. The delivery request and/or the associated buy request specifies a particular business location supported by a selected seller client 24 from where the load is requested. In one embodiment, the business location supported by a selected seller client is the origination location of a load purchased from that business location. Platform 18 determines a delivery cost for the load using a selected one of the freight calculation data generated by the buyer client 22 or the freight calculation data generated by the seller client 24 based on the specified delivery container, origination location, and destination location.

Figure 15A:
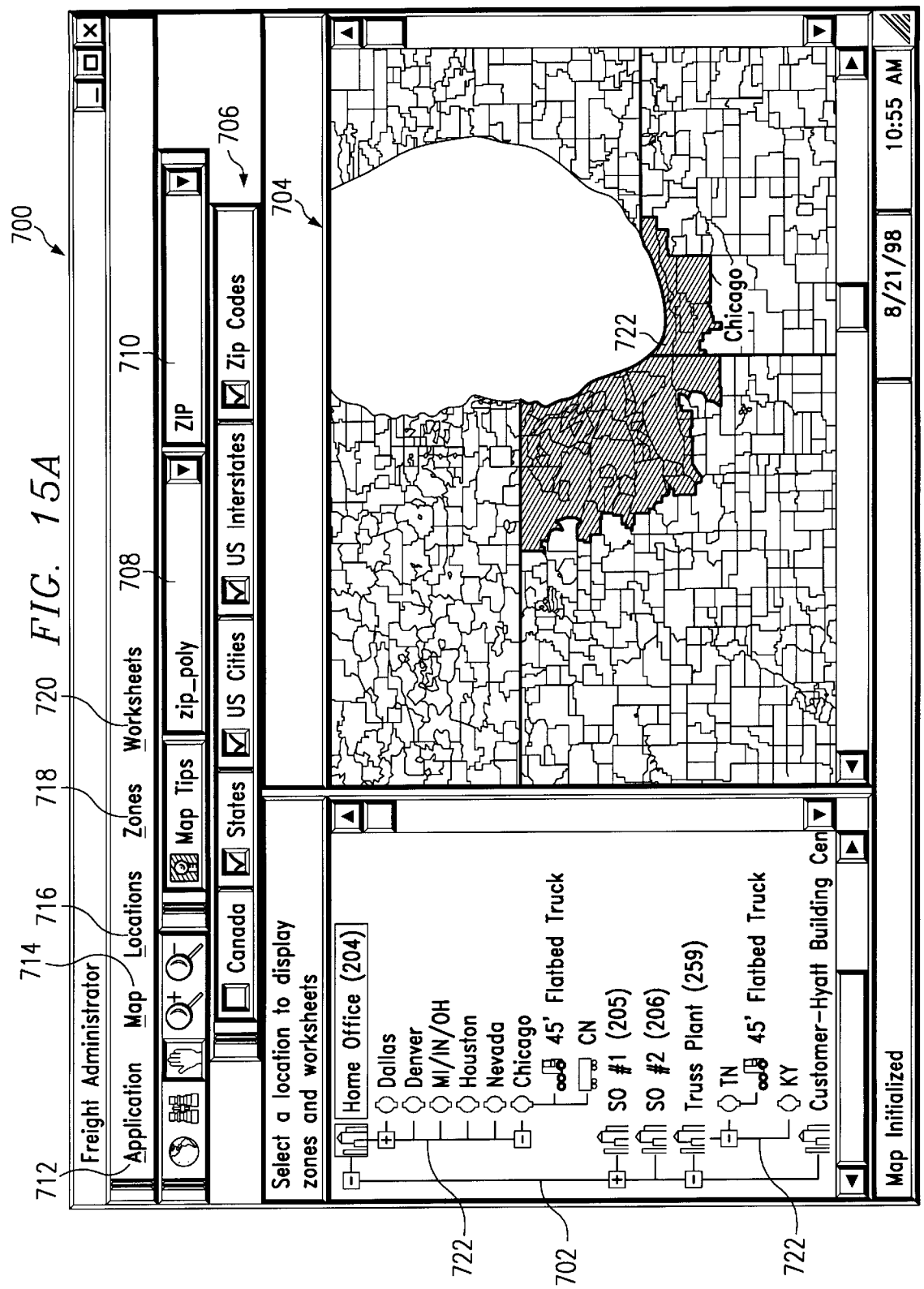
FIGS. 15A–15D illustrate exemplary displays of a graphical user interface for freight calculation using the trading exchange system.

FIG. 15A illustrates a graphical user interface (GUI) 700 that provides an easy-to-use interactive interface for a user of a trading client 26 to implement the freight calculation features and functions of the trading exchange application. GUI 700 includes a Business Location Selection Tree 702, a Map Display 704, Map Control fields 706–710 and Freight Administrator menus 712–720. In general, a user of a trading client 26 may generate freight calculation data using GUI 700. Trading clients 26 may support multiple business locations using trading exchange system 10. Each business location may support a number of delivery containers to deliver loads. For example, a business location may support a number of different types of trucks, railcars, barges, airplanes, modular containers, or any other suitable delivery container to deliver loads. For each delivery container supported by a particular business location, a user of a trading client 26 generates freight calculation data that is used by platform 18 to calculate delivery costs for a load that is delivered using that delivery container.

A user of trading client 26 may select a particular business location supported by trading client 26 using Business Location Selection Tree 702. For each supported business location, a user of trading client 26 may specify unique destination zones 722 that associate destination locations having common freight calculation data for a particular delivery container. Destination zones 722 define a geographic region based upon a group of zip codes, service point location codes, or any other suitable geographic indicators. In one embodiment, a user of trading client 26 may create destination zones 722 graphically by defining geographic regions on Map Display 704 arranged according to, for example, zip codes. For example, a user of trading client 26 may graphically create for a particular business location, such as the "Home Office," a "Chicago" destination zone that defines a geographic region associated with all of the zip codes in the city of Chicago. The user may further create a "Dallas" destination zone that defines a geographic region associated with all of the zip codes in the city of Dallas.

For each delivery container supported at the "Home Office" business location, a user of trading client 26 may generate first freight calculation data for deliveries to destination locations in the "Chicago" destination zone, second freight calculation data for deliveries to destination locations in the "Dallas" destination zone, and additional freight calculation data for deliveries to destination locations in the remaining destination zones 722 for the selected business location. When a load is delivered by a particular delivery container to a destination location in the "Chicago" destination zone, platform 18 determines delivery costs for the load using the first freight calculation data for that delivery container. When a load is delivered by the same delivery container to a destination location in the "Dallas" destination zone, platform 18 determines delivery costs for the load using the second freight calculation data for that delivery container. By grouping destination locations into destination zones 722, a user of trading client 26 may generate common freight calculation data to calculate delivery costs for deliveries made to any of the constituent destinations locations using a particular delivery container. Furthermore, by customizing freight calculation data for delivery containers according to destination zones 722, a user of trading client 26 may account for geographic, market, and other factors that may differ among different destination zones 722 when determining delivery costs.

Fields 708 and 710 allow a user of trading client 26 to view specific information about a geographic location identified by a cursor on Map Display 704. For example, a user may view the zip code of the geographic location currently identified by the cursor on Map Display 704. An Application menu 712 allows the user of trading client 26 to perform various system operations, such as exiting GUI 700. A Map menu 714 allows a user of trading client 26 to perform one or more of the same features and functions provided by fields 706–710 in a menu format. A Location menu 716 allows a user of trading client 26 to access an FOB Mill Delivery Worksheet, described in more detail with reference to FIG. 15D. A Zones menu 718 allows a user of trading client 26 to create and save a new destination zone 722 for a particular business location of a trading client 26, or delete an existing destination zone 722 from a business location. A Worksheet menu 720 allows a user of trading client 26 to access a Truck Freight Calculation Worksheet and/or a Rail Freight Calculation Worksheet, which are described in more detail with reference to FIGS. 15B and 15C, respectively. The user may create a new worksheet, edit an existing worksheet, or delete an existing worksheet using menu 720.

Figure 15B:
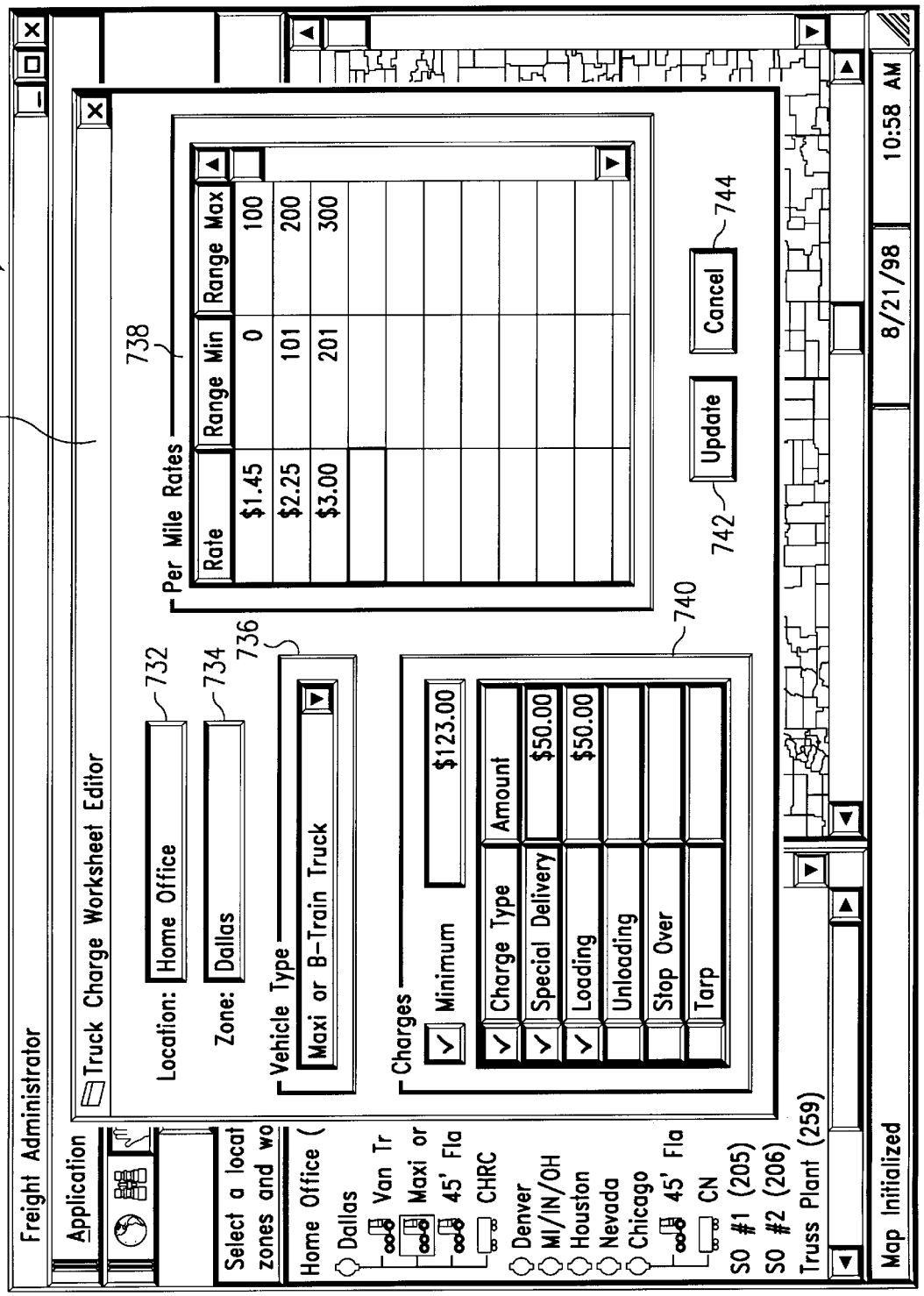

FIG. 15B illustrates GUI 700 that includes a Truck Freight Calculation Worksheet 730. A user of trading client 26 uses worksheet 730 to generate freight calculation data for a truck type delivery container. In one embodiment, as described above, the user may generate different freight calculation data for a particular delivery container according to the selected destination zone 722. For example, FIG. 15B illustrates worksheet 730 having freight calculation data for a "Maxi or B-Train Truck" for deliveries to delivery locations in the "Dallas" destination zone. Worksheet 730 includes Business Location field 732, Destination Zone field 734, Delivery Container field 736, Delivery Distance/Rate fields 738, Truck Charges fields 740, Update button 742, and Cancel button 744.

In operation of worksheet 730, a user of trading client 26 selects a particular business location and destination zone 722 for worksheet 730 in fields 732 and 734, respectively. The user selects a particular type of delivery container supported by the selected business location in Delivery Container field 736. For the selected delivery container supported at the selected business location, the user generates freight calculation data for deliveries to destination locations in the selected destination zone 722. Where the delivery container is a truck, the user may enter delivery distance and delivery rate information in fields 738 and other delivery charges associated with a truck in fields 740.

In one embodiment, the user specifies a number of delivery distance ranges, such as mileage ranges, between an origination location and a destination location. The mileage ranges are defined by a "Range Minimum" and a "Range Maximum" in fields 738. For each mileage range, the user specifies a particular delivery rate for each mile that the load is shipped within that range. For example, for the mileage range of zero to one hundred miles, the delivery rate charged for each mile that a load is shipped within that range may be "$1.45," as illustrated in FIG. 15B. Furthermore, for the mileage range of one hundred one to two hundred miles, the delivery rate charged for each mile that the load is shipped within that range may be "$2.25." Moreover, for the mileage range of two hundred one to three hundred miles, the delivery rate charged for each mile that the load is shipped within that range may be "$3.00."

In another embodiment, the user specifies for each mileage range a particular delivery rate for each mile that a specified weight of the load is shipped. In yet another embodiment, the user specifies for each mileage range a flat delivery rate for deliveries made to any destination location within that range. Although the previous description of the delivery distance ranges is detailed with reference to mileage ranges, it should be understood that the present invention contemplates calculating delivery costs for any unit of distance.

A user may further specify other delivery costs associated with a truck in fields 740. For example, the user may include a minimum truck charge below which the delivery costs may not fall, special delivery costs, loading and unloading charges, stop-over charges, tarp covering charges, and any other suitable charge associated with a truck type delivery container. A user may activate Update button 742 to communicate to platform 18 the generated freight calculation data for storage. The user may activate Cancel button 744 to restore all information in fields 732–740 to the state it was in prior to the last activation of Update button 742.

In one embodiment, the freight calculation data for a delivery container associated with a particular destination zone 722 may include a representative destination location to be used for all delivery cost calculations to that destination zone 722. For example, the freight calculation data for a truck type delivery container of a destination zone 722 that contains multiple zip codes may be assigned a representative zip code to be used for all mileage calculations from an origination location to that destination zone. In this embodiment, platform 18 determines the delivery cost for the load using the freight calculation data based upon the specified delivery container, and the mileage between the origination location and a destination location within the representative zip code of the appropriate destination zone 722. This type of "corridor pricing" is useful in those areas where a large number of zip codes define a metropolitan area, such as Dallas, and the delivery costs to destination locations in that area have negligible differences between them. If the freight calculation data for a particular delivery container does not include a representative destination location for mileage calculations, platform 18 determines delivery costs for a load using the freight calculation data based upon the specified delivery container and the mileage between the origination location and each destination location specified in the delivery request.

Figure 15C:
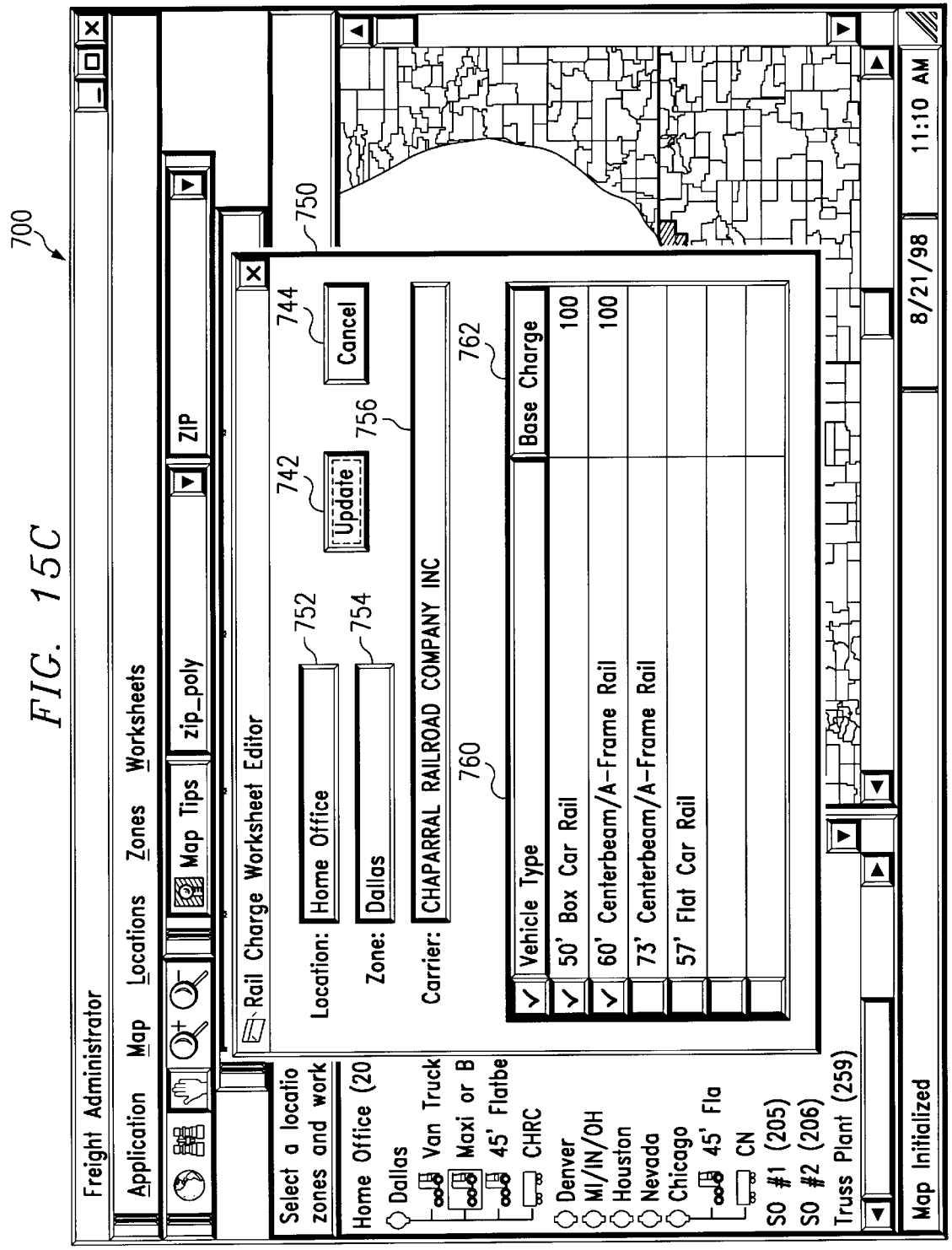

FIG. 15C illustrates GUI 700 that includes a Rail Freight Calculation Worksheet 750. A user of trading client 26 uses worksheet 750 to generate freight calculation data for a railcar type delivery container. In one embodiment, as described above, the user may generate different freight calculation data for a particular delivery container according to the selected destination zone 722. For example, FIG. 15C illustrates worksheet 750 having specific freight calculation data for a "50' Box Car Rail," "60' Centerbeam/A-Frame Rail," "73' Centerbeam/A-Frame Rail," and "57' Flatcar Rail" of the Chaparral Railroad Company Inc. for deliveries to delivery locations in the "Dallas" zone. Worksheet 750 includes Business Location field 752, Destination Zone field 754, Railcar Carrier field 756, Railcar Type fields 760, Delivery Rate fields 762, Update button 742, and Cancel button 744.

In operation of worksheet 750, a user of trading client 26 selects a particular business location and destination zone for worksheet 750 in fields 752 and 754, respectively. The user selects a particular type of railcar carrier supported by the selected business location and the selected destination zone in Railcar Carrier field 756. Railcar Type fields 760 indicate the various railcar types supported by the selected railcar carrier. A user may select particular railcar types by activating the appropriate checkboxes in field 760. For each selected railcar type, the user may specify a particular delivery rate for deliveries made to a destination location in the selected destination zone using that railcar type. Platform 18 determines delivery costs for a load delivered by a railcar carrier using the specified delivery rates included in the freight calculation data based upon the specified delivery container, the origination location of the load, and the destination location of the load.

For example, for a delivery made from an origination location at or near the "Home Office" business location of trading client 26 to a destination location in the "Dallas" zone using a "50' Box/Car Rail" of the Chaparral Railroad Company Inc., platform 18 determines the delivery costs to be one-hundred dollars. For the same delivery using a "60' Centerbeam/A-Frame Rail" of the Chaparral Railroad Company Inc., platform 18 determines the delivery costs to be two-hundred dollars. A user may activate Update button 742 to communicate to platform 18 the generated freight calculation data for storage. The user may activate Cancel button 744 to restore all information in fields 752–762 to the state it was in prior to the last activation of Update button 742.

Figure 15D:
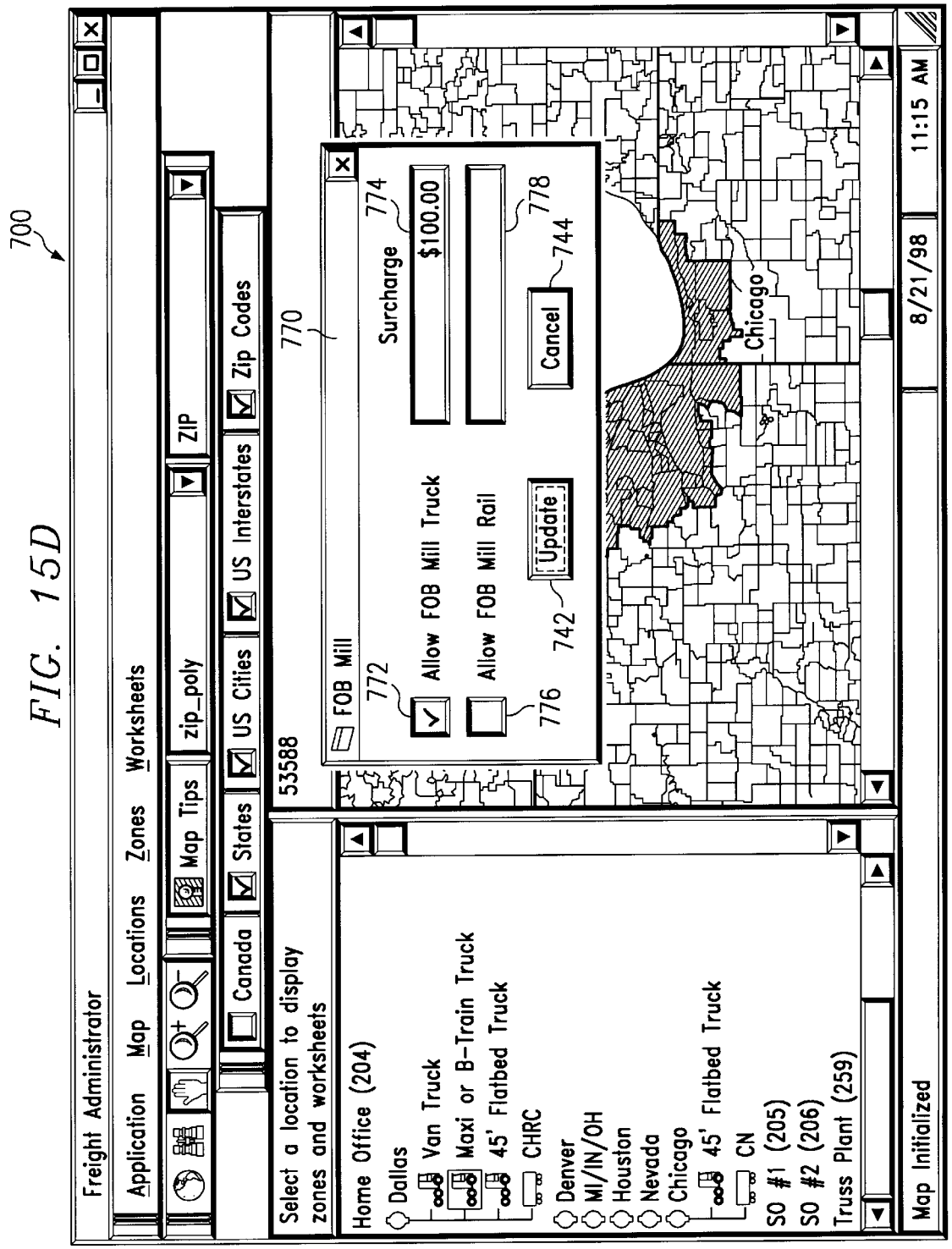

FIG. 15D illustrates an FOB Mill Selection Worksheet 770 that allows a particular seller client 24 to determine whether or not a particular business location will allow "FOB Mill" deliveries. Worksheet 770 includes FOB Mill Truck checkbox 772, FOB Mill Truck Charge field 774, FOB Mill Rail checkbox 776, FOB Mill Rail Charge field 778, Update button 742, and Cancel button 744. A user of seller client 24 may authorize FOB Mill Truck and/or FOB Mill Rail deliveries by activating the appropriate check boxes 772 and 776, and by specifying an associated charge in fields 774 and 778.

By authorizing "FOB Mill" deliveries, a seller client 24 allows a buyer client 22 to arrange for delivery of the load from the selected business location. In particular, the buyer client 22 is presented with the option to enter the business location of seller client 24 and retrieve the load, to arrange for delivery of the load from the business location to the destination location, or to request that the seller client 24 deliver the load to the destination location. If buyer client 22 elects to retrieve the load from the business location or to arrange for delivery of the load from the selected business location, then platform 18 uses the freight calculation data of buyer client 22 to determine the delivery costs. Therefore, by activating FOB Mill Truck checkbox 772 a seller client 24 authorizes a buyer client 22 to select its own freight calculation data to be used by platform 18 to determine delivery costs where the delivery container is a truck. Similarly, by activating FOB Mill Rail checkbox 776 a seller client 24 authorizes a buyer client 22 to choose its own freight calculation data to be used by platform 18 to determine delivery costs using a railcar delivery container.

A user of trading client 26 may activate Update button 742 to communicate to platform 18 the FOB Mill delivery data for storage. The user may activate Cancel button 744 to restore all information in fields 772–778 to the state it was in prior to the last activation of Update button 742.

FIG. 16 is a flow chart of an exemplary method for trading products executed on platform 18 using system 10. Platform 18 receives and stores data from seller clients 24 and receives and processes buy queries and/or buy requests from buyer clients 22, as illustrated by the two paths in the flow chart of FIG. 16. Platform 18 may execute the processes illustrated by the two paths concurrently using multi-threaded processing techniques. Referring to path 800, platform 18 receives inventory data from a number of seller clients 24 at steps 804. In particular, platform 18 receives inventory data for each product offered by a seller client 24 at a particular business location. For each product, platform 18 receives unit, weight, and load configuration data at step 806. The unit configuration data defines how many pieces of the product constitutes one product unit. The weight configuration data defines the weight of the product per one thousand board-feet. The load configuration data defines in which types of loads a particular forest product may be delivered. The load configuration data further defines maximum load limits, minimum load limits, and/or price adjustments for each particular load type.

For each product, platform 18 receives price and availability data at step 808. The price data defines the base price for a unit of the product. The availability data defines the available units of a product at a particular business location as well as the number of units of the product actually offered by the business location using system 10. In one embodiment, the price data, the availability data, and/or the load configuration data is received according to a particular time period, such as a particular week of offering. Platform 18 stores the inventory data received from the seller clients 24 at step 810.

Platform 18 receives profile data from seller client 24 at steps 812. Platform 18 receives trading partner data at step 814. In particular, each seller client 24 identifies one or more trading clients 26 as trading partners that are authorized to purchase products from the particular seller client 24. In addition to receiving the identity of a particular trading client 26 that is a trading partner of seller client 24, platform 18 receives credit terms for each trading partner, such as credit limits, commitment limits, and/or transaction terms. Platform 18 receives trading preferences data at step 816. In particular, platform 18 receives from each seller client 24 a trading group associated with a particular business location. The trading group identifies particular trading partners of the seller client 24 and a price and/or inventory exposure adjustment for those trading partners. Platform 18 stores the profile data at step 818.

Referring to path 802, platform 18 receives a buy query from a buyer client 22 at step 830. The buy query includes a market order that may specify a particular product, a number of units of the product per load, the number of loads of the product per market order, a delivery container, and any other suitable market order parameters used by buyer client 22 to search the inventory data. Platform 18 identifies the buyer client 22 that communicated the buy query at step 832. Platform 18 identifies a seller client 24 that is specified by the particular buyer client 22 as a trading partner, at step 834. Platform 18 determines whether the buyer client 22 has a bidirectional trading relationship with the identified seller client 24 at step 836. In particular, platform 18 searches the profile data established by the identified seller client 24 for the buyer client 22 to determine whether the seller client 24 also selected the buyer client 22 as a trading partner.

If a bidirectional trading relationship between the identified seller client 24 and the particular buyer client 22 does not exist, execution returns to step 834 where platform 18 identifies another seller client 24. If a bidirectional trading relationship does exist between the seller client 24 and the buyer client 22, execution proceeds to step 838 where platform 18 retrieves offer data of the particular seller client 24 based upon the inventory data communicated by the seller client 24 and the profile data established by the seller client 24 for the buyer client 22. The process of retrieving offer data by platform 18 described with reference to step 838 is described in greater detail below in FIG. 17.

Platform 18 determines whether there are any remaining seller clients 24 specified by buyer client 22 as a trading partner, at step 840. If so, execution returns to step 834 where platform 18 identifies another seller client 24. If not, execution proceeds to step 842 where platform 18 sorts the offer data according to any sort parameters identified by the buyer client 22. For example, platform 18 may sort the offer data according to price, location, availability, date of delivery, or any other suitable sort parameter. Platform 18 communicates the offer data to buyer client 22 at step 844.

Platform 18 determines whether it received a by request from the buyer client at step 846. The buy request specifies a number of units of a particular product offered by a selected seller client 24 at a particular business location. The buy request may further specify delivery information, such as a delivery date and a delivery container; load configuration information, such as whether the product is to be delivered in a straight load, mixed load, or random length load; and particular seller services offered by the selected seller client 24. In one embodiment, the buy request includes a delivery request that specifies delivery information, such as a delivery data, a delivery container, an origination location for the load, and a destination location for the load. If platform 18 does not receive a buy request, execution returns to the start of the flow chart illustrated in FIG. 16.

If platform 18 does receive a buy request as determined at step 846, platform 18 determines whether the buy request can be satisfied at step 848. In one embodiment, platform 18 verifies that there is a bidirectional relationship between the buyer client 22 and the selected seller client 24. In another embodiment, platform 18 determines whether the specified business location of the selected seller client 24 can satisfy the buy request issued by the buyer client 22 based upon the price and availability of the selected product, the price and/or inventory exposure adjustments for the product, the minimum and maximum load limits established by the seller client 24, and the credit terms, such as credit and/or commitment limits, established by the seller client 24. If the buy request is not satisfied, execution proceeds to step 850 where platform 18 denies the buy request and, optionally, notifies buyer client 22 of the reason for the denial. If the buy request is satisfied, execution proceeds to step 852 where platform 18 executes a sale transaction. In one embodiment, platform 18 associates a Purchase Order Number for the buy request to a Sales Order Number of the seller client 24 by a Transaction Lock Number. Platform 18 stores transaction data embodying the sale transaction at step 854. Platform 18 updates the inventory data of the selected seller client 24 and/or the profile data of the buyer client 22 at step 856 and notifies the buyer client 22 and the seller client 24 of the sale transaction. Execution then returns to the start of the flow chart illustrated in FIG. 16.

Figure 17:
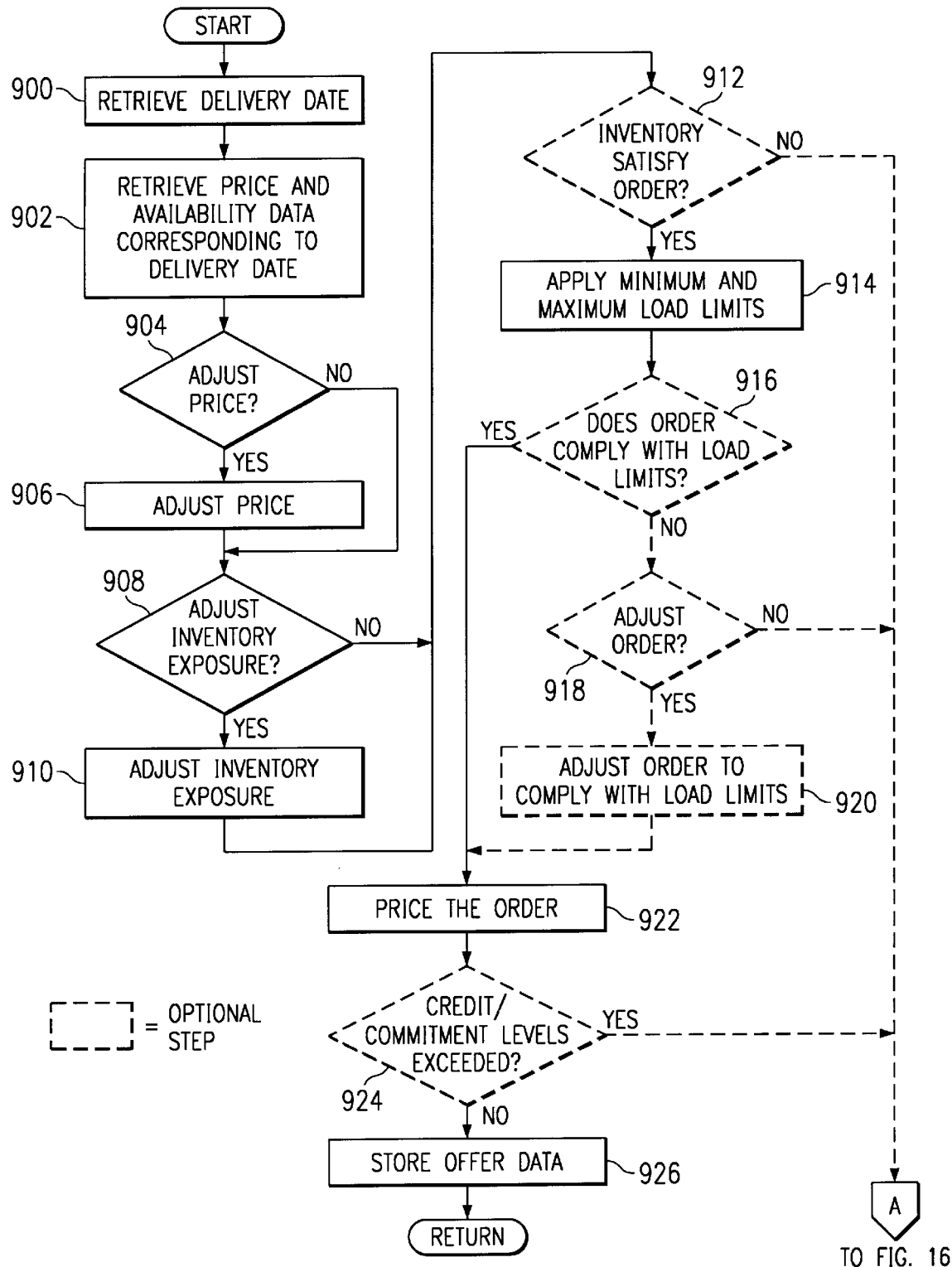
FIG. 17 illustrates an exemplary method for retrieving offer data by a trading platform of the trading exchange system.

FIG. 17 illustrates a flow chart of an exemplary method for retrieving offer data by platform 18 of trading exchange system 10. In particular, the flow chart illustrated in FIG. 16 describes in more detail step 838 of the flow chart illustrated in FIG. 16. The method begins at step 900 where platform 18 retrieves the delivery date specified by the market order of the buy query communicated by the buyer client 22. Platform 18 retrieves the price and availability levels of the selected product based upon the delivery date of the load at step 902. Platform 18 determines whether to adjust the price of the selected product at step 904. In one embodiment, platform 18 accesses the trading preferences established by the selected seller client 24 for the buyer client 22 to determine whether any price adjustments have been specified. For example, seller clients 24 may specify price decreases to highly preferred buyer clients 22 and/or price increases for less preferred buyer clients 22. In another example, platform 18 determines whether the load configuration of the buy query warrants any price adjustments. For example, a seller client 24 may include a price adjustment for products sold in a straight load, mixed load, random length load, or any other suitable load type.

If platform 18 determines that the price of the selected product is to be adjusted, based upon any trading preferences established by the selected seller client 24 for the buyer client 22 and/or the load configuration of the market order query, then platform 18 adjusts the price accordingly at step 906. If platform 18 determines that the price of the selected product is not to be adjusted as determined at step 904, or the price adjustment is completed at step 906, then execution proceeds to step 908.

Platform 18 determines whether to adjust the inventory exposure of the selected product based upon any trading preferences established by the selected seller client 24 for the buyer client 22, at step 908. For example, seller clients 24 may offer greater inventory exposure to highly preferred buyer clients 22 and/or restricted inventory exposure to less preferred buyer clients 22. If platform 18 determines that an inventory exposure adjustment is to be made, execution proceeds to step 910 where platform 18 adjusts the inventory exposure accordingly. If no inventory exposure adjustments are to be made as determined at step 908, or the inventory exposure adjustment is completed at step 910, then execution proceeds to step 912 where platform 18 determines whether the adjusted inventory exposure for the selected product satisfies the market order specified in the buy query.

If seller client 24 does not expose inventory sufficient to satisfy the market order communicated by the buyer client 22, platform 18 may optionally prohibit buyer client 22 from viewing any inventory data of the particular seller client 24. In this case, execution returns to the start of the flow chart of FIG. 16. If the inventory exposure of the seller client 24 satisfies the buy query communicated by the buyer client 22, execution proceeds to step 914 where platform 18 applies the minimum and maximum load limits established by the selected seller client 24, based upon the load configuration specified by the market order communicated by the buyer client 22.

Platform 18 determines whether the market order complies with the established load limits at step 916. If the order exceeds a load limit, platform 18 may optionally determine whether to adjust the order to satisfy the load limits at step 918. If the order is not to be adjusted, platform 18 may prohibit buyer client 22 from viewing any inventory data of the particular seller client 24 and execution returns to the start of the flow chart illustrated in FIG. 16. If the market order is to be adjusted, platform 18 may adjust the market order to comply with the established load limits at step 920. If the market order specified by the buy query complies with the load limits as determined at step 916 or the market order is adjusted to comply with the load limits at step 920, execution proceeds to step 922 where platform 18 generates a price for the market order.

Platform 18 determines whether the buyer client 22 exceeds a credit term, such as a credit limit and/or a commitment limit, established by the seller client 24 for the buyer client 22 at step 924. If the market order exceeds either a credit limit or a commitment limit, platform 18 may optionally prohibit buyer client 22 from viewing any inventory data of the particular seller client 24, and execution returns to the start of the flow chart of FIG. 16. If the buyer client 22 does not exceed a credit and/or commitment limit, then execution proceeds to step 926 where platform 18 stores the offer data. Execution then proceeds to step 840 of the flow chart illustrated in FIG. 16.

Although the flow chart of FIG. 17 is detailed with reference to retrieving inventory data in response to a buy query communicated by buyer client 22, it should be understood that platform 18 may perform one or more of the individual steps illustrated in FIG. 17 to validate a buy request communicated by buyer client 22. In one embodiment, manufacturing and/or marketing forces may have caused the inventory and/or profile data stored by platform 18 to change in the period of time between retrieving offer data in response to a buy query and receiving a buy request from the buyer client 22. Therefore, re-executing one or more of the steps illustrated in the flow chart of FIG. 17 allows platform 18 to verify the ability of a particular seller client 24 to satisfy the buy request communicated by the buyer client 22.

Figure 18:
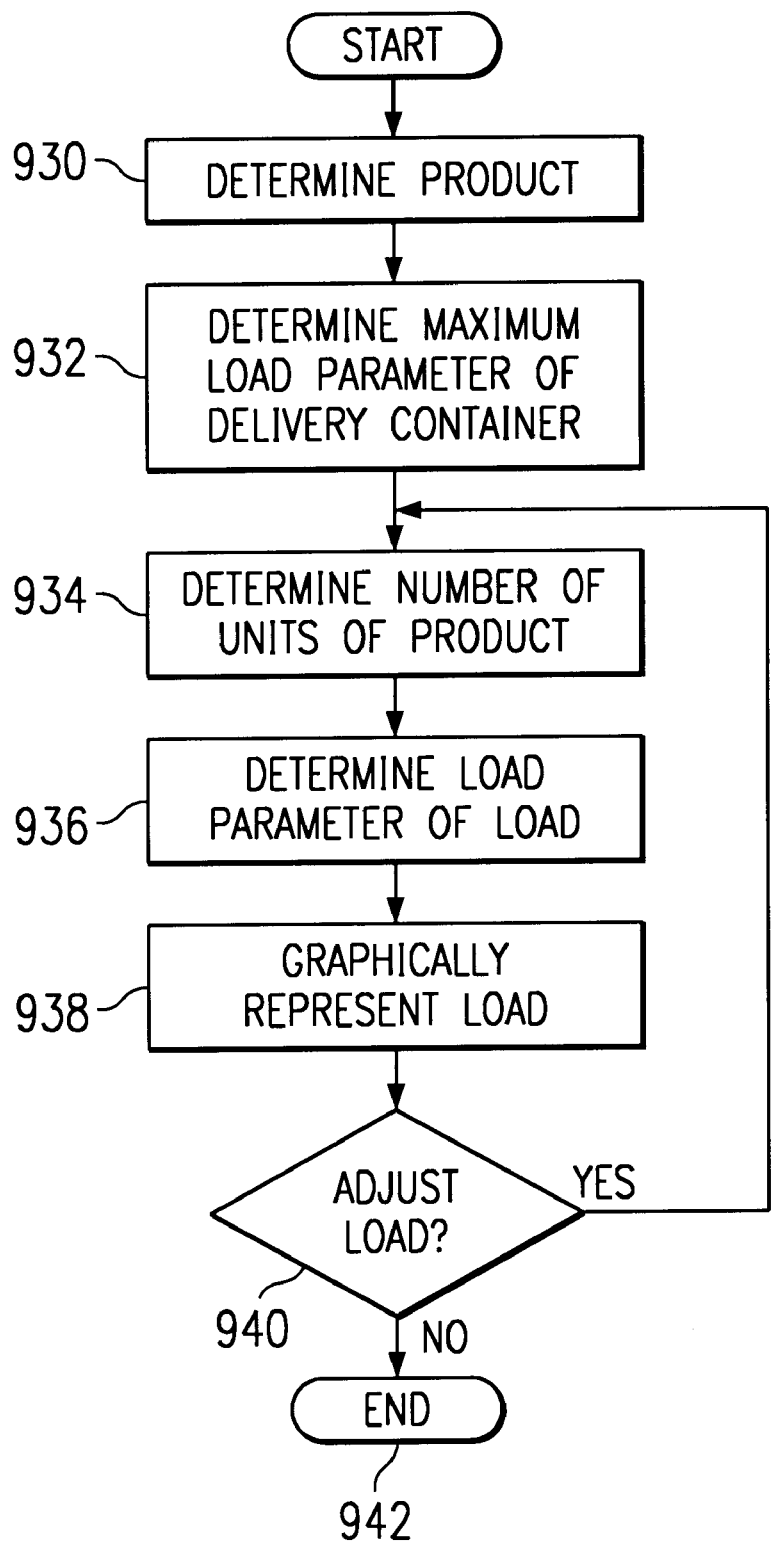
FIG. 18 illustrates an exemplary method for graphically representing a load to purchase using the trading exchange system.

FIG. 18 illustrates a flow chart of an exemplary method for graphically representing a load to purchase using trading exchange system 10. The method begins at step 930 where a user of buyer client 22 determines a particular product to be included in a load. The user determines a maximum load parameter of a delivery container at step 932. The load parameter of the delivery container may comprise a weight capacity of the delivery container, a volume capacity of the delivery container, or any other suitable load parameter of the delivery container. At step 934, the user of buyer client 22 determines a number of units of the product to generate a load. Platform 18 determines a load parameter of the load at step 936. Platform 18 may use industry averages to determine the load parameter of the load or it may use measurements of particular products offered by a particular seller client 24 to determine the load parameter of the load.

For example, if the load parameter is a weight measurement, then platform 18 may use industry average weight measurements for a particular product to determine the load parameter of the load, or it may use specific weight measurements of a particular product offered by a particular seller client 24 to determine the weight of the load. Buyer client 22 graphically represents the load parameter of the load in comparison to the maximum load parameter of the selected delivery container at step 938. Platform 18 determines whether the load is adjusted at step 940. In particular, platform 18 may determine whether the number of units of the product in the load has increased or decreased. If so, execution returns to step 934 where platform 18 determines the number of units of the product in the load. If the load has not been adjusted, execution terminates at step 942.

Figure 19:
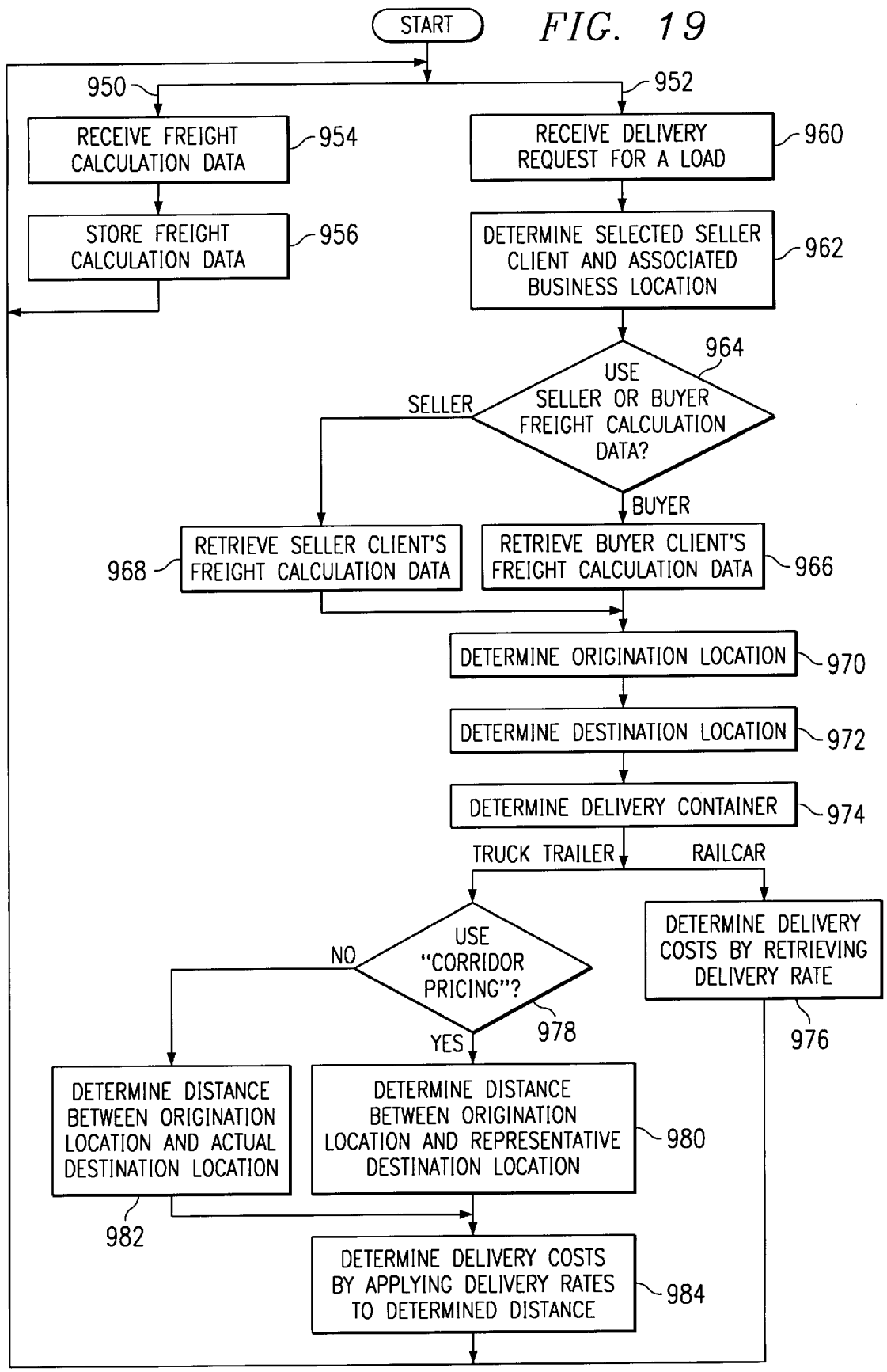
FIG. 19 illustrates an exemplary method for determining delivery costs by the trading platform using the trading exchange system.

FIG. 19 is a flow chart of an exemplary method for determining delivery costs executed on platform 18 using system 10. Platform 18 receives and stores data from trading clients 26 and receives and processes delivery requests from buyer clients 22, as illustrated by the two paths in the flow chart of FIG. 19. Platform 18 may concurrently execute the processes illustrated by the two paths using multi-threaded processing techniques. Referring to path 950, platform 18 receives freight calculation data for each delivery container supported by a business location of a trading client 26 at step 954. It should be understood that platform 18 may receive freight calculation data from both a buyer client 22 and a seller client 24. Platform 18 stores the freight calculation data received from the trading clients 26 at step 956.

Referring to path 952, platform 18 receives a delivery request for a load from buyer client 22 at step 960. Platform 18 may receive the delivery request as a part of a buy query and/or a buy request from buyer client 22 as described above with reference to FIGS. 13H and 13J. Platform 18 determines the selected seller client 24 and associated business location at step 962. Platform 18 determines whether to use the freight calculation data of the buyer client 22 or the seller client 24 in determining the delivery costs at step 964.

For example, if the seller client 24 authorizes the buyer client 22 to arrange for delivery of the load from the selected business location, as described above with reference to FIG. 15D, then buyer client 22 is presented with the option to request delivery of the load to the destination location by the seller client 24, "FOB Delivered," or arrange for delivery of the load from the selected business location, "FOB Mill." If a user of buyer client 22 activates the FOB Delivered field 450 of GUI 60 illustrated in FIG. 13A, then platform 18 uses the freight calculation data generated by the seller client 24 to determine delivery costs. If a user of buyer client 22 activates the FOB Mill field 450 of GUI 60 illustrated in FIG. 13A, then platform 18 uses the freight calculation data generated by the buyer client 22 to determine delivery costs. Platform 18 retrieves the freight calculation data of buyer client 22 or seller client 24 at step 966 or step 968, as determined at step 964.

Platform 18 determines the origination location specified by the delivery request at step 970. In one embodiment, the business location supported by a selected seller client is the origination location of a load purchased from that business location. Platform 18 determines the destination location specified by the delivery request at step 972. In one embodiment, platform 18 determines the appropriate destination zone of the selected business location based upon the destination location specified in the delivery request. Platform 18 determines the delivery container specified by the delivery request at step 974. Although the following description of the method for determining the delivery costs is detailed with respect to a truck trailer and a railcar, it should be understood that platform 18 may determine delivery costs for any type of suitable delivery container supported by system 10. If the delivery container specified by delivery request is a type of railcar, execution proceeds to step 976 where platform 18 determines delivery costs for a load by retrieving the appropriate delivery rates from the freight calculation data generated by either buyer client 22 or seller client 24 as determined at step 964 according to the origination location, the destination location, and the selected delivery container specified by the delivery request.

If the selected delivery container is a type of truck trailer, execution proceeds to step 978 where platform 18 determines whether to use "corridor pricing." In particular, platform 18 accesses the appropriate freight calculation data to determine whether a representative destination location is included for the calculation of delivery costs. If so, execution proceeds to step 980 where platform 18 determines the distance between the origination location and the representative destination location specified in the freight calculation data. Otherwise, execution proceeds to step 982 where platform 18 determines the distance between the specified origination location and the actual destination location specified in the delivery request. Platform 18 determines at step 984 the delivery costs for the load by applying the appropriate delivery rates to the calculated distance, as determined at step 980 or step 982, according to delivery distance ranges specified in the freight calculation data for the delivery container.

For example, for a delivery distance range of zero to one hundred miles, the delivery rate charged for each mile that a load is shipped within that range may be "$1.45," as illustrated in FIG. 15B. Furthermore, for a delivery distance range of one hundred one to two hundred miles, the delivery rate charged for each mile that the load is shipped within that range may be "$2.25." Moreover, for a delivery distance range of two hundred one to three hundred miles, the delivery rate charged for each mile that the load is shipped within that range may be "$3.00." If the distance between the origination location and the appropriate destination location, as determined by platform 18 at step 980 or step 982, is one hundred fifty miles, for example, then platform 18 applies the "$1.45" delivery rate to the first one hundred miles and the "$2.25" delivery rate to the next fifty miles for a total delivery cost of "$257.50." Execution then returns to the start of the flow chart illustrated in FIG. 19.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A freight calculation system, comprising:
   a seller client operable to generate freight data and to communicate the freight data using a communication network, wherein the freight data comprises first freight data and second freight data;
   a buyer client operable to communicate a delivery request for a load using the communication network, the delivery request specifying an origination location and a destination location associated with a particular destination zone; and
   a platform coupled to the seller client and the buyer client using the communication network, the platform operable to receive and to store the freight data, the platform further operable to determine a delivery cost for the load using the origination location, the destination location, and one of the first freight data or the second freight data according to the particular destination zone.

2. The system of claim 1, wherein the seller client maintains a plurality of business locations, each business location supporting a plurality of delivery containers, and the delivery request specifies one of the plurality of delivery containers.

3. The system of claim 1, wherein the delivery request specifies one of a plurality of delivery containers and the platform is further operable to determine the delivery cost using one of the first freight data or the second freight data according to the specified delivery container.

4. The system of claim 1, wherein the freight data is indexed by a plurality of destination zones.

5. The system of claim 1, wherein the particular destination zone comprises a plurality of zip codes specified by a representative zip code and the platform is further operable to determine the delivery cost using a distance between the origination location and a representative destination location associated with the representative zip code.

6. The system of claim 1, wherein the freight data is indexed by a plurality of destination zones for each of a plurality of origination locations.

7. The system of claim 1, wherein the freight data is indexed by a plurality of delivery containers and by a plurality of destination zones for each of a plurality of origination locations.

8. The system of claim 1, wherein the freight data is indexed by a plurality of destination zones specified by zip code.

9. The system of claim 1, wherein the seller client comprises a graphical user interface that presents a map to allow a user to specify a destination zone.

10. The system of claim 1, wherein the freight data comprises a plurality of delivery distance ranges and an associated delivery rate for each delivery distance range.

11. The system of claim 1, wherein:
   the buyer client is further operable to generate freight data and to communicate the freight data using a communication network; and
   the platform is further operable to determine a delivery cost for the load using the freight data generated by the buyer client if the seller client provides authorization.

12. A freight calculation apparatus, comprising:
   a communication device coupled to a communication network, the communication device operable to receive freight data from a seller client coupled to the communication network, wherein the freight data comprises first freight data and second freight data;
   a memory coupled to the communication device, the memory operable to store the freight data; and
   a server coupled to the memory, the server operable to calculate a delivery cost for a load using an origination location, a destination location associated with a particular destination zone and specified by a delivery request communicated by a buyer client coupled to the communication network, and one of the first freight data or the second freight data according to the particular destination zone.

13. The apparatus of claim 12, wherein the seller client maintains a plurality of business locations, each business location supporting a plurality of delivery containers, and the delivery request specifies one of the plurality of delivery containers.

14. The apparatus of claim 12, wherein the delivery request specifies one of a plurality of delivery containers and the server is further operable to determine the delivery cost using one of the first freight data or the second freight data according to the specified delivery container.

15. The apparatus of claim 12, wherein the freight data is indexed by a plurality of destination zones.

16. The apparatus of claim 12, wherein the particular destination zone comprises a plurality of zip codes specified by a representative zip code and the server is further operable to determine the delivery cost using a distance between the origination location and a representative destination location associated with the representative zip code.

17. The apparatus of claim 12, wherein the freight data is indexed by a plurality of destination zones for each of a plurality of origination locations.

18. The apparatus of claim 12, wherein the freight data is indexed by a plurality of delivery containers and by a plurality of destination zones for each of a plurality of origination locations.

19. The apparatus of claim 12, wherein the freight data is indexed by a plurality of destination zones specified by zip code.

20. The apparatus of claim 12, wherein the freight data comprises a plurality of delivery distance ranges and an associated delivery rate for each delivery distance range.

21. The apparatus of claim 12, wherein:
the communication device is further operable to receive freight data from the buyer client; and
the server is further operable to determine a delivery cost for the load using the freight data received from the buyer client if the seller client provides authorization.

22. A freight calculation method, comprising:
receiving freight data from a seller client, wherein the freight data comprises first freight data and second freight data;
storing the freight data;
receiving a delivery request for a load from a buyer client, the delivery request specifying an origination location and a destination location associated with a particular destination zone;
determining a delivery cost for the load using the origination location, the destination location, and one of the first freight data or the second freight data according to the particular destination zone; and
communicating the delivery cost for the load to the buyer client.

23. The method of claim 22, wherein the seller client maintains a plurality of business locations, each business location supporting a plurality of the delivery containers, and the delivery request specifies one of the plurality of delivery containers.

24. The method of claim 22, wherein the delivery request specifies one of a plurality of delivery containers and the step of determining comprises determining the delivery cost using one of the first freight data or the second freight data according to the specified delivery container.

25. The method of claim 22, wherein the freight data is indexed by a plurality of destination zones.

26. The method of claim 22, wherein the particular destination zone comprises a plurality of zip codes specified by a representative zip code and the step of determining comprises determining the delivery cost using a distance between the origination location and a representative destination location associated with the representative zip code.

27. The method of claim 22, wherein the freight data is indexed by a plurality of destination zones for each of a plurality of origination locations.

28. The method of claim 22, wherein the freight data is indexed by a plurality of delivery containers and by a plurality of destination zones for each of a plurality of origination locations.

29. The method of claim 22, wherein the freight data is indexed by a plurality of destination zones specified by zip code.

30. The method of claim 22, wherein the freight data comprises a plurality of delivery distance ranges and an associated delivery rate for each delivery distance range.

31. The method of claim 22, further comprising:
receiving freight data from the buyer client;
storing the freight data; and
determining a delivery cost for the load using the freight data received from the buyer client if the seller client provides authorization.

* * * * *